United States Patent [19]
Wilson et al.

[11] 3,911,494
[45] Oct. 7, 1975

[54] INTERACTIVE TEACHING SYSTEM USING TWO TAPES IN A SINGLE CASSETTE

[75] Inventors: Stewart W. Wilson, Concord; John W. Ericson, Marblehead, both of Mass.

[73] Assignee: Polaroid Corporation, Cambridge, Mass.

[22] Filed: Feb. 11, 1974

[21] Appl. No.: 441,632

Related U.S. Application Data
[62] Division of Ser. No. 294,475, Oct. 2, 1972.

[52] U.S. Cl.................... 360/92; 35/35 C; 360/71; 360/72
[51] Int. Cl.².. G11B 23/04; G11B 15/18; G11B 23/16
[58] Field of Search............. 360/92, 72, 71, 74, 62, 360/13, 93, 96, 91, 85; 179/100.1 PS; 35/35 C, 8 A, 9 A

[56] References Cited
UNITED STATES PATENTS

| | | | |
|---|---|---|---|
| 3,405,461 | 10/1968 | Joslow | 360/71 |
| 3,560,666 | 2/1971 | Bookman | 360/92 |
| 3,662,121 | 5/1972 | Cruger | 35/35 C |
| 3,705,271 | 12/1972 | Bell et al. | 360/62 |
| 3,777,417 | 12/1973 | MacNeill et al. | 35/35 C |

*Primary Examiner*—Alfred H. Eddleman
*Attorney, Agent, or Firm*—John W. Ericson

[57] ABSTRACT

A teaching system comprising a console furnished with a tape recorder and a graphic recorder, each adapted to be controlled from recorded signals produced by the tape recorder. Control apparatus is provided for enabling the user to address recorded lecture material, or recorded answer material, at will, under the guidance of a lecture map. The student can listen to a recorded lecture without interruption, or can interrupt it at will in response to suggestions on the lecture map of questions that may be raised by the lecture. When the lecture is interrupted, the recorded answer material may be addressed to produce a recorded answer to the question selected from the map. At appropriate intervals during the lecture or answer recordings, the graphic recorder may be utilized to present visual material supplementing the recorded audio material.

6 Claims, 25 Drawing Figures

FIG. II

INTERACTIVE TEACHING SYSTEM USING TWO TAPES IN A SINGLE CASSETTE

This is a division of application Ser. No. 294,475, filed Oct. 2, 1972.

This invention relates to the art of communication, and particularly to a novel teaching system for imparting information in a manner tailored to the requirements of the recipient.

Education is normally a group process. Necessarily so, because there are always more students than teachers. Nevertheless, there are innumerable instances in which group methods are either impractical or unsatisfactory. For example, some subjects, such as arithmetic, must be taught to every child. That implies the need for a great many arithmetic teachers, although certainly not one for every child. In order to prepare large numbers of teachers to teach material of this kind with reasonably satisfactory results, there is a tendency to develop a relatively uniform teaching program, and to refine the program in structure and content in the light of experience with its use.

Such a program has, as its central purpose, the guidance of a group of students down a prescribed path, from beginnings which they are supposed to share in common, through the elements of the body of knowledge to which the program is directed. Ordinarily, it is also required that this process be completed within a prescribed number of class sessions.

In order to accomplish these objectives, the pace over the course must be maintained, and only a limited amount of time can be budgeted for those digressions required for individual attention to students who may have trouble grasping a particular point, or who would like to explore ramifications of a concept. More attention than this is usually reserved only for those students in extreme difficulties with a course, to an extent that would justify providing an individual tutor or repeating the course.

A standard course of the type intended for group use is necessarily tailored to the requirements of the average member of the group. Since it is only in unusual instances that any particular member of the group will possess the attributes of the average, the best that can be said about an optimum course of this type is that most of it is not ill-suited to most of the class. One object of our invention is to facilitate the instruction of individuals according to their particular requirements.

Another problem that arises in education is the need to preserve the knowledge of rarely studied topics. For example, our culture has been considerably enriched by the results of the translation of the Egyptian hieroglyphics. However, it would be quite difficult at any particular time to assemble a sufficient group of students interested in learning how to make such a translation to justify the time required by any of the few indificuals who might at that time be qualified to teach them. Another object of our invention is to facilitate the deep study of such esoteric disciplines by an individual student at any time, without requiring the personal attendance upon him of a gifted individual with a knowledge of the topic.

Just as unusual topics can be taught only by a few, only a few have unusual talents in teaching more popular subjects. This is particularly true of education at the undergraduate level, where a great many students require teaching, extending to the current bounds of understanding, but conducted at levels which they can grasp. Such topics as physics, for example, which require a great depth of understanding, force of personality, and even thespian ability, to teach in an inspiring and interesting way, are very demanding upon the teacher.

It is unusual to find more than one gifted professor at any given university who can bring such a subject to the undergraduate with any expectation of catching his imagination and enlisting his interest. A conventional solution to this problem is to assemble the students in groups of as many as two hundred to hear lectures by the gifted professor. The group is then divided into classes of five or 10 for more individual instruction by graduate students. It is but an extension of this process to record the professor's lectures, and to present them on television, for example, to even larger audiences. But that expedient still further removes the professor's presentation from the requirements of the students. A further object of our invention is to make the talents of unusually able teachers more flexibly available.

An alternative to all the educational methods just discussed is the self-teaching process, which teaching is enormously inefficient and does not take advantage of any other educational method for motivating the student to study something which he has not already a desire to learn. However, self-teaching can be highly successful, simply because it is only undertaken by a person who is strongly motivated, and because it takes place at a pace, and in directions, determined by these interests, so that the attention of the student tends to remain engaged as long as he is involved in the process. A further object of our invention is to take advantage of the self-motivating capacities of the student to make it easier for him to acquire a body of knowledge.

Another problem that may be encountered, particularly with gifted teachers, is that in making use of the optimum characteristics of the group educational process, it is necessary to dominate the group to the end that the direction of the process is always under the control of the instructor. This has a tendency to be carried forward into individual instruction situations, where both teacher and student realize that the time devoted to discussion must be conserved. Many persons have an objection to this interference with their personal autonomy, to an extent that interferes with the educational process. A further object of our invention is to preserve the talents and abilities of a gifted professor in presenting him to the student, without introducing this personal dominating note, and, in fact, leaving the emotional control of the situation up to the student so that he feels that he is in command even through he is behaving in an essentially structured way.

In addition to those personal methods of instruction discussed, numerous efforts have been made to mechanize the educational process by developing teaching machines which can supplement the teacher without requiring his presence. Such machines can provide a variety of aural and visual aids, and indeed bring the words and actions of the teacher to a great many students. Such machines have provided for a certain amount of individual attention to the student, in that they can be made to progress at a rate determined by responses made by the student to stimuli introduced by the machine during the teaching process. One system of the type uses a linear program of recorded material interspersed at intervals by test material to which the student responds. In that system, the rate of progression through the material is governed by the student's responses. In a second type of teaching system, a wrong response by the student to a question presented during the main lecture results in branching to supplementary instructions stored on separate tracks. Such systems are relatively direct adaptations of the conventional group teaching process in which the student is carried on a prescribed educational path for a time, and then tested and either carried ahead, or brought back for further instruction, in dependence on the outcome of the test. The pace and content of the program is determined entirely by the student's responses to stock test questions, and everyone who makes the same errors gets the same course of instruction.

As a useful alternative to personal methods of group teaching, the traditional teaching machines have several problems. First, the whole advisability of testing in the educational process has been questioned, although its value as at least a partial indicator of the needs of the student at any stage of the process is clear. Second, in relying for branching and individualization exclusively on test results the traditional machines filter out the student's interest and motivation from the feedback information conveyed to the system.

This means, for example, that the system may, in response to wrong answers, fruitlessly repeat a particular topic when in fact the student would progress far better through the subject if he could switch to another topic of greater present interest. Furthermore, the student might later return to the first topic and, having developed a new point of view, master it easily.

In general, the traditional teaching machines are nonresponsive to a significant kind of information actually available from the student. Specifically, they do not respond to questions which may arise in a student's mind as he goes through the material. In the traditional systems it is the machine which asks the questions, never the other way around. Yet, as an indicator of a student's understanding and next desired direction in a subject, his own questions are at least as important as his responses to the machine's questions. The student's questions are in fact a natural component of the best kind of personal teaching relationship, a component which so far has not appeared in any way in teaching machines.

It is principal object of our invention to provide means by which a student can ask questions and receive responsive and competent answers in a given body of knowledge and thus proceed through that body of knowledge along an individual path closely suited to his personal intellectual requirements.

The above and other objects of our invention are obtained by a novel teaching system, preferably installed in a chamber to which the student may be assigned, for the time of his instruction, as his individual classroom. In this chamber is placed a console. The student can sit at the console, or, as he may be disposed, walk about it. On the console are placed the controls for an audio-visual system, to be described. The details of this system may be varied, although particular embodiments will be described; the central feature of the apparatus is the capability for reproducing, under the student's control, selected portions of recorded instructional material divided into two fundamental groups. The first is a lecture on a selected topic that has been prepared along essentially conventional lines by someone competent in the topic covered by the lecture, and preferably by a recognized authority in the field. The second group of recordings includes a series of comments, asides and answers to questions. These recordings may include recorded signals synchronized with the voice of the speaker to direct visual aids such as slide or motion picture projectors, television presentations, or the like, but in accordance with the preferred embodiment of the invention, the only visual aid is a graphic recorder which has the capability for reproducing handwriting and hand-drawn sketches, simulating the conventional blackboard presentation used by a lecturer in the classroom. It might be felt that the more literal presence of the instructor provided by media such as television would be very helpful, but it has been found that the relatively disembodied character of the graphic recorder extracts the essence of the graphic presentation and minimizes any dominating element in the personality of the lecturer, aiding greatly in the creation of the desired atmosphere of control by the student.

The preparation of recorded material for the apparatus of our invention is an interactive process involving lecturer, editor, and students. It will be apparent as the description proceeds that a set of recordings usable in the apparatus of the invention could be assembled by a single individual, but that such individual composition would be unlikely to produce all the advantages of the invention in its most desirable form.

The first step in the process is to have a lecture prepared by a competent person and recorded by him, in as tight, comprehensive and directed a manner as he desires, so that he essentially feels that he has covered the subject of discussion as well as can be done. Such a lecture may be of any desired duration; for example, from a few minutes to several hours.

Next, a number of persons are asked to listen individually to the recording of this lecture, comment on it, and suggest questions that occur to them as it proceeds. Although it is obviously possible for any particular individual to ask a question that would never occur to anyone else, I have found that this process tends to produce a relatively bounded system of questions for each topic.

Specifically, a point will be reached in the question collection process at which questions similar to at least half of any new contributor's questions will tend to have already been collected. Experience shows that this point arives when the number of distinct questions in the collection is roughly equal to the number of minutes in the lecture. Thus a question set representative of at least half of most people's questions is not unmanagably large.

When suitable questions have been assembled in this manner, answers to them are recorded by the lecturer. These answers are subsequently re-recorded in the sequence in which they tend to arise in connection with the lecture. In accordance with the preferred embodiment of the invention, comments and asides, which the lecturer might feel would be appropriate to some audiences, or answers to questions that may have been deliberately omitted from the collected list, or which may occur to the lecturer independently, may be interspersed with the recorded answers to the questions selected by the previous process.

There is one recording on which the lecture is contained, and another recording comprising the sequence of answers and comments. In order to coordinate the use of the recorded material and the graphic recorder, the apparatus includes a lecture map prepared as a general guide to the student in the use of the machine.

On the lecture map, there are indicated in outline form the major topics of the lecture, together with indications of the location in the lecture at which they appear. Adjacent each of these topics are indicated on the map a collection of questions which may occur to the student as he is listening to that part of the lecture. The locations of the answers to these questions in the answer recording are also indicated on the map.

While the approach to the use of the machine may be quite individual, in general, it will proceed as follows: the student will insert the recording for the lecture in which he is interested into the machine, and start by listening to the lecture from the beginning. As he does so, he can roughly keep track of the progress of the lecture by glancing at the lecture map. If his attention wanders, or if he would like a phrase or other portion of the lecture repeated, he may stop the machine, go back in the lecture, and listen to that portion again. Or, he may simply stop the machine for a time to reflect on what he has heard.

Should he notice a question on the lecture map that he would like answered, the student can stop the lecture and direct the machine to reproduce the answer to that question from the address given on the lecture map. In accordance with the preferred embodiment of the invention, that answer will be reproduced almost immediately if it is the question most likely to be asked at that point in the lecture. Any question on the map can be answered at any time; however, more time will be required for its reproduction in dependence on how remote it is from the material being discussed.

After the answer to the question has been played, the student can return to the lecture. The lecture may immediately resume at the point where it left off, but preferably repeats a few words previous to the point of interruption, so that the student can grasp the thought that was being expressed when he interrupted it.

In accordance with the preferred embodiment of the invention, at intervals during the lecture, it is possible to respond to a potential thought on the student's part that is not explicitly represented on the lecture map. This may include an optional aside by the lecturer, a comment in the nature of a footnote, or an answer to a question that was either not frequently enough asked to justify placing it on the lecture map, or which has been thought by the lecturer to be a good question even though no one has asked it. The possibility that there is something of interest available to the student at this point is indicated by any suitable indicating means, such as a lamp or the like, which is lit for a few seconds to indicate that additional material is available, if desired. If the student does not respond to the suggestion, or does not notice it, nothing further happens except that the lecture continues. However, if the student responds by pressing a button or other signaling device provided for the purpose, the lecture will be interrupted and the selected material will immediately be delivered. This can produce an almost magical effect of answering the student's thoughts, with a feeling of meeting of the minds without the presence of the lecturer.

As the lecture or recorded answer or comment material is produced, it may be desirable to accompany the audible material with visual material, in the manner that an instructor supplements a classroom lecture with entries on the blackboard. For this purpose, the audible recordings are accompanied by recorded pen position signals directing the graphic recorder to write out the intended information. These signals may be produced by any suitable conventional means, although one convenient approach is to use the transmitter of an Electrowriter, a fasimile handwriting device produced by the Victor Comptometer Corporation of Chicago, Illinois. For this purpose, the Electrowriter receiver may be employed in the console to reproduce the recorded information.

Such pen position information inherently varies at a relatively low frequency that is well within the range of wow and flutter encountered on even very good audio reproducing systems. It has commonly been thought rather impractical to record and reproduce such signals unless extremely expensive reproducing equipment was employed, in which wow and flutter are reduced to levels very far below those which would cause any noticeable effect in reproduced sound signals. In accordance with the invention, a compensator for the graphic recorder signals is provided which eliminates most of the wow and fluter introduced in the recording and reproducing process from the recorded signals, so that they are reproduced substantially in conformity with the manner in which they were made.

A particular advantage of the apparatus of the invention, in its preferred embodiment, is that the operating program is incorporated in the recorded lecture and answer material. Thus, a fixed program can be built into the apparatus incorporated in the console, and wiring changes are not required to accept different sets of recordings.

The apparatus of the invention, and the manner in which it is constructed and operated, will best be understood in the light of the following detailed description, together with the accompanying drawings, of various illustrative embodiments of the invention.

Figure 1:
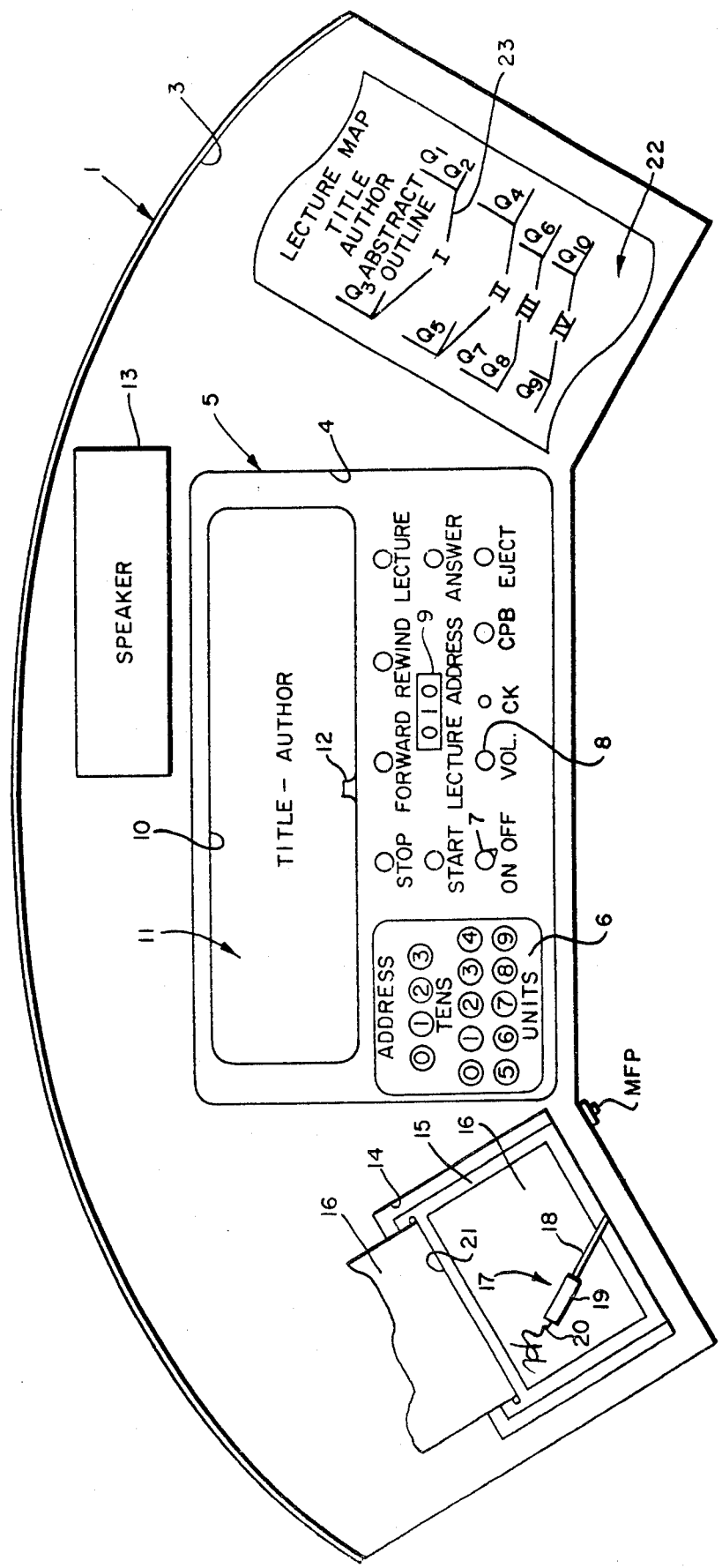
FIG. 1 is a schematic plan diagram of a console for an interactive teaching machine in accordance with the invention.

Referring to FIG. 1, we have shown a console generally designated 1 comprising a desk top 2 partially surrounded if desired by a peripheral wall 3 forming a lip to prevent miscellaneous objects from falling behind the desk. The desk top 2 is provided with a generally rectangular recess 4 adapted to receive and position a tape recorder generally desiganted 5.

The tape recorder 5 is provided with a control panel including a number of buttons, knobs and indicators, to be described, and a keyboard on which decimal addresses from zero to 39 can be entered. The purpose of the keyboard will be described below, but it should be apparent that this number 39 is purely arbitrary, is selected for simplicity of illustration, and can be augmented or decremented to suit the requirements and desires of the particular communication problem.

However, as illustrated, the keyboard 6 is provided with four "tens" address buttons, labelled zero through 3, and ten "units" address buttons, labelled zero through 9. Any desired address from zero to 39 can thus be entered, for purposed to appear, by pushing one of the tens buttons and one of the units buttons.

The controls on the tape recorder 5 include a number of pushbuttons, individually labelled "Stop," "Start," "Forward," "Rewind," "Lecture," "Answer," "Eject," and "CPB." These pushbuttons are connected to circuits to be described to perform various functions when momentarily depressed. The controls also include an "On/Off" switch 7, a volume control knob 8, an indicator lamp CK, and a lecture address indicator 9 for indicating the decimal address of the current position of the lecture tape, to be described.

The tape recorder 5 is provided with a well suggested at 10 adapted to receive a cassette 11, to be described. The cassette 11 contains two rolls of magnetic recording tape, one including answer material and the other lecture material. In this context, it should be remarked that the references which will be made to magnetic recording tape and magnetic recorders refer to the presently preferred mode of recording, but that any other form of recording media may be adapted to the system of the invention, if so desired, without departing from the invention in its broader aspect.

As suggested in FIG. 1, the cassette 11 when in position is retained by a latch 12. The latch 12 is released in a manner to be described when the "Eject" pushbutton is depressed. If desired, indicia indicating the title and author of the recorded material may be displayed on the cassette 11 in the position shown, or on an edge thereof if it is desired to file cassettes in a library, in the manner in which a conventional book is filed.

Associated with the tape recorder 5 in the conventional manner is a speaker 13 for reproducing the audio portions of the tapes in the cassette 11. The speaker may be mounted on the console 1 in the manner suggested in FIG. 1.

A second recess 14 provided in the desk top 2 exposes a graphic recorder 15 mounted generally below the console and comprising a frame defining a writing space in which a portion of a recording sheet 16 is disposed. A recording stylus generally designated at 17 comprises an arm 18 arranged to be moved about the surface of paper 16 within the frame of the recorder 15 by externally supplied signals, as will appear.

The arm 18 carries a head 19 to which is affixed a pen 20 supplied with ink in a conventional manner to write on the surface of the paper 16. Writing is effected when the arm 18 is lowered so that the pen 20 is in contact with the paper 16, and the arm is moved about over the surface of the paper in a pattern dictated by the signals applied to it.

When a recorded frame on the paper 16 is to be disposed of, the paper is advanced, either under automatic control, as will appear, or when a manual pushbutton MFP on the front of the console is depressed. When either occurs, a section of the paper equal to the length of the writing frame in the recorder 15 is advanced out to the rear, exposing a new frame. As the paper accumulates past the exit slot 21, through which it emerges from the recorder 15, it may be torn off in the manner of a used length of adding machine tape.

Each cassette 11 associated with a particular subject is used in combination with a lecture map, schematically indicated at 22, which can be used in combination with the controls on the console to guide the student through the lecture and answer material in a manner determined by his needs and interests. Basically, such a lecture map 22 may include the title and author of the material, coordinated with the same information appearing on the cassette 11, followed by an abstract of the material which suggests its general content or its thesis or theme.

Next follows an outline of topics in the lecture which may be used as guides to its content for purposes of addressing, or for purposes of keying the contents of various questions that the lecture may suggest as it proceeds. Those questions which have been determined to be useful for direct addressing are printed on the lecture map, as indicated at Q1, Q2, etc. The questions are associated with the current topic in the lecture to which they are most relevant by indicating lines, as shown schematically at 23. Thus questions Q1, Q2 and Q3 are associated with lecture topic 1, and questions Q4 and Q5 are associated with lecture topic 2.

Figure 2:
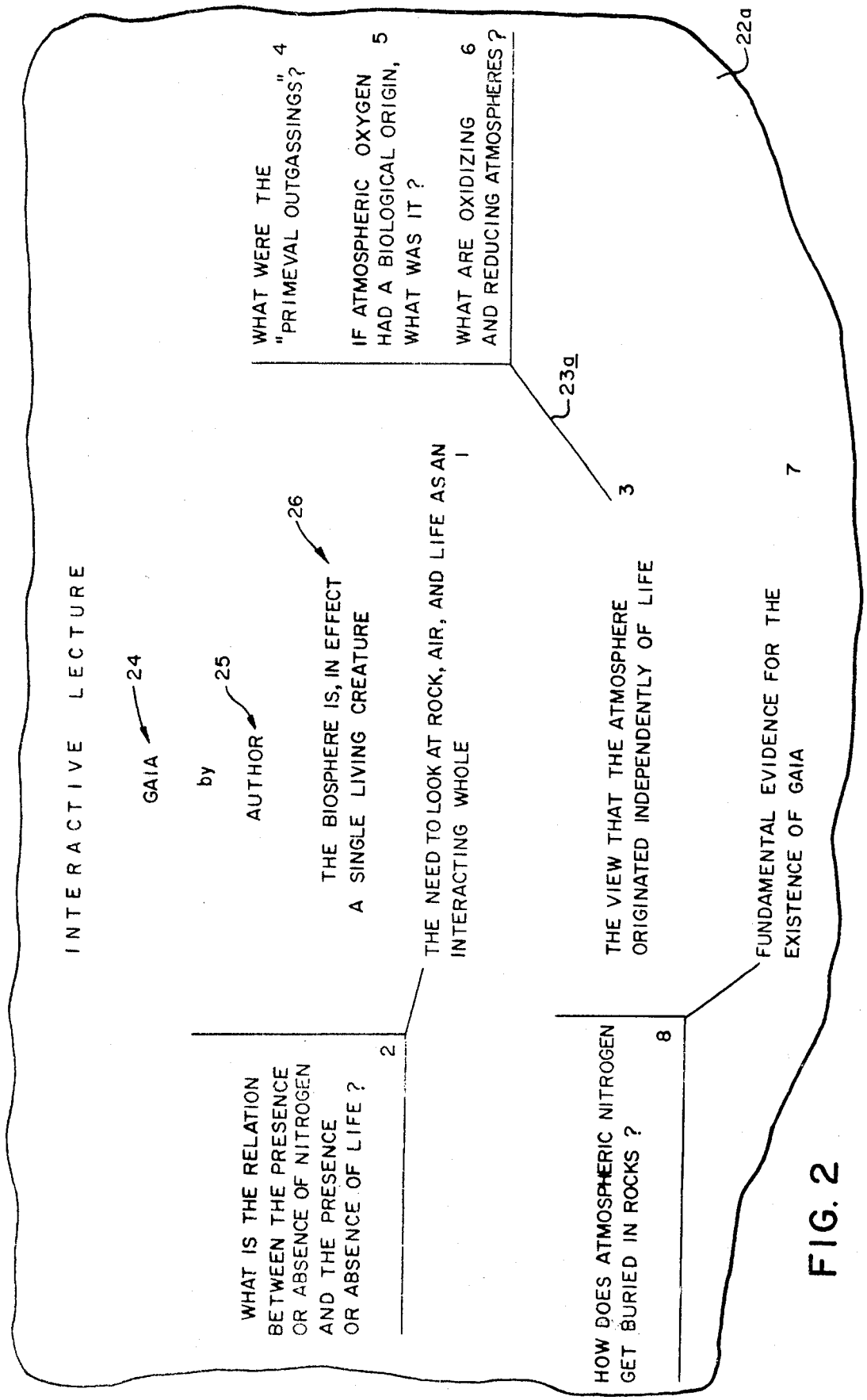
FIG. 2 is a diagrammatic sketch of a fragment of a typical interactive lecture map useful in the combination of FIG. 1.

FIG. 2 shows a segment of abbreviated excerpts from an actual interactive lecture in the form of a lecture map fragmentarily shown at 22a. The title and author appear at 24 and 25, respectively. Next, the abstract 26 appears. In this case, the subject of the material on which the lecture is based is the thesis that the biosphere is a living creature.

Next on the map 22a is a statement keyed to the first section of the lecture, in which a relationship between animate and inanimate objects is discussed. The number 1 adjacent this entry is address 1, accessible from the keyboard in FIG. 1 by depressing tens button "0" and units button "1."

Associated with this first entry in the lecture outline is a question, shown at the upper left in FIG. 2 and associated with the address designation 2. That implies an address on the answer tape in the cassette 11 of FIG. 1 accessible by pressing the tens button "0" and the units button "2." As will appear from FIG. 2, successive topics in the lecture, and related questions, are each associated with decimal addresses, each accessible from the keyboard.

The addresses are assigned in the most probable sequence in which they would be employed if everything in both lecture and answer material was used in the most probable order. Actually, that would be a most improbable sequence of events, but as will appear, recording the material in that sequence makes possible the reduction of the time required to get the answer to the most relevant question.

Specifically, each topic in the lecture has an address, and the questions related to that topic have the next succeeding addresses. Thus, lecture topic 7 is associated with question 8. The scheme will be sufficiently apparent from the above description, together with the illustrative drawing of FIG. 2.

Referring again to FIG. 1, the usual sequence in operating the machine is to insert the cassette 11 in the position shown, momentarily depress the "Lecture" button, and then momentarily depress the "Start" button. That will begin playing the lecture through the speaker 13, interspersed with such drawings on the recorder 15 as may be included with the lecture material.

Playing of the lecture will continue until it is interrupted by momentary depression of the "Stop" button. That will stop the lecture tape. The student may have stopped the lecture tape in order to ask a question, which he then does by momentarily depressing the answer button, and entering the address of the requested answer on the keyboard 6. He then depresses the "Start" button, whereupon the requested answer will be played. The material on the answer tape may also be accompanied by signals directing the recorder 15 to produce writing or drawings keyed to the recorded material.

At the end of the recorded answer on the answer tape, the apparatus will stop until the student elects to proceed, either by asking another question, or by resuming the lecture. If the answer to another question is desired, he presses the "Answer" button, selects the desired address on the keyboard, and then depresses the "Start" button as before. If he desires to resume the lecture from the point at which it was interrupted, he simply depresses the "Start" button, whereupon the lecture will begin again a few words before the place where it was interrupted so that the student can catch the thought.

If the indicator lamp CK goes on during the lecture, it indicates to the student that there is supplementary material available that he may wish to refer to. If he is satisfied to remain concentrated on the lecture, this indication is simply ignored. However, if he feels the desire for supplementary material, he presses the pushbutton CPB while the lamp CK is still lit; that will immediately interrupt the lecture and begin playing the supplementary statement from the answer tape, as though in answer to an unasked question. At the end of the supplementary recording, the student can resume the lecture from the point at which it was interrupted, or ask another question, as before.

Figure 3:
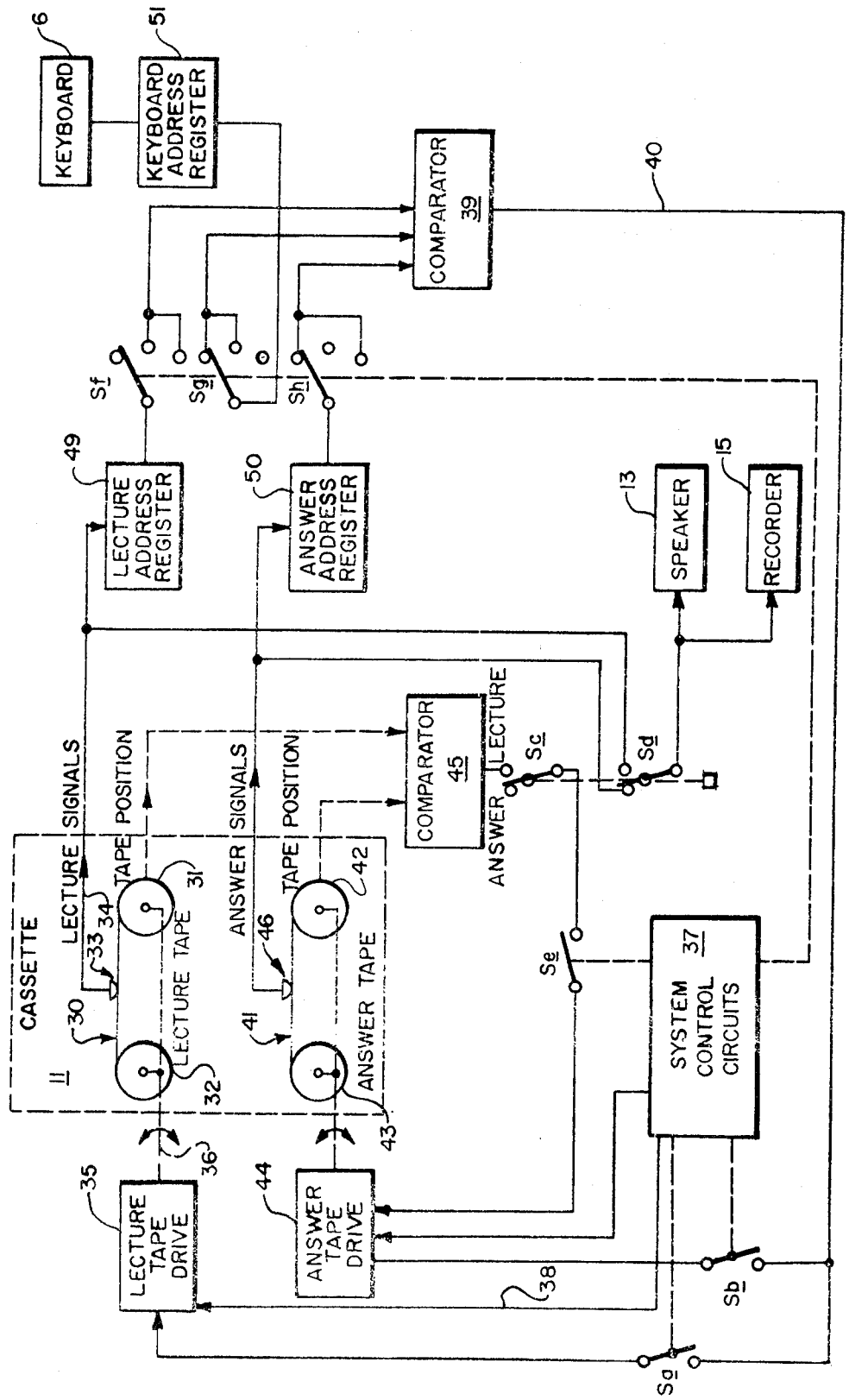
FIG. 3 is a schematic block and wiring diagram of a control system for the apparatus of FIG. 1.

FIG. 3 shows the general outline of the apparatus by which the above operation is carried out. In FIG. 3, certain functions are illustrated as performed by switching means diagrammatically shown as mechanically operated electrical switches. These switches have no necessary correspondence to actual switches in the system to be described, but perform functions corresponding to those performed by circuit means to be described.

As schematically indicated, the cassette 11 includes a lecture tape generally designated 30 having ends disposed on a supply reel 31 and a takeup reel 32 for reversible movement relative to a set of pickup devices schematically indicated at 33. The pickup devices 33 serve at times to develop lecture signals on a set of leads schematically indicated at 34 in a manner and for purposes to be described. The pickup devices 33 may be magnetic heads, photoelectric cells, or a combination of both, as will be described.

The lecture tape is arranged to be driven in either direction by lecture tape drive means schematically indicated at 35 through suitable connections to the supply and takeup reels as diagrammatically indicated at 36. The lecture tape drive 35 acts under the control of system control circuits generally designated 37 in response to signals applied over a lead schematically indicated at 38. At times directed by the system control circuits 37 when a switch schematically indicated at Sa is closed, the direction of operation of the lecture tape drive 35 is controlled from a comparator 39 that produces signals over leads schematically indicated at 40 to select the direction of the lecture tape drive.

The cassette 11 also contains an answer tape generally designated 41 disposed between a supply reel 42 and a takeup reel 43 for reversible movement under the direction of an answer tape drive means generally designated 44. The answer tape drive 44 is controlled by the system control circuits 37, and operates in a direction that is at times selected by the comparator 39 when a switch S$b$ controlled by the control circuits 37 is closed.

Operation of the system of FIG. 3 is basically divided into an answer mode and a lecture mode, as selected by a pair of ganged switches schematically indicated at S$c$ and S$d$. These switches may be either manually or automatically controlled, under the direction of the system control circuits 37, for movement between one of the two labelled positions "Answer" and "Lecture."

In the "Lecture" position of the switches S$c$ and S$d$, a comparator 45 controls the answer tape drive 44 at times selected by the closure of a switch schematically indicated as S$e$ under the direction of the system control circuits 37. The comparator 45 receives tape position signals from the answer tape 41 and lecture tape 30, as by means connected to the supply reels 31 and 42, as schematically indicated by the dotted lines.

The tape position signals determine the disparity in relative position between the lecture tape and answer tape for two general purposes. The first is to select an appropriate drive speed for moving the answer tape from one position to another under the direction of the lecture tape at a speed depending on the distance to be traveled to get to the desired position. Secondly, the tape position signals determine the direction of movement for the answer tape to enable it to reach a position corresponding to the position of the lecture tape.

The overall purpose of this provision is to enable the answer tape to be positioned roughly in correspondence with the location on the lecture tape so that the most nearly pertinent question will be most directly accessible when the student desires to interrogate the answer tape from the keyboard. By that arrangement, it is possible to store up to several hours of answer material and lecture material on two tapes, without requiring the long access times that would otherwise be necessary to go from one tape position to another. For this purpose, the time when a student is listening to the lecture, during which the answer tape would otherwise be idle, is employed to bring it approximately into correspondence with the position of the lecture tape in a manner to be described in more detail below.

The speaker 13 and graphic recorder 15 are arranged to receive information from either the lecture tape or the answer tape under the direction of the switch S$d$.

Signals from the lecture tape are supplied at all times to a lecture address register 49, which keeps track of the current position of the lecture tape. Similarly, signals from the answer tape are always provided to an answer address register 50, which repeats the current position of the answer tape. A keyboard address register 51 is arranged to be loaded at times, from the keyboard 6, with a particular address that may represent either a lecture address or an answer address, depending on the position of the switches S$c$ and S$d$.

Signals are suppliied to the comparator 39 from any two of the registers 49, 50 and 51 under the control of switching means schematically shown as three ganged, three-position switches S$f$, S$g$ and S$h$. These switches are controlled by the system control circuits 37.

In the position of the switches S$f$, S$g$ and S$h$ shown, the answer address register and the keyboard address register are connected to the comparator. This position of the switches is selected when the switches S$c$ and S$d$ are in their answer position, and the connections are used to allow the answer address to be compared with the keyboard address for purposes of entering the answer tape at a desired answer address location.

In a second position of the switches S$f$, S$g$ and S$h$, the lecture address register 49 and the keyboard address register 51 are connected to the comparator 39. This setting is used in the lecture position of the switches S$c$ and S$d$ to enable a desired location in the lecture to be entered from the keyboard.

In the third position of the switches S$f$, S$g$ and S$h$, the lecture address register and the answer address register are connected to the comparator 39. The purpose of this setting is to enable the answer tape to follow the lecture tape address when the switches S$c$ and S$d$ are in their lecture positions.

Certain elements of the apparatus generally described in connection with FIG. 3 will next be more specifically described with reference to FIG. 4. In the illustrative embodiment of FIG. 4, all of the information on the lecture and answer tapes is magnetically recorded on four tracks. Thus, the lecture tape 30 is provided with four tracks on which are recorded signals that are selectively reproduced by magnetic pickup heads 33$a$, 33$b$, 33$c$, and 33$d$. Similarly, four tracks on the answer tape 41 are interrogated by four magnetic pickup heads 46$a$, 46$b$, 46$c$, and 46$d$.

A first track on the lecture tape 30, passing adjacent the head 33$a$, contains audio signals corresponding to the voice portion of the recorded lecture. The head 33$a$ is connected over a circuit including a conventional electronic switch S1 to the active input terminal of a conventional audio amplifier 52.

The amplifier 52 is connected to the volume control knob 8, for adjusting the sound level to the desires of the student. The gains of other amplifiers in the system, to be described, are preferably not manually controllable in this fashion. The output of the circuit of the amplifier 52 is connected to the loudspeaker 13, as schematically indicated.

The voice portion of the recorded answer material on the tape 41 is on a track passing by the head 46$a$. The head 46$a$ is connected over the load terminals of a conventional electronic switch S2 to the active input terminal of the amplifier 52. Thus, when the switdh S1 is closed, the audio amplifier 52 receives signals from the lecture tape, and when the switch S2 is closed, the amplifier 52 receives audio signals from the answer tape.

The switches S1 and S2 may be of any conventional type, and other electronic switches, to be described and similarly shown, may be of the same type. Specifically, the switches such as S1 are provided with load terminals $a$ and $b$ between which there appears an effectively closed circuit when a suitable signal, such as a positive current with respect to ground, is applied to a control terminal $c$, and to present an open circuit between the terminals $a$ and $b$ when a ground or an open signal is applied to the control terminal $c$.

The switch S1 is closed when a conventional AND gate 53 produces a logic 1 output signal at a positive potential with respect to ground in response to the presence of both a LECTURE signal, at a positive level with respect to ground, and a RUN signal, positive with respect to ground. In this contest, it may be noted that these and other labelled signals to be described are considered to be at logic 1, or positive with respect to ground, when present, and at logic 0, or ground potential, when absent.

Similarly, the switch S2 is closed when a logic 1 output signal is produced by conventional AND gate 54 in response to two applied signals, ANSWER and RUN. These signals are produced by circuits to be described below.

The second track on the lecture tape passing adjacent the head 33b contains two recorded frequency modulated signals that determine the X and Y coordinates of the pen position on the recorder 15. These signals may be conveniently produced by modulating carriers of, for example, 1,400 and 2,200 Hz over frequency ranges of, for example, 1,310 to 1,490 Hz and 2,060 to 2,340 Hz, respectively. Of course, these signals are present only when the recorder is to be used during the lecture.

The corresponding track on the answer tape 41 contains recorded pen position signals for the recorder 15 at intervals in the answer when it is desired to accompany the voice track with a graphic display. These signals are applied to the head 46b.

Signals from the head 33b are supplied to the input terminal of an amplifier 55 when a conventional electronic switch S3 is closed. The switch S3 is closed when a logic 1 signal is produced by the AND gate 53. Similarly, signals are supplied to the amplifier 55 from the head 46b when a switch S4 is closed in response to the production of a logic 1 signal by the AND gate 54.

The output terminal of the amplifier 55 is connected to a compensator 56, to be described below, in which the effects of wow and flutter due to minor variations in the speed of the lecture and answer tapes, and to transient differences between recording and playback speeds, are substantially eliminated. The compensator is needed for the recorder signals because they appear as relatively small variations in the carrier frequencies in ranges, and varying at rates, that are in the range of expected flutter frequency responses.

Typically, wow is roughly a variation in speed at from 0 to 11 cyles per second, and flutter may be considered to be a speed variation in the range from 1 to 100 cycles per second. These deviations are directly in the information band, and it has been found that the compensator is needed in order to obtain satisfactory fidelity in the graphic recorder 15 even when recorders of high quality are employed.

A suitable compensator will be described below in connection with FIG. 19. Briefly, however, the output of the compensator 56 comprises compensated signals varying at frequencies $fx$ and $fy$ corresponding to the X and Y coordinates of the transcription arm 17 of the recorder 15.

These signals are applied to a conventional demodulator 57, which produces signals appropriate for the control of a pair of conventional servomotors generally designated 58 that produce mechanical signals X and Y to control the position of the arm 17 on the paper 16 in the recorder 15.

A set of four signals are recorded on the lecture tape 30 on a track passing adjacent the head 33c. Signals appearing on the head 33c are applied over an electronic switch S5 to the active input terminal of a conventional amplifier 58. The switch S5 is closed when a logic 1 signal is produced by the AND gate 53.

Corresponding signals for the answer tape are recorded on a track passing adjacent the head 46c. The signals appearing on this head 46c are applied through an electronic switch S6 to the amplifier 58. The switch S6 is closed when the AND gate 54 produces a logic 1 output signal.

Four band pass filters 59, 60, 61 and 62 are connected to the output terminals of the amplifier 58. Each of these filters is designated to pass a different frequency with a band on either side wide enough to accommodate the expected variations in the frequency due to changes in the speed of the lecture or answer tape, but not wide enough to accept any of the other frequencies. The provision of these filters makes it possible to get four signals on the same track. Alternatively, four tracks could be provided, or one or more of the signals could be encoded as holes punched in a track on the tape, to be detected by photocells.

A signal passed by the filter 59 at, for example, 3,100 Hz, is applied to a full-wave rectifier 63. The rectifier 63 is connected to a level detector 64, which responds to an applied input signal above a predetermined threshold to produce a positive signal with respect to ground labelled AA. The signal AA indicates the presence of an address code in the lecture address register 49 which has been assigned to an information field on the answer tape 41 that contains a recorded directly addressable answer. It is thus recorded on the lecture tape between the point at which a signal is recorded that sets the lecture address register 49 to an address corresponding to an answer field, and the next address code on the lecture tape. No corresponding signals are recorded on the answer tape 41.

The filter 60 passes a signal at, for example, 2,400 Hz, which is recorded on the lecture tape only during intervals when it is desired to enable a student to have access to an auxiliary comment, aside or answer to a question that may have been raised by the lecture but is not set out specifically on the lecture map. The output signal from the filter 60 is supplied to a level detector 65.

In response to an input above a predetermined threshold, the level detector 65 produces a rising transition that triggers a conventional one-shot multivibrator 66. The multivibrator 66 produces an output pulse having a selected duration of, for example, 5 to 10 seconds, labelled CF. During the time that the signal CF is present, the student may press the button CPB in FIG. 1 to obtain supplementary material from the answer tape.

The filter 62 is arranged to pass a frequency in the vicinity of, for example, 1,800 Hz, to a level detector 67. In response to an 1,800 Hz signal above a predetermined level, the level detector 67 produces a rising transition that triggers a conventional one-shot multivibrator 68. The multivibrator 68 is also arranged to be triggered by momentary closure of a spring-returned pushbutton MFP.

In response to either input, the pulse produced by the multivibrator 68 is supplied to a motor drive amplifier 69 to drive a motor M1 for an interval sufficient to move a strip of paper 16 in the recorder 15 through an increment equal to one frame on the recorder. As schematically indicated, the paper 16 for the recorder 15 is supplied from a roll 70, and passes thence over the platen 71 of the recorder through a pair of rolls 72 and 73.

The paper 16 is nipped between the rolls 72 and 73. The roll 72 acts as an idler, and the roll 73 is driven at times by the output shaft 74 of the motor M1. The paper is thus advanced by a suitable increment to provide a clear sheet after the previously recorded material has served its purpose.

The filter 62 is designed to pass a frequency, in the vicinity of 1,400 Hz, for example, to a full-wave recitifer 75. The 1,400 Hz signal is recorded on either the lecture tape or the answer tape when it is desired to utilize the recorder 15.

The output signal from the rectifier 75 is supplied to a threshold detecting amplifier 76. When a signal above the threshold level is present, the amplifier 76 applies actuating current to a solenoid having a winding 77 and an armature 78 connected to the arm 18 of the recorder.

The arm 18 is normally urged upwardly by a spring 79, so that the pen is disengaged from the paper 16. When the solenoid winding 77 is energized, the arm 18 is brought down so that the nib of the pen is in engagement with the paper and in writing position.

Lecture address signals are recorded on the lecture tape 30 in position to be read by the head 33d. This head is connected to the input terminal of an amplifier 80.

Address signals are basically in the form of a pulse each time the address is to be changed. However, since the lecture tape and answer tape must be interrogated at different speeds for address tracking purposes, each pulse preferably comprises a chord of several recorded tones at different frequencies, so that the output signal will be available in a predetermined frequency range regardless of the speed of the tape.

The signals appearing at the output of the amplifier 80 are applied to a full-wave rectifier 81, and thence to a level detector 82. In response to the signal supplied to the level detector above a predetermined threshold value, a one-shot multivibrator 83 is triggered to produce an output pulse labelled LCP.

The pulse from the multivibrator 83 may have a duration selected to be longer than the longest playback time of an address code pulse on the lecture or answer tape, at the lowest playback speed. That serves to prevent multiple triggering of the multivibrator 83.

The pulse LCP is applied to one input terminal of each of two conventional AND gates 84 and 85. The gate 84 also receives a signal labelled LF, present when the lecture tape is being moved forward. The gate 85 also receives a signal labelled LR, present when the lecture tape is moving backward, or onto the supply reel.

The lecture address register 49 may comprise a conventional reversible binary counter, adapted to be stepped in one direction by pulses applied to an UP terminal by the gate 84, and to be stepped in the opposite direction by pulses applied to the terminal labelled DOWN by logic 1 signals from the gate 85. A reset pulse to set the register 49 to a reference state, in which, for example, the address is 0, is produced by a signal labelled LLS that is present when the lecture tape is essentially fully wound on the supply reel in the starting position.

Preferably, the lecture address register 49 contains at least one more bit than the bits of the address stored in the keyboard address register. In other words, for example, the lowest ordered bit of the counter 49 would not represent an addressable code bit, whereas the higher ordered stages would represent addressable bits. The purpose of this extra stage is to provide additional address locations used as dummy addresses for purposes to be described below.

Answer address signals, produced in the manner described for the lecture tape address signals above, are supplied to the head 46d, and thence to an amplifier 86. Answer address signals may comprise pulses of several tones, as described above, such that a signal of useful strength will be produced by the amplifier 86 regardless of the speed of the answer tape.

The output signals from the amplifier 86 are supplied to a full-wave rectifier 91, a level detector 92, and a one-shot multivibrator 93, in a manner and for the purposes described above in connection with the answer address channel. The output signal from the multivibrator 93 is a single pulse labelled ACP for each address signal recorded on the answer tape.

The pulses ACP are applied to one terminal of each of two AND gates 94 and 95. The gate 94 also receives a signal labelled AF, present when the answer tape is moving forward. The gate 95 receives a signal labelled AR, present when the answer tape is moving backward.

The answer address register 50 may also be a reversible counter, stepped in one direction by the gate 94 and in the opposite direction by the gate 95. It is arranged to be reset by a signal, labelled ALS, that is present when the answer tape is fully wound on the supply reel 42. As in the case of the lecture address register, the answer address register preferably includes at least one extra stage to record spare addresses that are not directly accessible from the keyboard.

The manner in which address codes and information entries are recorded on the lecture and answer tapes will next be discussed, with reference to FIGS. 1, 2, 5 and 6. Referring first to FIG. 1, although any desired number of enterable addresses could be provided for, in the illustrated embodiment there are four tens buttons on the keyboard 6 and 10 units buttons. Thus, any address between 0 and 39 can be entered on the keyboard. Address 0 may be employed as a direct address, but in the illustrated embodiment, it is skipped in direct addressing simply to avoid labelling the first address on the lecture map as 0.

Because it is convenient to use conventional ascending order binary counters as address registers, a form of binary-decimal coding is used to relate the keyboard addresses to the register contents. Convenient code assignments are shown in the following table:

| Decimal Address | Address Code | | | Address No. | Lecture Tape | | Answer Tape | |
|---|---|---|---|---|---|---|---|---|
| | Addressable Bits | | Extra Bit | | Contents | Playing Time | Contents | Time |
| | Tens | Units | | | | | | |
| 0 | 00 | 0000 | 0 | 1 | | | | |
| | 00 | 0000 | 1 | 2 | | | | |
| | 00 | 0001 | 0 | 3 | | | | |
| | 00 | 0001 | 1 | 4 | | | | |

—Continued

| Decimal Address | Address Code | | | Address No. | Lecture Tape | | Answer Tape | |
|---|---|---|---|---|---|---|---|---|
| | Addressable Bits | | Extra Bit | | Contents | Playing Time | Contents | Time |
| | Tens | Units | | | | | | |
| 1 | 00 | 0010 | 0 | 5 | LE1 | 1 | | |
| | 00 | 0010 | 1 | 6 | | | | |
| | 00 | 0011 | 0 | 7 | | | | |
| | 00 | 0011 | 1 | 8 | | | | |
| 2 | 00 | 0100 | 0 | 9 | | | Q1 | 3 |
| | 00 | 0100 | 1 | 10 | | | | |
| 3 | 00 | 0101 | 0 | 11 | LE2 | 3 | | |
| | 00 | 0101 | 1 | 12 | | | | |
| | 00 | 0110 | 0 | 13 | | | | |
| | 00 | 0110 | 1 | 14 | | | | |
| 4 | 00 | 0111 | 0 | 15 | | | Q2 | 1 |
| | 00 | 0111 | 1 | 16 | | | C1 | 4 |
| | 00 | 1000 | 0 | 17 | | | | |
| | 00 | 1000 | 1 | 18 | | | | |
| 5 | 00 | 1001 | 0 | 19 | | | Q3 | 6 |
| | 00 | 1001 | 1 | 20 | | | | |
| | 00 | 1010 | 0 | 21 | | | | |
| | 00 | 1010 | 1 | 22 | | | | |
| 6 | 00 | 1011 | 0 | 23 | | | Q4 | 8 |
| | 00. | 1011 | 1 | 24 | | | C2 | 1 |
| 7 | 00 | 1100 | 0 | 25 | Le3 | 5 | | |
| | 00 | 1100 | 1 | 26 | | | | |
| | 00 | 1101 | 0 | 27 | | | | |
| | 00 | 1101 | 1 | 28 | | | C3 | 10 |
| 8 | 00 | 1110 | 0 | 29 | | | Q5 | 3 |
| | 00 | 1110 | 1 | 30 | | | | |
| 9 | 00 | 1111 | 0 | 31 | LE4 | | | |
| | 00 | 1111 | 1 | 32 | | | | |
| 10 | 01 | 0000 | 0 | 33 | | | | |
| | 01 | 0000 | 1 | 34 | | | | |
| | 01 | 0001 | 0 | 35 | | | | |
| | 01 | 0001 | 1 | 36 | | | | |
| 11 | 01 | 0010 | 0 | 37 | | | | |
| | 01 | 0010 | 1 | 38 | | | | |
| | 01 | 0011 | 0 | 39 | | | | |
| 37 | 11 | 1100 | 0 | 121 | | | | |
| | 11 | 1100 | 1 | 122 | | | | |
| . | 11 | 1101 | 0 | 123 | | | | |
| | 11 | 1101 | 1 | 124 | | | | |
| 38 | 11 | 1110 | 0 | 125 | | | | |
| | 11 | 1110 | 1 | 126 | | | | |
| 39 | 11 | 1111 | 0 | 127 | | | | |
| | 11 | 1111 | 1 | 128 | | | | |

Referring to the above table, the address code contains seven bits, comprising two tens bits, four units bits and an extra bit. The tens and units bits are directly addressable from the keyboard 6.

The tens bits are conventionally coded 0, 1, 2 and 3 in ascending binary code. The units codes are selected to provide extra codes between most of the addressable codes, so that all of the unused binary combinations do not appear in a row. The extra bit is used to supplement these spare codes to provide the facility for indirect addressing. Alternatively, directly addressable codes could be used for this purpose and simply skipped on the lecture map.

Referring to FIG. 2, the first entry in the lecture outline table is given address no. 1. As shown in the above table, this is assigned to the fifth address code, corresponding to the entry decimal 1 on the keyboard. The lecture entry LE1 is the beginning of the lecture. In the illustrated embodiment, that entry had a running time of 1 minute. At the end of that lecture entry, entry point LE2 is located.

Figure 5:
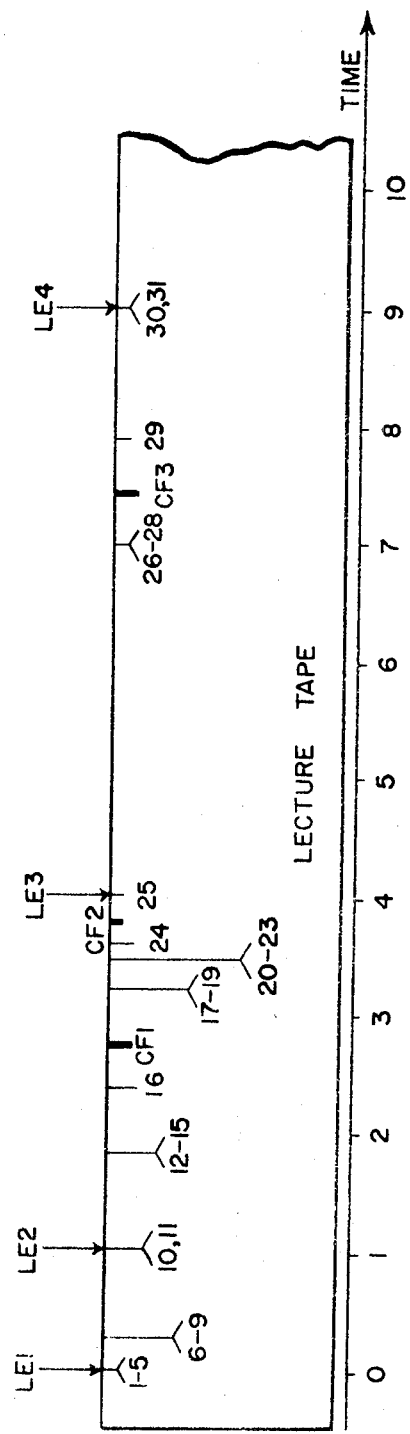
FIG. 5 is a fragmentary plan sketch of a portion of a lecture tape recorded in accordance with the invention and illustrating the location of various recorded items thereon.

Referring to FIG. 5, a diagram of the lecture tape is shown on which the lecture entry points are indicated roughly to scale, with an indication of the manner in which the address code pulses are placed on the tape. Specifically, the beginning of a lecture is designated LE1, and just prior to this point are recorded four pulses corresponding to addresses no. 1 through no. 5. (No pulse is required to set the address register to address no. 1, or binary zero.)

In the interval between lecture entry point 1 and lecture entry point 2, there is recorded the material which may suggest the first question on the lecture map, FIG. 2, having address decimal 2. Referring to the above table, this is the ninth address code. As will appear, it is desired to keep the answer tape at the beginning of the answer to question 1, or at the point labelled Q1 on the diagram of the answer tape in FIG. 6, until the most probable time for asking question 1 in the lecture tape has been reached. For reasons to appear, this is accomplished by placing the first eight address code pulses in sequence just prior to the first entry labelled Q1 on the answer tape. In the interval between lecture entry point 1 and lecture entry point 2, on the lecture tape, address code pulses associated with address nos. 6–9 are recorded, with the eighth pulse occurring where it is desired to begin advancing the lecture tape from the beginning of the answer to the first question because it is becoming more likely that the question will not be asked and that the answer to the next question will be the next one desired.

As indicated in the above table, the answer to question 1 occupies 3 minutes on the answer tape, at playing speed. At the end of the first minute of playing time on the lecture tape, the material suggested by the second topic in the lecture outline on the lecture map of FIG. 2, having address decimal 3, begins. At this point on the lecture tape are recorded in sequence two address pulses that set the lecture address register to addresses no. 10 and no. 11.

Just before the beginning of the answer to the second question on the answer tape, at location Q2, are recorded in close sequence the 9th, 10th, 11th, 12th, 13th and 14th address pulses. As point LE2 on the lecture tape is reached, the apparatus will bring the anwer tape to a point just beyond the point at which the 10th address code pulse is recorded.

The answer tape will wait at that position until the point during the lecture is reached at which it is desired to bring the answer to question 2 into the proximity of the playback heads on the answer tape. At that location on the lecture tape, pulses corresponding to address nos. 12 through 15 are recorded. When the 14th pulse is produced, the answer tape will be advanced to location Q2, and will then begin to move relatively slowly away from that point if there is relatively more tape on the answer tape supply reel than on the lecture tape supply reel.

In general, the answer tape may be longer or shorter than the lecture tape, but will probably be longer. Thus, a typical lecture might require 2 hours of playing time, and be accompanied by six recorded hours of answer and comment material on the answer tape.

As suggested in the table above, the playing time of the various answers to questions and comments, and of the various addressable sections of the lecture, may vary fairly widely. However, it is anticipated that the answer tape will usually get proportionately behind the lecture tape if it is simply brought up to the location of the most probable question that will be asked and then left there until another question becomes more probable. Accordingly, the facility is preferably provided for moving the answer tape away from the answer to one question and towards the answer to the next when the lecture tape goes beyond the point at which the first question will most probably be asked.

In the preparation of the lecture and answer tapes, there is considerable flexibility which can be exercised in locating the code pulses on the lecture tape which call up the various answers. Thus, an answer can be called up before the point in the lecture at which it will probably be required if that will reduce access time when it is required.

Figure 6:
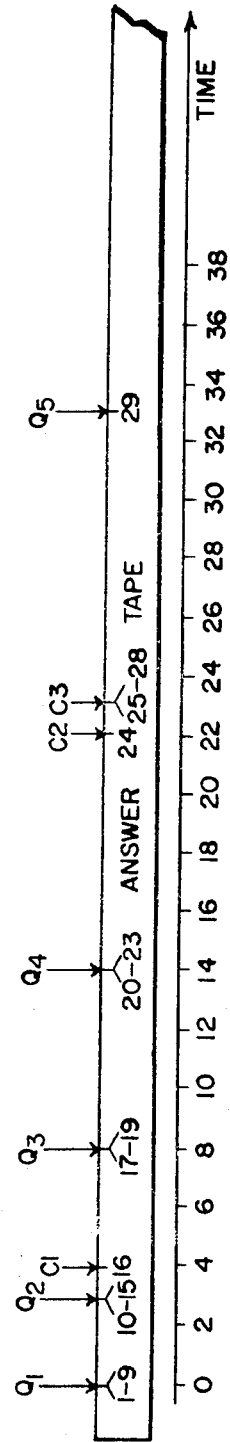
FIG. 6 is a view similar to FIG. 5 on a reduced scale, showing a portion of an answer tape recorded in accordance with the invention and indicating the location of various items of information thereon.

Referring to the above table, and to FIGS. 2 and 6, the next decimal address, 4, is assigned to the answer to question 2 on the lecture map. The answer to that question in the illustrated example has a playing time of one minute. Following this recording is a comment, labelled C1 in the above table and in FIG. 6, that has a playing time of 4 minutes.

The comment is located at address no. 16, corresponding to the 15th address code pulse on the lecture tape. This pulse is located somewhat before the comment flag indication CF1 is recorded on the tape. The comment flag lights the lamp CK and suggests that the comment may be desirable. That allows the answer tape to be brought up to address no. 16, and left waiting there so that it will be immediately accessible if the comment pushbutton CPB is depressed by the student. It is especially desirable to have almost no delay in responding to the depression of this button, as the results are then more impressive to the user.

The answer to the next question, labelled Q3 in the above table and in FIG. 6, has a playing time of 6 minutes. It is located at address no. 19, or decimal address 5 on the keyboard as indicated on the lecture map of FIG. 2. Intermediate spare pulses 17 and 18 may be located anywhere on the lecture tape prior to pulse 19, but after the comment flag designation CF1 has been removed. The reason for this is that if these pulses were placed in the region in which the comment flag light CK was lit, depressing the button CPB would direct the answer tape to the wrong address.

On the answer tape, the spare addresses and lecture entry addresses are required to be located just ahead of the next code pulse for an answer entry address. That is because the first pulse on the answer tape following the beginning of the recording of an answer to a question is used to direct the apparatus to stop the answer tape because the currently requested answer has been played.

Figure 7:
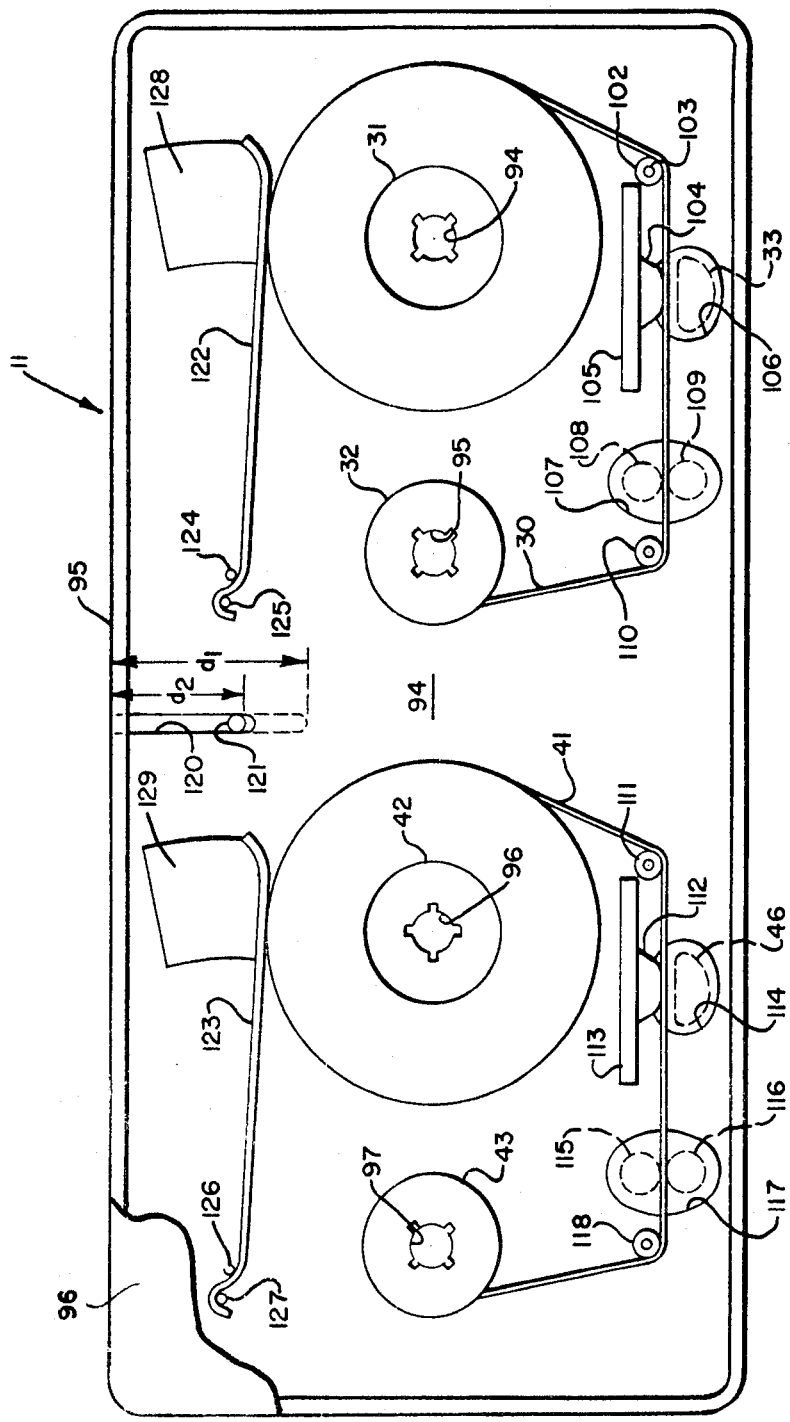
FIG. 7 is a fragmentary schematic plan view, with parts broken away, of a magnetic tape cassette suitable for use in the system of FIGS. 1 and 3.
Figure 8:
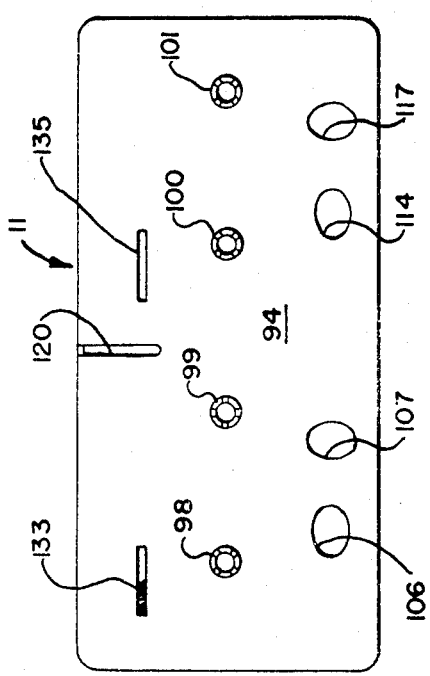
FIG. 8 is a schematic plan view, on a reduced scale, showing the rear side of the apparatus of FIG. 7.

Referring to FIGS. 7 and 8, the cassette 11 may comprise a generally rectangular container, preferably of opaque material such as pigmented plastic, sheet metal, or the like. It comprises a base plate 94 formed integral with sidewalls 95 and a top plate 96.

The supply reel 31 and takeup reel 32 for the lecture tape 30, and the supply reel 42 and takeup reel 43 for the answer tape 41, are rotatably disposed in the cassette 11 by conventional bearing means, not shown, for rotation about relatively fixed axes in the housing. The reels 31, 32, 42 and 43 are provided with central apertures 94, 95, 96 and 97, respectively, shaped to receive drive sprockets to effect the positioning of tape on the reels in a manner to appear. The recesses 94–97 are accessible through ports 98, 99, 100 and 101, respectively, formed in the base plate 94 as shown in FIG. 8.

Referring to FIG. 7, the lecture tape 30 passes from the supply reel 31 over a first idler 102, journaled for rotation in the housing by means schematically indicated as a pin 103. The tape 30 passes from the idler 102 through a playback station at which a pressure pad 104 is resiliently biased against the tape by mounting on a support 105 fixed to the base plate 94. The playback head assembly 33, shown in dotted lines in FIG. 7, is adapted to engage the tape 30, and for that purpose extends upwardly through a port 106 formed in the base plate 94.

The tape 30 extends from the playback station adjacent the pressure pad 104 over a port 107 formed in the base plate 94 through which a drive capstan 108 and a movable idler 109 may protrude into cooperative relationship with the tape 30 when the cassette 11 is installed in the recorder 5. The tape 30 next passes around an idler 110 journaled in the cassette housing in the manner of the idler 102, and from there to the takeup reel 32.

The answer tape 41 is similarly mounted in the housing for movement between its supply reel 42 and its takeup reel 43. As shown, the tape 41 extends from the supply reel 42 around an idler roll 111, and thence past a playback station comprising a pressure pad 112 mounted on a support 113, fixed to the base plate 94. The head array 46 forming a part of the tape recorder 5 may protrude into cooperation with the tape adjacent the pressure pad 112 through a port 114 formed in the base plate 94.

The tape 41 extends beyond the playback station through a drive station at which a drive capstan 115 and a movable idler roll 116 may protrude to engage the tape 41 at times and drive it at constant speed for playback. A port 117 is formed in the base plate 94 to accept the capstan and idler. From the drive station, the tape 41 passes over an idler roll 118, and thence to the takeup reel 43.

The answer tape and the lecture tape will, in general, be of different lengths. Usually, the answer tape will be considerably longer than the lecture tape. If desired, the tapes may be made of different materials, or played back at different speeds, to take these differences into account. However, it is unnecessary to introduce these complexities, as it is preferred not to require any fixed relationship between the lengths of the tapes.

For any particular set of lecture and answer material, there will be a relationship which can be expressed in terms of the ratio of the diameter of the roll of lecture tape on the supply reel when it is full to the diameter of the roll of answer tape on its supply reel when that is full. In the embodiment shown in FIG. 7, once this relationship is established, a slot 120 is milled in the base plate 94 to a maximum depth dl that represents the largest roll of answer tape and smallest roll of lecture tape that can be accommodated. The actual depth d2 of the slot 120 is selected in dependence on the ratio between the diameters of the actual tapes to be accommodated in the particular cassette 11. The slot 120 is adapted to receive a spring-biased follower 121 located in the tape recorder 5, for purposes to appear.

The diameters of the lecture tape and answer tape on their respective supply reels is sensed, as the tapes are moved on and off of the supply reels, by a pair of light resilient arms 122 and 123 that are biased into engagement with the lecture and answer tape, respectively, so that they move relative to the base plate 94 as the diameter of the reels changes. For this purpose, the arm 122 is mounted on the base plate 94 at one end by a pair of pins 124 and 125 secured to the base plate. The arm 123 is similarly engaged by a pair of pins 126 and 127 secured to the base plate 94 to lightly bias it into engagement with the answer tape.

The arm 122 carries a vane 128, and the arm 123 carries a vane 129, each of which is optically coded to produce a signal indicating the current diameter of the reel which it is following. For this purpose, referring to FIG. 9, the side of each of the vanes such as 128 which confronts the base plate 94 is formed with a generally triangular segment 130 of reflective material, such as metal foil or the like. A small region 131 of reflective material is formed at one end of the vanes such as 128. The remaining region 132 of the side of the vane such as 128 that confronts the base plate 94 is made of light absorbing material, as by giving it a matte-black finish.

Figure 9:
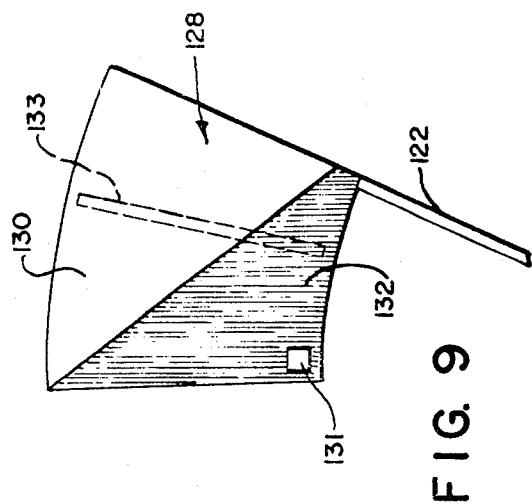
FIG. 9 is a fragmentary schematic sketch, on an enlarged scale, of an indicator vane forming a part of the apparatus of FIG. 7.

Comparing FIGS. 7, 8 and 9, the vane 128 confronts a window slot 133 formed in the base plate 94. Thus, in any particular position of the arm 122, a portion of the window 133 overlies the reflective portion 130 of the vane 128, and the remainder of the window 133 is exposed to the opaque region 132, except at a single location, corresponding to a full supply reel, at which the reflective portion 131 is exposed in the window 133.

The ratio of reflective to light absorbing regions exposed in the window 133 represents the current diameter of the lecture tape on its supply reel. The vane 129 associated with the answer tape is similarly coded, and similarly confronts a window 135 formed in the base plate 94.

The utility of this arrangement will be described in detail for the lecture tape vane 128, with reference to FIG. 10. It should be understood that the answer tape following vane 129 controls a similar arrangement.

Figure 10:
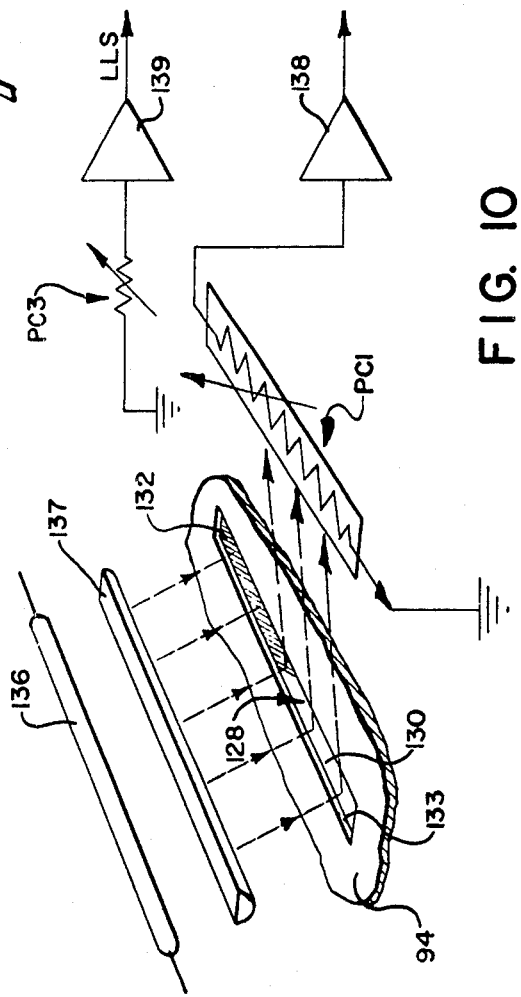
FIG. 10 is a schematic perspective sketch illustrating the cooperation between certain elements of the cassette, including the vane of FIG. 9, with external apparatus in the console of FIG. 1.

Referring to FIG. 10, an elongated light source, such as a neom lamp, schematically shown at 136, is arranged adjacent a cylindrical lens 137 that focuses light from the lamp 136 onto the portion of the surface of the vane 128 that is exposed through the window 133. Over those regions of the vane thus exposed that are covered by the reflective material 130, light is reflected onto a photocell comprising a strip of photosensitive material PC1 that is painted or printed on a suitable insulating substrate.

The photosensitive element PC1 is connected between ground and the active input terminal of an amplifier 138. The amplifier 138 produces an output signal determined by the extent of illumination of the photocell PC1, and therefore determined by the diameter of the lecture tape on the supply reel. The exact functional relationship between the diameter and the output signal may be a proportionality effected by appropriately shaping the segment 130 and the strip PC1, and by conventional design methods applied to the amplifier.

A second photosensitive element PC3, which may be a conventional photocell, is arranged to receive light only when the relfective portion 131 on the vane 128 is exposed in the window 133. The photocell PC3 is connected to the input circuit of an amplifier 139. The amplifier 139 may comprise a threshold network that will produce an output logic level labelled LLS that is positive with respect to ground only when the photocell PC3 is illuminated by reflection from the reflective portion 131.

Figure 15:
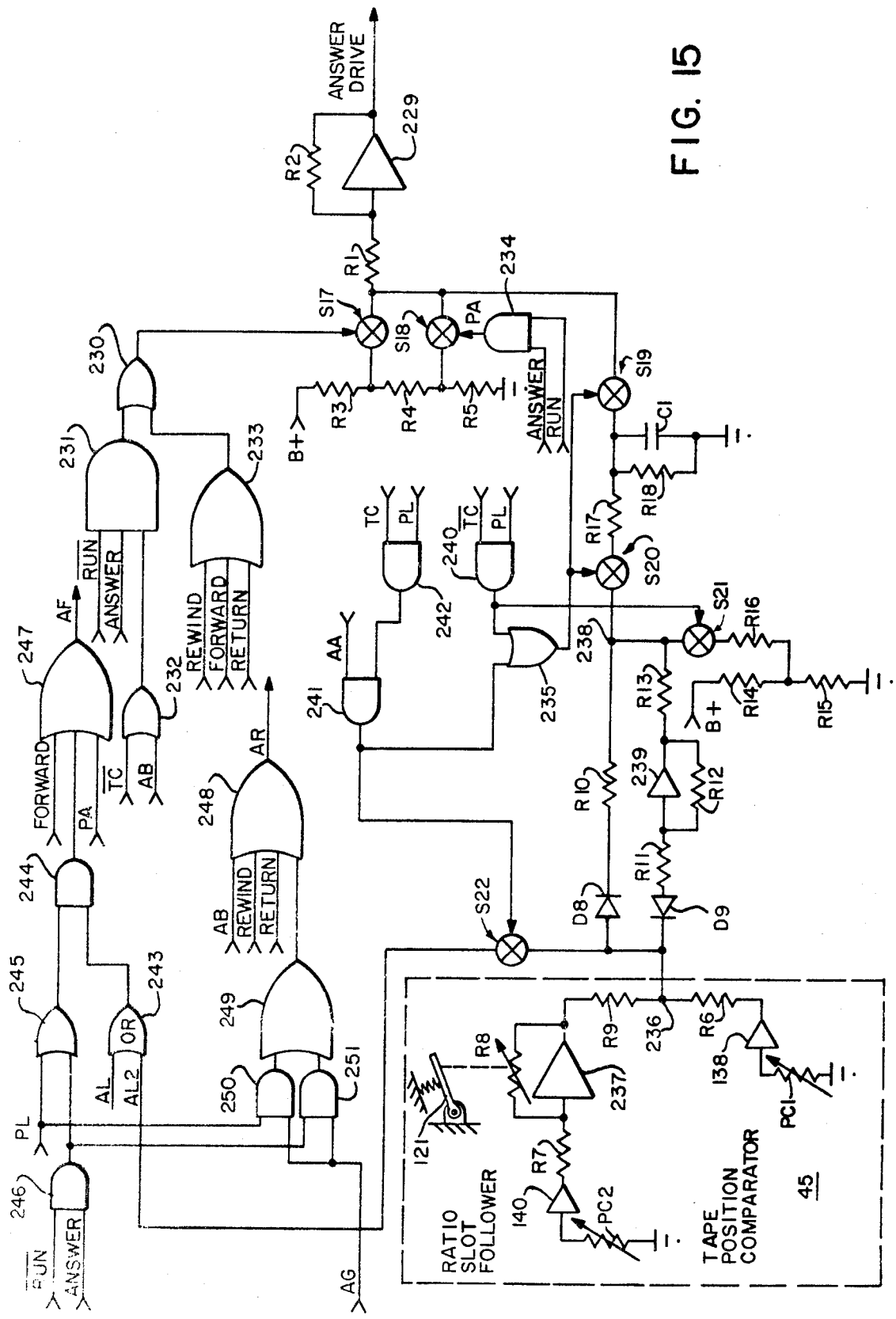
FIG. 15 is a schematic block and wiring diagram of apparatus for controlling the answer tape drive mechanism of FIG. 11.

Referring to FIG. 15, the answer tape is provided with a photosensitive strip PC2 which may be the same as the strip PC1, described above. The strip PC2 is connected to the input circuit of an amplifier 140 to produce an output signal proportional to the diameter of the answer tape on its supply reel. The circuits controlled by the amplifiers 138 and 140 will be described below.

Figure 12:
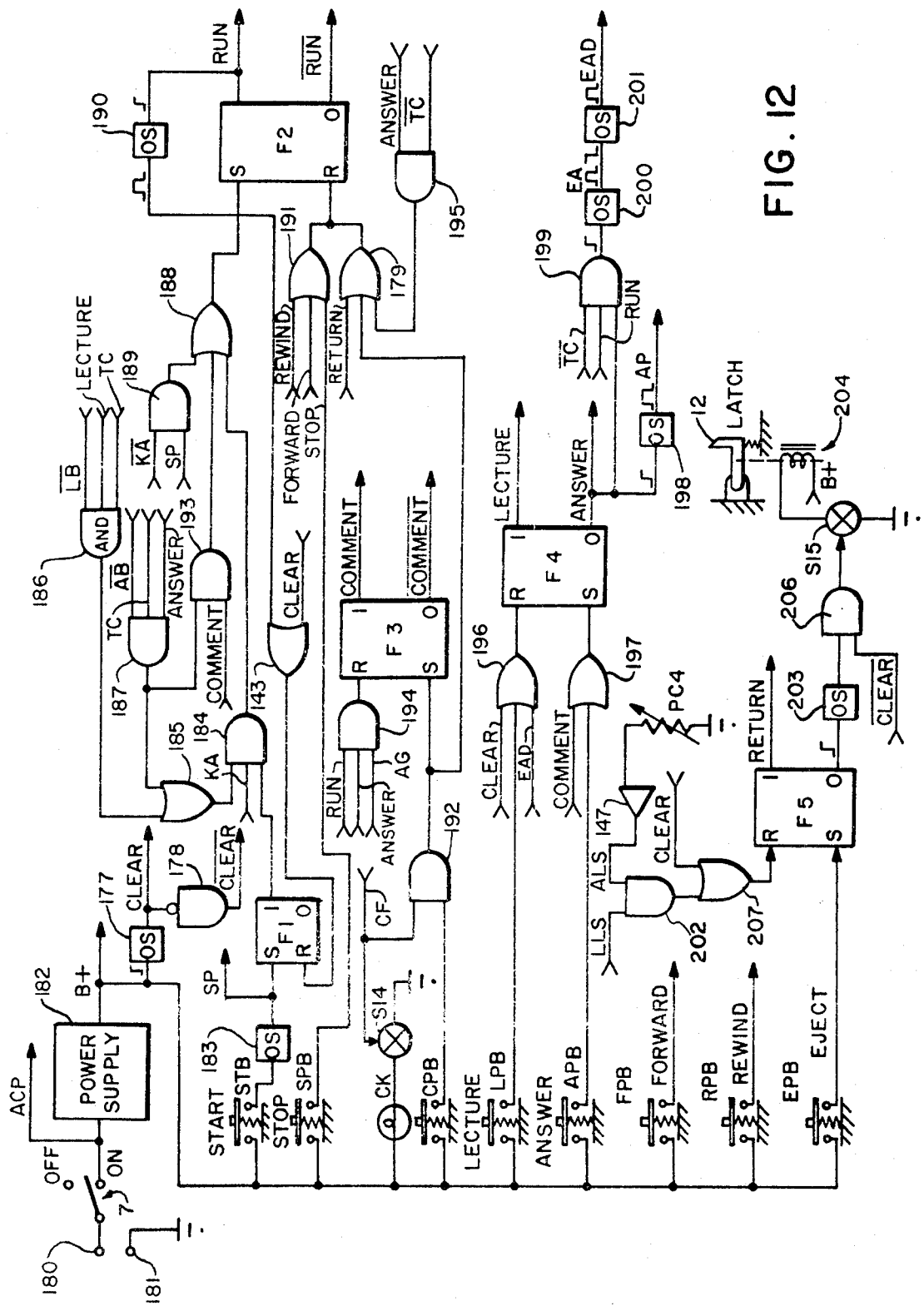
FIG. 12 is a schematic block and wiring diagram of manual control elements forming a part of the console of FIG. 1, and certain circuits controlled thereby, forming a part of the system illustrated in block form in FIG. 3.

Referring to FIG. 12, a photocell PC4 corresponding in structure and function to the photocell PC3 in FIG. 10 is provided for the answer tape to produce an output signal that causes a threshold amplifier 141 to produce a logic level ALS when the answer tape is fully wound on the supply reel. The function of these limit signals LLS and ALS will be described below.

Figure 11:
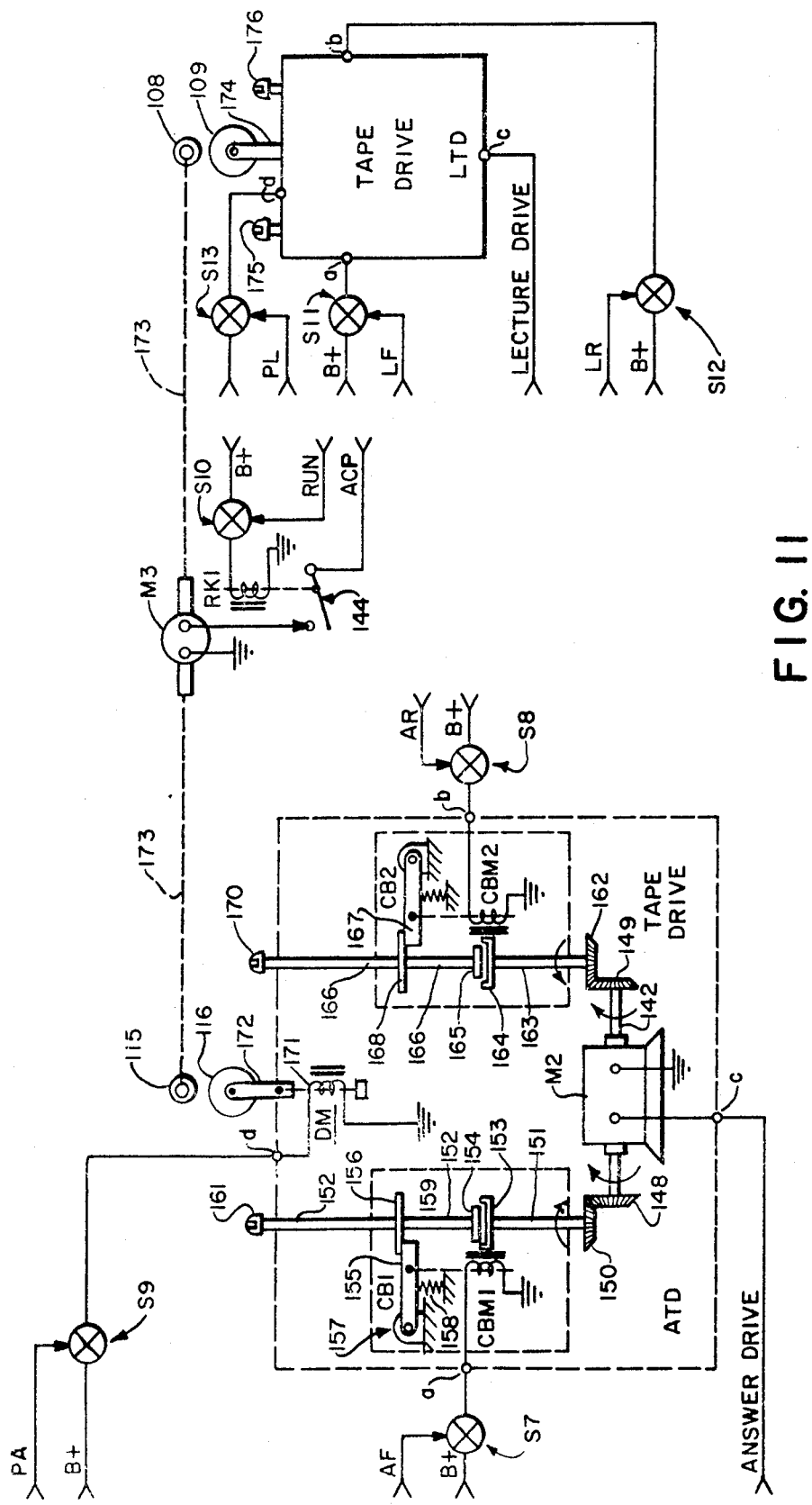
FIG. 11 is a schematic wiring diagram of tape drive apparatus used in combination with the cassette of FIG. 7 in the console of FIG. 1.

Referring to FIG. 11, the drive control means for the lecture and answer tapes in the cassette 11 of FIG. 7 will next be described. Since the drive for the answer tape and lecture tape may be identical, only that for the answer tape will be described in detail, with the drive for the lecture tape being shown substantially in block form in FIG. 11.

The answer tape drive ATD comprises a conventional DC motor M2 arranged to drive an output shaft 142 at a speed approximately proportional to the amplitude of an answer drive current applied to an input terminal labelled c. It will be apparent that the exact speed of the shaft 142 will be influenced by varying load conditions that may be encountered. Accordingly, if desired, a tachometer generator may be connected to the motor shaft 142 to supply a speed control feedback signal that will enable the speed to be more precisely controlled. However, in practice, the purposes served by the motor M2 do not require such accurate control.

Connected to opposite ends of the shaft 142 are a pair of bevel gears 148 and 149. The gear 148 drives a bevel gear 150, affixed to a shaft 151.

The shaft 151 serves as the input shaft of a clutch-brake mechanism CB1 that has an output shaft 152. The clutch-brake CB1 may be any conventional apparatus for drivingly connecting the input shaft 151 to the output shaft 152, or selectively disconnecting the input shaft from the output shaft and lightly braking (not stopping) the output shaft. The purpose of the braking function is to prevent backlash when tape is being pulled off the takeup reel by the supply reel.

As schematically indicated, the shaft 151 is connected at one end to a clutch disc 153 that cooperates with a clutch disc 154 fixed to the output shaft 152. When an electromagnetic winding CBM1 is energized, the clutch discs 153 and 154 are engaged to drivingly, but impositively, connect the input shaft 151 to the output shaft 152. In other words, the clutch, when engaged, serves as a slip clutch that will allow the shaft 152 to follow the capstan drive during playback. When the winding CBM1 is de-energized, a brake arm 155 lightly engages a brake disc 156 on the output shaft 152 to produce torque on the output shaft when it is externally driven.

For this purpose, the arm 155 is pivoted to the frame of the apparatus as indicated at 157, and urged into engagement with the brake disc 156 by a spring 158. An armature 159 is arranged to be attracted by the electromagnet CBM1 when energized, and is connected to the arm 155 to move it out of engagement with the brake disc 156 when the electromagnet CBM1 is energized.

The outer end of the shaft 152 is connected to a drive sprocket 161 that is adapted to engage the aperture 97 in the takeup spool 43 for the answer tape in FIG. 7. When the clutch-brake CB1 is de-energized and the shaft 152 is braked, the tape may be taken from the answer tape takeup reel against the relatively light tension on the answer tape to prevent backlash. When the clutch-brake CB1 is energized, the answer tape is driven from the shaft 151 through the electromagnetic slip clutch, so that it can slip if required for the purposes described above.

The gear 149 is connected to a bevel gear 162 that is fixed to an input shaft 163 of a clutch-brake mechanism CB2. The clutch-brake CB2 may be identical to the clutch-brake CB1 just described. The shaft 163 is driven in the opposite direction from the shaft 151 by the motor shaft 142.

The shaft 163 is connected to a clutch disc 164 adapted to cooperate with a clutch disc 165 fixed to the output shaft 166 of the clutch-brake CB2. The shaft 163 thus drives the shaft 166 when an electromagnetic winding CBM2 is energized. In the de-energized position of the winding CMB2, a brake arm 167 lightly engages a brake disc 168 fixed to the shaft 166. In the energized state of the winding CBM2, the brake arm 167 is disengaged from the disc 168.

The shaft 166 is connected to a drive sprocket 170. The drive sprocket 170 serves to drive the answer tape supply reel 42 by engagement with the recess 96 in FIG. 7.

The clutch-brake winding CMB1 is connected through a terminal $a$ to one load terminal of a conventional electronic switch S7 that has its other load terminal connected to the supply terminal at B+. The switch S7 is closed when a level AF is applied to its control terminal. The signal AF is produced at a positive level with respect to ground at times when it is desired to move the answer tape from the supply reel onto the takeup reel, or in the forward direction.

Similarly, the winding CBM2 is connected between grorund and a terminal $b$. The terminal $b$ is connected to one load terminal of an electronic switch S8 that has its other load terminal connected to the supply terminal at B+. The switch S8 is closed when a signal AR is applied to its control terminal. The signal AR is produced at a positive level with respect to ground when it is desired to move the answer tape onto the supply reel, or backwards.

During the playing of a tape segment, it is desired to move the tape at constant speed. For this purpose, the answer tape drive mechanism includes a solenoid DM having a winding 171 connected between ground and a terminal $d$ that is connected to one terminal of a conventional electronic switch S9. The other load terminal of the switch S9 is connected to the battery supply potential at B+.

The control terminal of the switch S9 is connected to receive a signal PA, produced at a positive level with respect to ground when it is desired to play the answer tape. The armature of the solenoid DM is connected to an arm 172 on which the idler 116, described above in connection with FIG. 7, is journaled.

The idler 116 may have a surface of friction material, and when the solenoid is energized, is urged into engagement with the capstan 115. When the answer tape is gripped between the capstan 115 and the idler 116, it is driven at a speed dependent on the speed of rotation of the capstan 115. At the same time, the signal AF is supplied to the switch S7 to engage the clutch in the clutch-brake CB1, to attempt to drive the sprocket 161 at a speed faster than the speed established by the capstan 115. That maintains takeup tension on the answer tape. The brake 167 is engaged at this time so that the shaft 166 slips against the brake to produce a tension on the supply reel that prevents backlash.

The capstan 115 is connected to the output shaft 173 of a conventional alternating current synchronous motor M3. The motor M3 is adapted to be supplied with alternating current at constant frequency from a conventional line source. Power for this purpose is available on a lead labelled ACP when the apparatus is turned on. From the terminal labelled ACP, alternating current is supplied over a front contact 144 of a relay RK, closed when the relay is energized, and thence through the winding of the motor M3 to ground. The relay RK has a winding connected between ground and the supply terminal at B+ through a conventional electronic switch S10 that is closed when a signal labelled RUN is applied to its control terminal.

The output shaft 173 of the synchronous motor M3 is also connected to drive the capstan 108 for the lecture tape. The capstan 108 is selectively engaged with the lecture tape by control of the idler 109, which is positioned by an arm 174 in the manner described above in connection with the idler 116 and its positioning arm 172.

The lecture tape drive LTD has a control terminal $a$ corresponding to the terminal $a$ of the answer tape drive ATD, to supply current for driving the lecture tape in the forward direction. Current is supplied to this terminal $a$ at times when an electronic switch S11 is closed.

The switch S11 is closed to supply current from the supply terminal at B+ to control terminal *a* of the tape drive LTD when a level LF is present. The signal LF is produced in a manner to be described at times when it is desired to move the lecture tape forward.

When the switch S11 is closed, a sprocket 175 is driven. The sprocket 175 is adapted to engage the aperture 95 in the lecture tape takeup reel 32 in FIG. 7.

A second drive sprocket 176 is provided for the lecture tape drive LTD in FIG. 11. The sprocket 176 is adapted to engage the aperture 94 in the lecture tape supply reel 31.

The sprocket 176 is driven when energizing current is supplied to the input terminal *b* of the tape drive LTD. This terminal corresponds to terminal *b* of the answer tape drive ATD. Current is supplied to the input terminal *b* from the supply terminal at B+ when an electronic switch S12 is closed. THis switch is closed when a signal LR is applied to its control terminal. The signal LR is produced at times when it is desired to move the answer tape onto the supply reel, or backwards.

The speed of the selected lecture tape drive sprocket 175 or 176 is determined by the amplitude of a lecture drive current signal applied to the input terminal *c* of the tape drive LTD, in the manner and for the purpose described above for the control of the answer tape drive motor M2.

A shaft 174 is moved to engage the lecture tape between the idler 109 and the capstan 108 when current is applied to an input terminal *d* of the tape drive LTD. Terminal *d* is connected to the supply terminal at B+ through a conventional electronic switch S13 that is closed when a signal labelled PL is applied to its control terminal. The signal PL is produced in a manner to be described at times when it is desired to play the lecture tape.

The circuits directly controlled by the pushbuttons on the tape recorder 5 in FIG. 1 will next be described with reference to FIG. 12.

A conventional source of alternating voltage, for example 120 volts at 60 Hz, is adapted to be connected to two input terminals 180 and 181 to provide power for the apparatus. The terminal 180 is connected over the "On/Off" switch 7 to a lead on which the AC power signal ACP appears, and to the input terminal of a conventional power supply 182 which develops a DC potential B+ with respect to ground when the power supply is energized.

The terminal at B+ is connected to one terminal of each of the pushbuttons on the panel. The rising leading edge of the supply voltage B+, occurring when the switch 7 is first closed, triggers a one-shot multivibrator 177 to produce a CLEAR pulse, for purposes to appear. A conventional NOR gate 178 inverts the signal from the multivibrator 177 to produce a $\overline{CLEAR}$ signal, for purposes also to be described.

The "Start" pushbutton STB has its other terminal connected to the trigger input terminal of a conventional one-shot multivibrator 183. When triggered by momentary depression of the "Start" pushbutton STB, the multivibrator 183 produces a pulse labelled SP which serves, among other things, to set a conventional flip-flop F1.

When set, a logic 1 signal appears at the logic 1 output terminal of the flip-flop F1. This signal is applied to one input terminal of a three-input terminal AND gate 184. A second input terminal of the gate 184 receives a signal KA, produced in a manner to be described when it is desired to enter either the lecture tape or the answer tape from the keyboard. A third input terminal of the gate 184 receives the output signal from an OR gate 185.

THe gate 185 produces a logic 1 output signal when a logic 1 signal is applied to either of its input terminals. One input terminal of the gate 185 is connected to the output terminal of an AND gate 186. The gate 186 produces a logic 1 output signal when all of its three input signals receive logic 1 signals, labelled $\overline{LB}$, LECTURE and TC, respectively. These signals are produced in a manner to be described when an address on the lecture tape has been selected from the keyboard and reached while the tape is moving in the proper direction to enter the address from the beginning.

A second input terminal of the gate 185 is connected to the output terminal of an AND gate 187. This gate produces a logic 1 output signal when three signals $\overline{AB}$, TC and ANSWER are all present at logic 1. These signals are produced in a manner to be described when an address on the answer tape has been requested and reached on the tape from the proper direction. The gate 184 thus produces a logic 1 output signal at times when an address has been requested from the keyboard and that address is reached on either the lecture or the answer tape.

The output signal from the gate 184 is applied to one input terminal of an OR gate 188. A second input terminal of a gate 188 is connected to the output terminal of an AND gate 189. The gate 189 produces a logic 1 output signal when two signals labelled $\overline{KA}$ and SP are present at logic 1. The signal SP is produced by the multivibrator 183 when the "Start" pushbutton STP is momentarily depressed, and the signal $\overline{KA}$ is present when the keyboard is not in use. A third input terminal of the gate 188 is connected to the output terminal of an AND gate 193, to be described.

The output terminal of the OR gate 188 is connected to the set input terminal of a conventional flip-flop F2 is set to produce a signal labelled RUN at its logic 1 output terminal at times when it is desired to play either the lecture or the answer tape.

The rising leading edge of the signal RUN triggers a conventional one-shot multivibrator 190 to produce a pulse that resets the flip-flop F1 through an OR gate 143. The gate 143 also receives the CLEAR pulse.

The purpose of the flip-flop F1 is to store the start signal given by momentary depression of the pushbutton STB until the proper address has been reached. The RUN signal can then be produced and begin playing the desired material.

The "Stop" pushbutton SPB is connected to one input terminal of an OR gate 191. The gate 191 is provided with three input terminals, and produces an outward signal to reset the flip-flop F2 and produce a signal labelled $\overline{RUN}$ when any of the input terminals are at logic 1. In particular, when the "Stop" pushbutton SPB is momentarily depressed, the flip-flop F2 will be reset. Other signals which reset the flip-flop F2 will be described below.

The lamp CK on the recorder control panel is connected between the supply terminal at B+ and ground through a conventional electronic switch S14. The switch S14 is closed when a comment flag signal CF is applied to its control terminal.

Referring again to FIG. 4, the signal CF is produced by the multivibrator 66 when it appears on the lecture tape and the lecture tape is being played. The signal CF will be present, causing the lamp CK to be illuminated, for a selected period, such as 5 or 10 seconds, during which the student may respond by momentarily depressing the pushbutton CPB.

As shown in FIG. 12, the comment flag signal CF is applied to one input terminal of an AND gate 192. Another input terminal of the gate 192 is connected to the pushbutton CPB.

When the comment flag signal CF is present, and the pushbutton CPB is momentarily depressed, the gate 192 produces a logic 1 output signal that resets the flip-flop F2 through an OR gate 179, and also sets a flip-flop F3. When set, the flip-flop F3 produces a signal labelled COMMENT at its logic 1 output terminal. The flip-flop F3 is arranged to be reset, to produce a $\overline{\text{COMMENT}}$ signal at its logic 0 output terminal, by an AND gate 194.

When a COMMENT signal is produced, it enables an AND gate 193 that has its output terminal connected to a third input terminal of the OR gate 188. A second input terminal of the gate 193 is connected to the output terminal of the gate 187. Thus, when the COMMENT signal is produced and the answer tape is at the correct address which it has reached from the right direction, a state to which it would normally have been previously set by the location of the answer address on the lecture tape prior to the presence of the comment flag signal CF, the flip-flop F2 will be set to re-establish the RUN mode of operation.

The GATE 194 produces a logic 1 output signal to reset the flip-flop F3 when three signals labelled RUN, ANSWER and AG are present. These signals are produced when the answer tape has played the current request, and an address on the answer tape is reached which is greater than the address of that answer. At the same time, the flip-flop F2 is reset by an AND gate 195 in response to two signals labelled ANSWER and $\overline{\text{TC}}$. These signals cause the gate 195 to produce a logic 1 signal that resets the flip-flop F2 through the OR gate 179.

The lecture push button LPB is connected to one input terminal of an OR gate 196. A second input terminal of the gate 196 receives a signal labelled EAD produced in a manner to be described. A third input terminal of the gate 196 receives the CLEAR pulse. When the gate 196 produces a logic 1 output signal, it sets the flip-flop F4 to produce a signal labelled LECTURE at its logic 1 output terminal.

The flip-flop F4 is arranged to be reset by an OR gate 197. The gate 197 produces a logic 1 output signal to reset the flip-flop F4 when either the COMMENT signal is present, or when the answer push button APB is momentarily depressed.

When the flip-flop F4 is reset to produce a signal ANSWER, the leading edge of that signal triggers a one-shot multivibrator 198 to produce a pulse labelled AP, used elsewhere in the apparatus for purposes to be described. At the same time, the ANSWER signal is applied to one input terminal of an AND gate 199. Other input terminals of the gate 199 receive the signals $\overline{\text{TC}}$ and RUN.

All of these signals are present at logic 1 after an answer has been played on the answer tape and the next address is reached. When that occurs, the gate 199 triggers a one-shot multivibrator 200 to produce a pulse labelled EA, used elsewhere in the apparatus for purposes to be described. The trailing edge of the pulse EA triggers another one-shot multivibrator 201 to produce the pulse labelled EAD that resets the flip-flop F4 through the gate 196.

The forward and rewind push buttons FPB and RPB produce signals labelled FORWARD and REWIND that appear elsewhere in the apparatus. In the circuits for FIG. 12, either of these signals will reset the flip-flop F2 through the gate 191.

The eject push button EPB produces a signal labelled EJECT to set a flip-flop F5. When set, the flip-flop F5 produces a signal labelled RETURN at its logic 1 output terminal. This signal performs various functions; in the apparatus of FIG. 12, it resets the flip-flop F2 through the gate 179. The flip-flop F5 is arranged to be reset by an OR gate 207. The gate 207 receives the CLEAR pulse, and the signal at the output terminal of an AND gate 202.

The gate 202 produces a logic 1 output signal when both of the limit signals LLS and ALS are produced. It will be recalled that these signals are produced when the lecture and answer tapes are both fully wound on their supply reels.

When the flip-flop F5 is reset, the rising signal at its logic 0 output terminal triggers a multivibrator 203 to produce a pulse that closes an electronic switch S15 through an AND gate 206, enabled by the signal $\overline{\text{CLEAR}}$, to complete an energizing circuit for a solenoid 204. When energized, the solenoid 204 releases the spring loaded latch 12.

Referring to FIG. 1, the eject springs, not shown, may be mounted in the recorder 5 in the well 110 that is adapted to receive the cassette 11, to tend to eject the cassette from the well except when retained by the latch 12. Thus, release of the latch 12 will cause the cassette to be raised slightly out of the well in the recorder 5 and presented for retrieval by the user.

The address control circuits will next be described, with reference to FIG. 13. The comparator 39 in FIG. 13 may comprise a conventional group of gate circuits arranged to compare a seven bit digital address, applied to a set of seven input terminals collectively designated T1, with a seven bit digital address signal applied to a second set of seven input terminals collectively designated T2, and to produce a signal labelled AL at logic 1 if the signal on leads T1 is less than the signal on lead T2. Similarly, gates are provided to produce a signal labelled AG when the address code applied to the terminals T1 is greater than the code applied to the terminals T2. An OR gate 209 receives the signals AL and AG and produces a signal labelled $\overline{\text{TC}}$ when either AL or AG is present. A NOR gate 210 receives the signals AL and AG and produces a signal labelled TC when neither AL nor AG is present.

As noted above, the lecture address register 49 and the answer address register 50 each comprise a seven bit reversible binary counter. The keyboard address register 51 may comprise six flip-flops, arranged to be loaded from the keyboard in a manner to be described, to produce a six bit address code. When this code is applied to the comparator in a manner to be described, the seventh bit will automatically be assigned "0" so that spare address codes having the extra bit 1 will not agree with the current keyboard address.

The answer address register 50 is never connected to the terminals T2 of the comparator 39, and the keyboard address register 51 is never connected to the terminals T1. However, the lecture address register 49 may be connected to either terminals T1 or T2 under different conditions of operation.

The seven stages of the answer address register 50 each have an output terminal connected to an input terminal of a different one of seven AND gates 211. A second input terminal of each of the gates 211 is connected to the output terminal of an OR gate 212. The OR gate 212 produces a logic 1 output signal enabling the gates 211 in response to either the RUN signal or the ANSWER signal.

The output terminals of the gates 211 are connected to the input terminals T1 of the comparator 39. Thus, the only time that the answer address register 50 is not connected to the terminals T1 is in the LECTURE mode when the RUN signal is absent. Under those conditions, the lecture address register and the keyboard address register are connected to the comparator 39.

For that purpose, the seven stages of the lecture address register 49 each have a terminal connected to one input terminal of a different one of a set of seven AND gates 213. The second input terminal of each of the gates 213 is connected to the output terminal of an AND gate 214 that receives the signals $\overline{RUN}$ and LECTURE. The output terminals of the gates 213 are connected to the terminals T1 of the comparator 39.

When the lecture tape is being played, the answer tape follows it, either under digital control, as directed by the address codes called up on the lecture tape, or under analog control, when it is at a directed address in the answer field and is being moved toward the next address. When the lecture tape is being played, the signal PL is present. This signal is applied to one input terminal of each of seven AND gates 215. A second terminal of each of the gates 215 is connected to a different one of the seven output terminals of the register 49. The output terminals of the gates 215 are connected to the seven input terminals T2 of the comparator 39.

A decoder 216 is connected to the six highest ordered stages of the address register 49. The decoder 216 may comprise any conventional array of gates designed to produce an output signal on two of fourteen leads selecting a two-digit decimal address for a conventional lecture address indicator 9.

The decoder 16 is preferably designed to interpret any address in a lecture entry field as the lecture entry address. Specifically, referring to the above table, the recorder would ignore the extra bit in the address, and interpret any address between 0001010 and 0001101 as decimal 3. Similarly, it would interpret any address between 0001110 and 001001 as decimal 4. The address indicator 9 could, of course, be arranged to indicate all addresses, but is primarily intended to indicate to the user the current lecture field with reference to the lecture map.

The keyboard address register 51 is connected to the terminals T2 of the comparator 39 except during RUN, FORWARD, REWIND, or COMMENT operations. For that purpose, the six stages of the keyboard register are each connected to one input terminal of a different one of six AND gates 217. The second input terminal of each of the gates 217 receives the output signal from an AND gate 218. The gate 218 has one terminal connected to receive the level $\overline{COMMENT}$, and a second input terminal connected to the output terminal of an OR gate 219. The gate 219 produces a logic 1 output signal in response to either the ANSWER signal or to a logic 1 signal from a NOR gate 220. The NOR gate 220 receives the signals RUN, FORWARD and REWIND.

Figure 14:
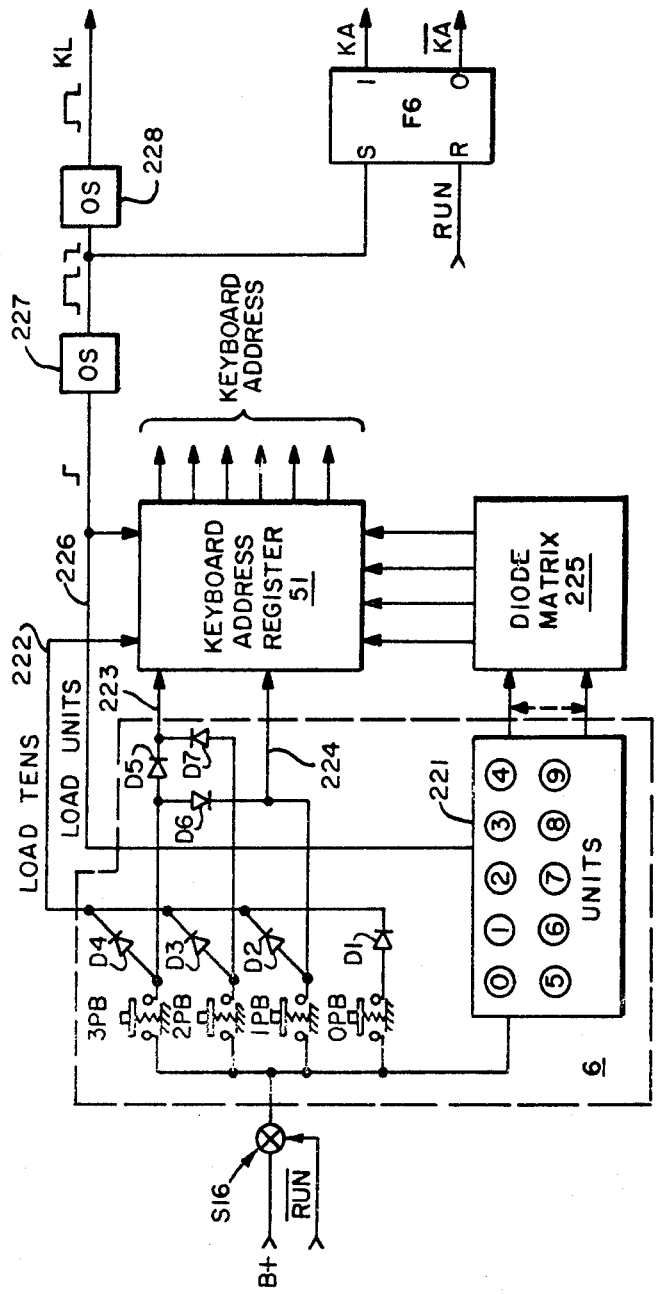
FIG. 14 is a schematic block and wiring diagram showing circuits interconnecting a keyboard forming a part of the console of FIG. 1 and one of the address registers forming a portion of the circuit of FIG. 13.

FIG. 14 shows the manner in which the keyboard 6 is connected to the keyboard address register 51. As shown, the keyboard is enabled when an electronic switch S16 is closed by the $\overline{RUN}$ signal applied to its control terminal to apply the supply potential B+ to the pushbuttons of the keyboard 6. The circuits for the tens pushbuttons 0PB, 1PB, 2PB, and 3PB are shown in detail, and the units pushbuttons 221, shown in block form, may be assumed to be correspondingly wired, in accordance with the codes set out in the above table.

Specifically, each of the pushbuttons 0PB through 3Pb is connected through a different one of a set of diodes D1 through D4 to a lead 222 on which a pulse labelled "LOAD TENS" appears when any of the pushbottons is depressed. This pulse serves to load a tens address into the keyboard address register 51 on leads 223 and 224 when any of the buttons 0PB through 3PB is momentarily depressed.

The particular signal on the leads 223 and 224 depends on which of the pushbuttons is depressed. Specifically, the pushbutton 0PB only produces a LOAD TENS signal, and the corresponding signal on leads 223 and 224 is binary 0. When the pushbutton 1PB is depressed, a logic 1 signal is applied to the lead 224 and a logic 0 signal is applied to lead 223. When the pushbutton 2PB is depressed, a logic 1 signal is applied to the lead 223 through a diode D7, and no signal is applied to the lead 224. When the pushbutton 3PB is depressed, logic 1 signals are applied to both the leads 223 and 224 through a pair of diodes D5 and D6.

The diodes D5, D6 and D7 are representative of a diode matrix, of conventional design, and a corresponding diode matrix 225, wired in accordance with the table above, is provided for the units decade 221 to respond to the depression of any of the units pushbuttons labelled 0-9 to store a corresponding code in the keyboard address register 51. Loading of these digits is accomplished in response to a LOAD UNITS signal produced on a lead 226 in the same manner as the LOAD TENS signal is produced on the lead 222, in response to the depression of any of the units pushbuttons labelled 0 through 9.

When any of the available keyboard addresses between 0 and 39 is entered in the keyboard 6, a pulse on the lead 226 is produced. The leading edge of this pulse triggers a conventional one-shot multivibrator 227 to produce an output pulse of a duration sufficient to allow the comparator 39 to produce a stable output signal.

At the trailing edge of the pulse from the multivibrator 227, a one-shot multivibrator 228 is triggered to produce a delayed output pulse labelled KL. This pulse is used to test the comparator output and determine whether the apparatus should be conditioned to run the selected tape backwards, because it has been asked to go either to the current address or to a previous address, so that operation will continue until the selected tape has reached the desired address while running forward, and thus stop at the beginning of the requested field.

The output signal pulse from the multivibrator 227 sets a flip-flop F6, causing it to remove a level $\overline{KA}$ from its logic 0 terminal and produce a level KA at its logic 1 terminal. This signal KA is used to instruct the apparatus that it is in the keyboard address mode. The flip-flop F6 is reset by the RUN signal produced after the desired keyboard address has been reached with the apparatus running in the proper direction.

FIG. 15 shows the control circuits for the answer tape drive ATD in FIG. 11. These circuits produce the signals AF and AR which determine the direction in which the answer tape is to move, and the ANSWER DRIVE current signal proportional to the speed at which the sprockets are to be driven. The ANSWER DRIVE signal is supplied by an amplifier 229 having an input resistor R1 and a feedback resistor R2 selected to produce an output voltage that will supply current to the answer tape drive motor at a rate dependent on the magnitude of an input signal applied to the resistor R1. The selected speed is determined by five electronic switches S17, S18, S19, S20 and S21.

Two fixed speed signals are provided by a potential divider comprising three resistors R3, R4 and R5 connected in series between the supply terminal at B+ and ground. The swtich S17 has its load terminals connected between the junction of the resistors R3 and R4 and the input terminal of the resistor R1 to apply a constant fast speed signal to the amplifier 229 when the switch is closed. This speed is used for manual fast forward and rewind operations, for automatic rewind, and during keyboard addressing. It is also employed to return the ANSWER tape to the beginning of a field if it has entered it from ahead.

The control terminal of the switch S17 is connected to the output terminal of an OR gate 230 such that the switch S17 is closed when the gate 230 receives the output signal from an AND gate 231 or from an OR gate 233. Two terminals of the AND gate 231 receive the signals $\overline{RUN}$ and ANSWER. A third terminal of the gate 231 receives the output signal from an OR gate 232. The gate 232 receives the signals $\overline{TC}$ and AB. The signal AB is produced in a manner to be described when a tape has reached a directed address from a later address.

A second input terminal of the gate 230 is connected to the output terminal of the OR gate 233. This gate produces an output signal at logic 1 in response to any of the signals REWIND, FORWARD and RETURN.

The switch S18 is connected to the junction of the resistors R4 and R5 to apply a signal to the resistor R1 that will direct a relatively slow speed, slightly greater than the drive speed of the capstan, for playing the answer tape. The control terminal of the switch S18 receives a signal PA, produced by an AND gate 234 in response to the signals ANSWER and RUN.

The switches S19 and S20 are controlled in parallel by an OR gate 235 having an output terminal connected to the control terminals of the switches S19 and S20. When closed, these switches apply a variable voltage to the amplifier 229 that changes in dependence on the difference in the relative diameters of the answer tape on its supply reel and of the lecture tape on its supply reel. These diameters are sensed by the photocells PC1 and PC2, described above.

The amplifier 138 produces a signal determined by the extent of illumination of the photocell PC1 that measures the diameter of the lecture tape. This signal is supplied through a summing resistor R6 to a first summing junction 236. The amplifier 140 produces a voltage varying in accordance with the diameter of the answer tape, and this voltage is supplied through an input resistor R7 to an operational amplifier 237 having a variable resistor R8 in a feedback path that determines the gain of the amplifier 237 in dependence on the extent of its adjustment.

The resistor R8 is controlled by the ratio slot follower 121 mentioned above in connection with FIG. 7. The resistor R8 is adjusted in dependence on the depth of the slot 120 in FIG. 7 by the extentn to which the spring biased follower 121 moves before it reaches the end of the slot. The resistors R7 and R8 are selected to make the output voltage of the amplifier 237 equal in magnitude and opposite in polarity to the voltage produced by the amplifier 138 when the same proportion of the total tape length is on the answer supply reel as is on the lecture supply reel.

For example, assume that the supply reels for both the lecture and answer tape were 1 inch in diameter, and that lecture tape had a full diameter on the supply reel of 5 inches, whereas the lecture tape had a full diameter of 3 inches. The amplifier 237 would have its gain adjusted so that its output voltage moved from the maximum voltage to 0 when the answer tape moved from 5 inches to 1 inch in diameter on the supply reel, and the amplifier 138 would change in voltage from the same maximum amplitude (but of opposite polarity) to 0 as the lecture tape moved from 3 inches to one inch in diameter on the supply reel.

The signal at the summing junction 236 is applied to an absolute value network, here shown as a first path effective when the signal terminal 236 is positive with respect to ground and extending from the anode to the cathode of a diode D8, and through a resistor R10 to a second summing junction 238. A second path, effective when the signal of the terminal 236 is negative, extends from the cathode to the anode of a diode D9, and thence through a unity gain amplifier 239 having an input resistor R11 and a feedback resistor R12 selected to produce an output signal from the amplifier 239 that is opposite in polarity and equal in amplitude to the signal at the junction 236. The signal from the amplifier 239 is applied through a second summing resistor R13 to the summing junction 238. Thus, the signal at the junction 238 will be proportional to the ampliitude of the signal at the junction 236 but always positive in polarity.

When the answer tape is to be moved from a requested address under analog control, while the lecture tape is being played, it is desired to reduce the drive speed to zero as the lecture tape and answer tape come into parity in terms of their diameters on the supply reel. On the other hand, for rapid access when under digital control and seeking a requested address, it is desired to run the answer tape at a minimum speed that is only moderately affected by the difference in diameters of the lecture and answer tape on their supply reels.

The reason for including any component of the signal that is determined by the diameter difference is to take care of the occasional case where it may be necessary to move through a very long answer field, at a higher speed than would be desirable for routine tape transport. The diameter sensitive component cannot be a major component of the signal, because at times it may be desired to move fairly rapidly even though the relative diameters of the tapes are the same. And the sign of the diameter signal is not taken into account under these conditions, because a requested address may be either proportionately ahead of or behind the lecture tape on the answer tape.

In order to secure a rapid minimum speed that is preferably higher than the fast rewind or fast forward speeds, a fixed signal component is supplied to the summing junction 238 by the switch S21. The switch S21 is closed when an AND gate 240 applies a logic 1 signal to its control terminal in response to the presence of both of the signals $\overline{TC}$ and PL. When the switch S21 is closed, a fixed potential is supplied to the summing junction 238 from the junction of a pair of resistors R14 and R15 connected between the positive supply terminal at B+ and ground, and thence through a summing resistor R16 and the load terminals of the switch S21 to the summing junction 238.

When the switches S20 and S19 are closed, the signal at the junction 238 is applied to a delay network comprising a resistor R17 connected in series with a capacitor C1. A resistor R18 is connected in parallel with the capacitor C1. When the switches S19 and S20 are closed, the voltage across the capacitor C1 builds up from ground potential, and thus gradually applies a higher signal to the amplifier 229. The purpose of this gradual application of the signal is to allow the tape to be accelerated gradually so that a higher transport speed can be reached without undue stress on the tape.

In order to bring the tape to a stop at the correct place, the switches S19 and S20 are closed while the capacitor C1 is still fully charged, so that the drive current thus gradually applied to the motor is abruptly cut off. The stresses imposed upon deceleration of the tape are not as great as upon acceleration, because when the tape is accelerated one reel is started and the other reel is then moved against its brake by tension from the first reel. When both reels are in motion and the drive force is removed, the forces produced tend to be more uniform.

The OR gate 235 has one input terminal connected to the output terminal of the AND gate 240. A second input terminal of the gate 235 is connected to the output terminal of an AND gate 241. The gate 241 receives the answer address signal AA from the level detector 64 in FIG. 4, which is present when the answer tape is in an answer address field. The second input terminal of the gate 241 is connected to the output terminal of an AND gate 242 that receives the signals TC and PL. The gate 242 produces an output signal when the lecture tape is being played and the answer tape is at the requested answer address. That directs the apparatus to move the answer tape toward a position of parity with the lecture tape as determined by the relative diameters on the supply reels. The purpose of that arrangement is to allow the answer tape to move away from a directed address by greater distances as it becomes more probable that the next answer will be the one requested.

The output terminal of the gate 241 is connected to the control terminal of an electronic switch S22, to close the switch when a logic 1 signal is produced by the gate 241. The switch S22 connects the summing junction 236 to one input terminal of an OR gate 243. The gate 243 also receives the signal AL from the comparator 39.

The gate 243 thus produces a logic 1 output signal either when the comparator registers an answer address less than the desired address, or when the switch S22 is closed and the signal at the terminal 236 is positive with respect to ground. The output terminal of the OR gate 243 is connected to one input terminal of an AND gate 244.

A second terminal of the gate 244 is connected to the output terminal of an OR gate 245. The gate 245 receives the signal PL, produced in the lecture mode when the RUN signal is present, and also receives the signal at the output terminal of an AND gate 246. The gate 246 receives the signals $\overline{RUN}$ and ANSWER.

The gate 244 has an output terminal connected to one input terminal of an OR gate 247. Other input terminals of the gate 247 receive the signals FORWARD and PA. The output terminal of the gate 247 produces the signal AF that directs the answer tape to move in a forward direction. That will occur either when fast forward is requested, when the answer is being played, when a keyboard address is requested in the answer mode, or when the lecture is being played and the answer address is below the requested address.

The signal AR that directs the answer tape to run backwards, or onto the supply reel, is produced by an OR gate 248. This gate receives signals AB, REWIND and RETURN, and also receives the signal appearing at the output terminal of an OR gate 249.

The gate 249 has one input terminal connected to the output terminal of an AND gate 250, and another input terminal connected to the output terminal of an AND gate 251. Both the gates 250 and 251 are enabled by the signal AG, produced by the comparator when the current answer address is greater than a requested address. A second input terminal of the gate 250 receives the signal PL, and a second input terminal of the gate 251 receives the signal occurring at the output terminal of the gate 246. The signal AR is thus produced when it is desired to return the answer tape to the beginning of an answer field, when either the REWIND or EJECT pushbuttons are depressed, or when the current answer address is greater than the requested address and either the lecture tape is being played or a keyboard address is being requested.

Figure 16:
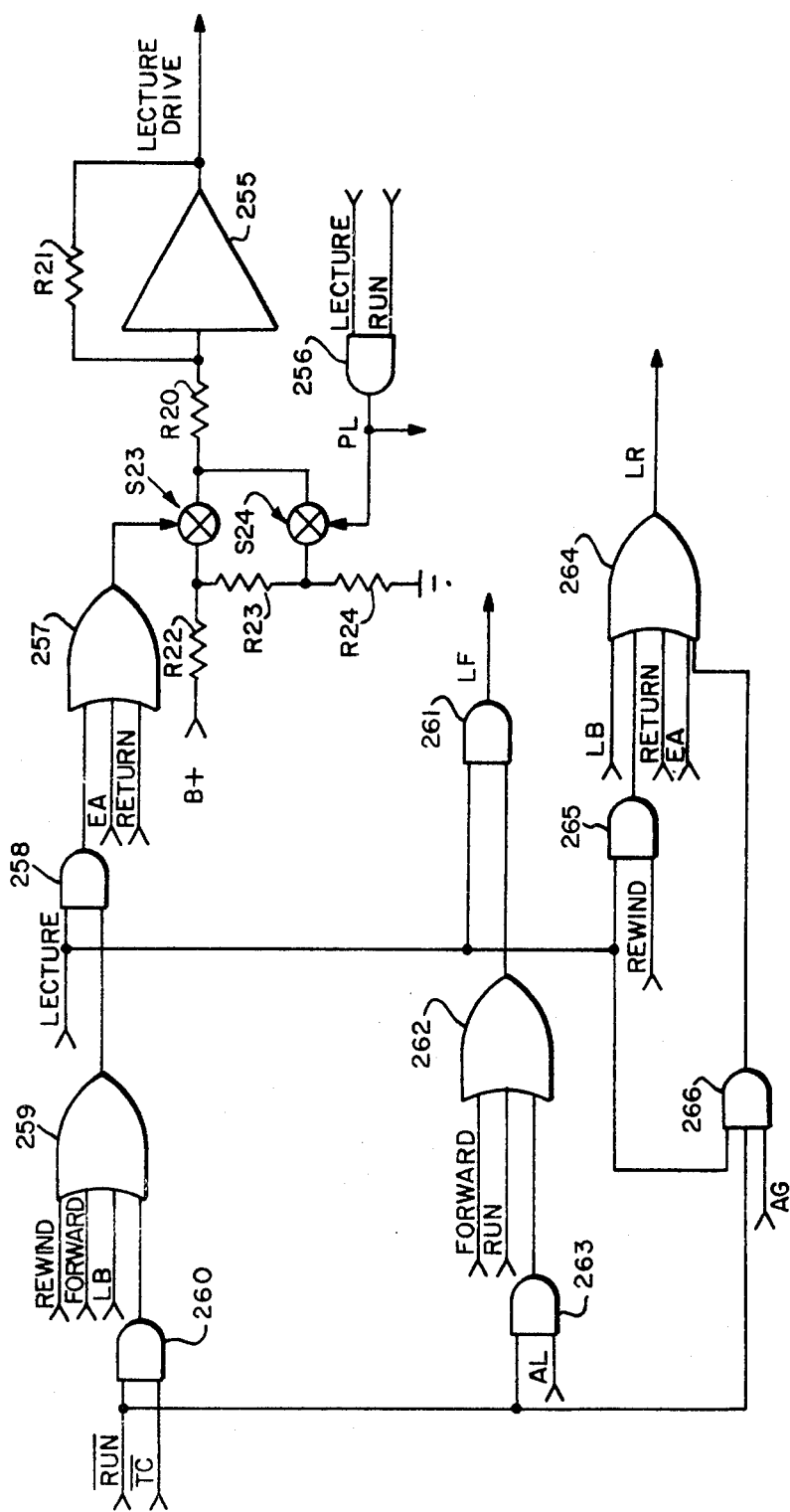
FIG. 16 is a schematic block and wiring diagram of circuits for controlling the lecture tape drive mechanism of FIG. 11.

FIG. 16 shows the control circuits for the lecture tape drive apparatus LTD in FIG. 11. A LECTURE DRIVE current signal is produced by an amplifier 255 having an input resistor R20 and a feedback resistor R21 selected in a conventional manner to produce an appropriate voltage for the motor current required to drive the motor at a speed dependent on an input signal applied to the resistor R20.

Two lecture tape speeds are provided. Signals for this purpose are developed by a potential divider comprising three resistors R22, R23 and R24 connected in series between the supply terminal at B+ and ground.

A low potential, suitable to tend to run the lecture tape takeup reel drive sprocket at a speed slightly in excess of the capstan speed, during playing of the lecture, is produced at the junction of the resistors R23 and R24 and supplied to the resistor R20 through an electronic switch S24 that is closed when the signal PL is produced. This signal is produced by an AND gate 256 in response to the signals LECTURE and RUN.

A high speed signal, suitable for rewinding and fast forward operations, as well as for entering the lecture tape from the keyboard, is produced at the junction of the resistors R22 and R23 and supplied to the resistor R20 through an electronic switch S23 that is closed when an OR gate 257 produces an output signal. The gate 257 receives the signals EA and RETURN, and is also connected to the output terminal of an AND gate 258. The signal EA is produced at the end of the playing of an answer, and has a duration sufficient to rewind the lecture tape drive for a brief interval sufficient to pick up a few words that will recall the listener to the place where it was interrupted.

The gate 258 receives the LECTURE signal, and also receives the output signal from an OR GATE 259. The gate 259 receives the signals REWIND, FORWARD and LB, and also receives the signal appearing at the output terminal of an AND gate 260. The gate 260 receives the signals $\overline{RUN}$ and $\overline{TC}$. The gate 258 is thus effective in the LECTURE mode when either REWIND or FORWARD is selected, when the signal LB is produced to indicate that the lecture tape is in a requested field but not at the beginning of it, or when it is desired to enter an address from the keyboard in the lecture mode and the apparatus is not yet at that address as indicated by the gate 260.

The signal LF which directs the lecture tape drive to move in the forward direction is produced by an AND gate 261. The gate 261 receives the LECTURE signal and also receives the signal appearing at the output terminal of an OR gate 262. The gate 262 receives the signals FORWARD and RUN, and also receives the signal appearing at the output terminal of an AND gate 263. The gate 263 receives the levels $\overline{RUN}$ and AL. The signal LF is thus produced when the apparatus is in the lecture mode and either the lecture is being played, the FORWARD pushbutton is depressed, or a keyboard address is being requested and the return address on the lecture tape is below the requested address.

The signal LR that directs the lecture tape drive to move backwards onto the supply reel is produced by an OR gate 264. This gate receives the signals LB, RETURN and EA. It also receives signals appearing at the output terminals of two AND gates 265 and 266. The gates 265 and 266 are both enabled by the LECTURE signal. The gate 265 also receives the REWIND signal, and the gate 266 receives the signals AG and $\overline{RUN}$.

The signal EA produces the brief rewind operation discussed above. The LB signal is produced as described above when it is desired to return the lecture tape to the beginning of an address field. The gates 265 and 266 are effective in the lecture mode when either rewind is requested, or when a keyboard address is requested and the current address on the lecture tape is larger than the requested address.

Figure 17:
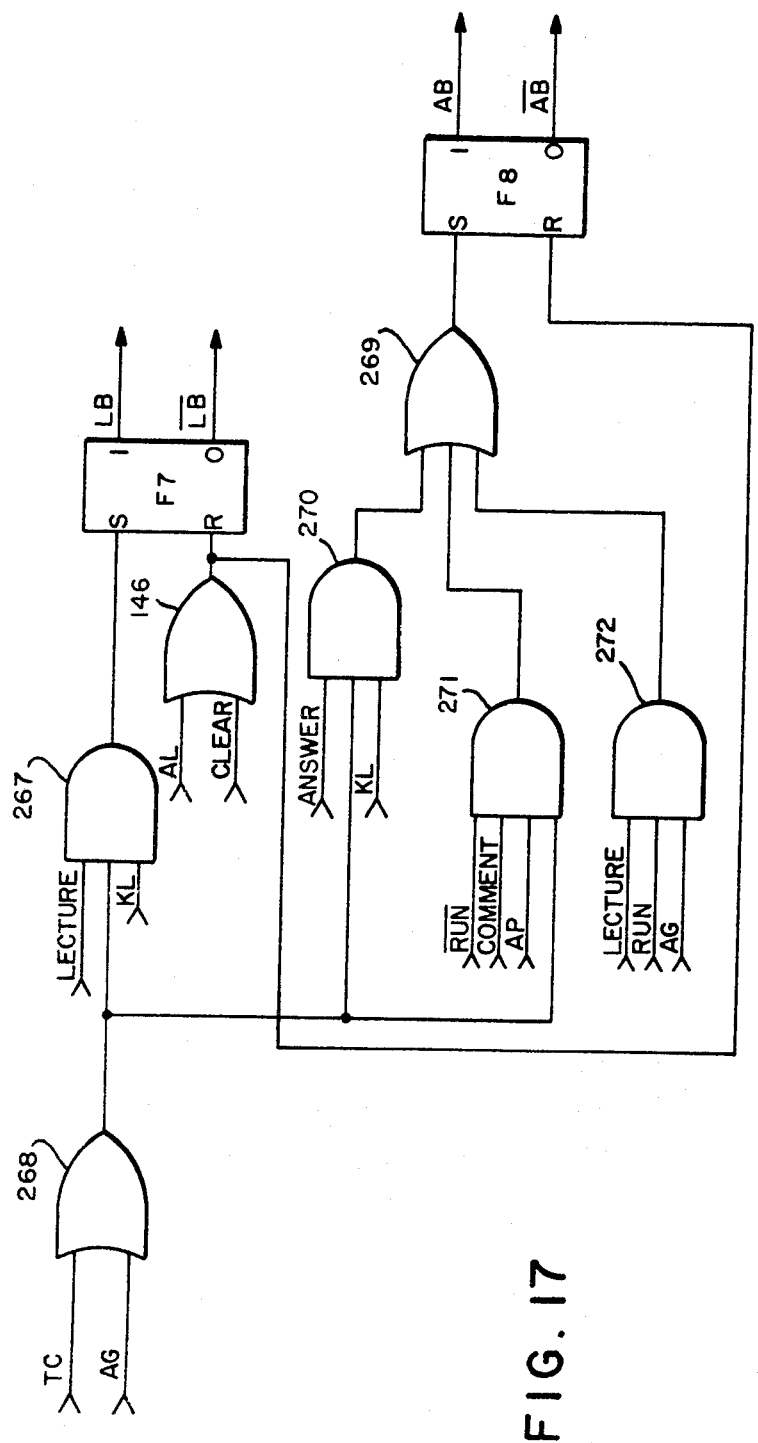
FIG. 17 is a schematic block and wiring diagram of control apparatus for selecting the appropriate entry point to one of the tapes of FIGS. 3, 4 and 11.

FIG. 17 shows the circuits for returning either the lecture tape or the answer tape to the beginning of an address field. The signal LB is produced at the logic 1 output terminal of a flip-flop F7 when the flip-flop is set by a logic 1 signal appearing at the output terminal of an AND gate 267. The gate 267 receives the signals LECTURE and KL, and also receives the signal appearing at the output terminal of an OR gate 268. The gate 268 receives the signals TC and AG produced by the comparator 39.

The signal TC is produced when the requested address is equal to the desired address, and the signal AG is produced when the current address on the selected tape is larger than the requested address. It will be recalled that the signal KL is produced by the multivibrator 228 in FIG. 14 when any address is entered into the keyboard 6. The flip-flop F7 is thus set to produce a signal LB at any time the keyboard is operated in the lecture mode and the requested address is either the same as the current address or is less than the current address.

The flip-flop F7 is reset by an OR gate 146 in response either to the CLEAR pulse or to the signaal AL produced when the lecture tape moves to the beginning of the desired address field, as the same pulse that raises the address register to the correct address is the one that reduces it below the correct address in the opposite direction. The tape is thus located in the desired position, and will enter the requested address from the beginning.

The signal AB for directing the answer tape to the beginning of an address field is produced at the logic 1 output terminal of a flip-flop F8 when the flip-flop is set by a logic 1 signal appearing at the output terminal of an OR gate 269. The gate 269 receives signals from the output terminals of three AND gates 270, 271 and 272. The gate 270 functions in the same manner as the gate 267 for the lecture tape, except that it is effective in the answer mode. Thus, it receives the signals ANSWER, KL and the output signal from the gate 268 that indicates either that the current address is equal to the requested address or that it is greater than the requested address.

The gate 271 receives the signals $\overline{RUN}$, COMMENT, AP, and the output signal from the gate 268. It is effective when the apparatus first goes into the answer mode when the COMMENT signal appears.

The gate 272 receives the signals LECTURE, RUN and AG. This gate is effective when the lecture tape is being played and the comparator 39 produces an output signal indicating that the current address is greater than the address called for by the lecture tape.

The flip-flop F8 is reset by the signal AL, in the same manner as the flip-flop F7. The signal AB, when produced, is thus present until the answer tape is brought back just before the beginning of the desired address field. In the illustrated embodiment, the apparatus will then rapidly go into the desired address field and then behave as if it had originally entered in the forward direction.

Figure 18:
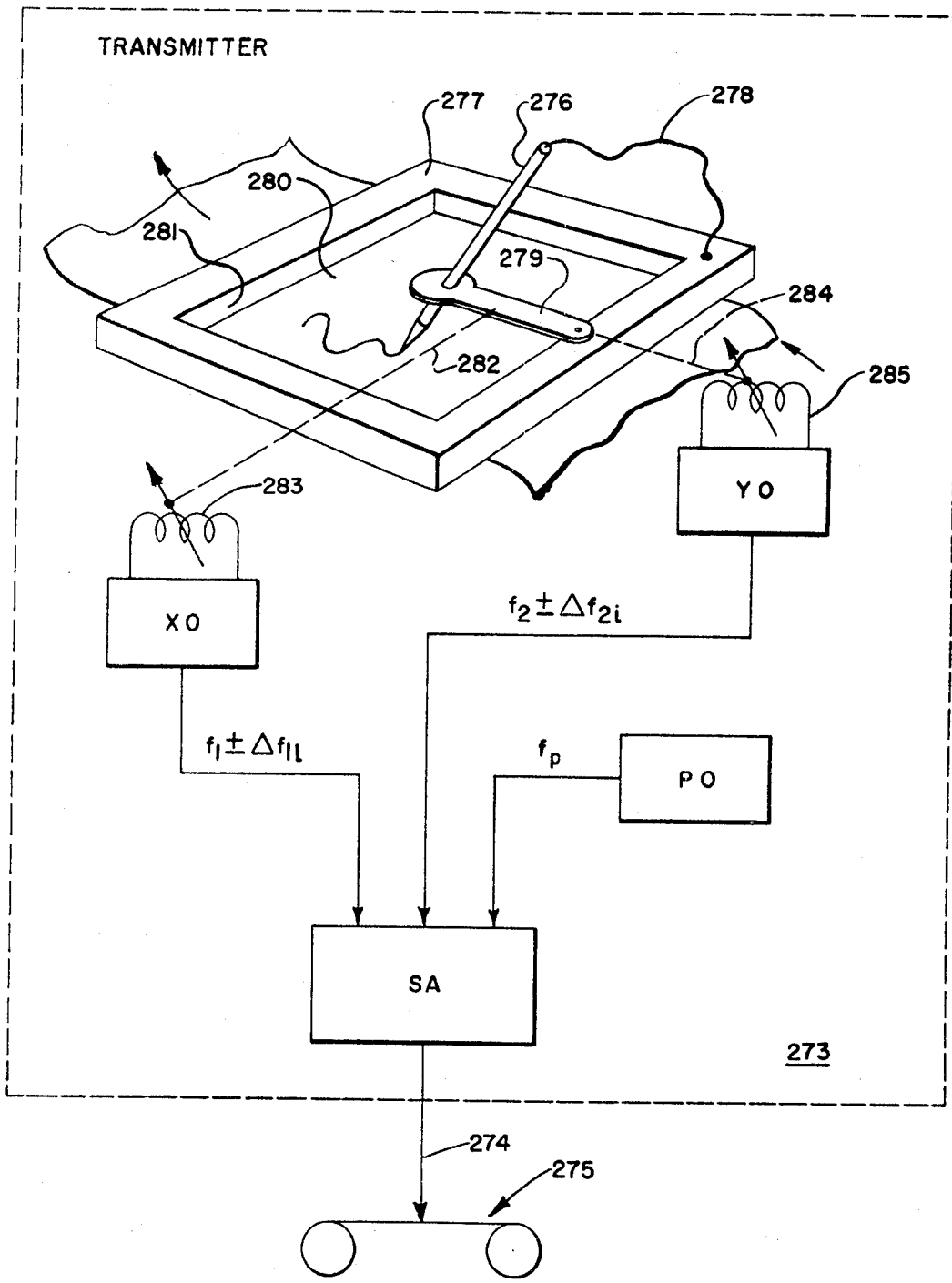
FIG. 18 is a schematic block and wiring diagram of a handwriting transducer suitable for use in preparing recorded material for use in the system of the invention.

FIG. 18 schematically illustrates the essential elements of a facsimile transmitter that may be used to produce the recorded pen position signals required to actuate the recorder 15 in FIG. 1. The transmitter is generally designated 273, and is shown provided with an output lead 274 on which the required position signals appear in a form suitable for recording on a tape diagrammatically illustrated at 275. The recording transmitter 273 may comprise a stylus 276 in the form of a pen which may be attached to the frame 277 of the transmitter by a flexible cable 278 so that it can be picked up by the operator, inserted in aa follower 279, and then used to write the desired message on a section of a strip of paper 280 exposed in a framing aperture 281 in the frame 277.

The follower 279 is connected by means schematically shown at 282 to a ferromagnetic element that varies the inductance of a frequency determining coil 283 to vary the output frequency of an oscillator XO. The oscillator XO thus produces an output signal at a frequency $f1 \pm \Delta f1i$, where $f1$ is some convenient carrier frequency such as 1,400 Hz, and the information relative to the X axis coordinate of the stylus 276 is represented by the frequency modulation term $\pm \Delta f1i$.

The stylus follower 279 is similarly connected, by means diagrammatically indicated at 284, to vary the inductance of an electromagnetic coil 285 forming the frequency determining component of another oscillator YO. The oscillator YO produces a signal $f2 \pm \Delta f2i$ that represents the Y coordinate of the stylus 276. The frequency f2 may be, for exxample, 2,200 Hz.

A third signal is produced by a pilot oscillator PO at a reference frequency fp that may be for example, 3,080 Hz. The signals from the oscillators XO, YO and PO are combined in a summing amplifier SA, which produces a composite signal on the lead 274 that is recorded on the tape 275.

Figure 4:
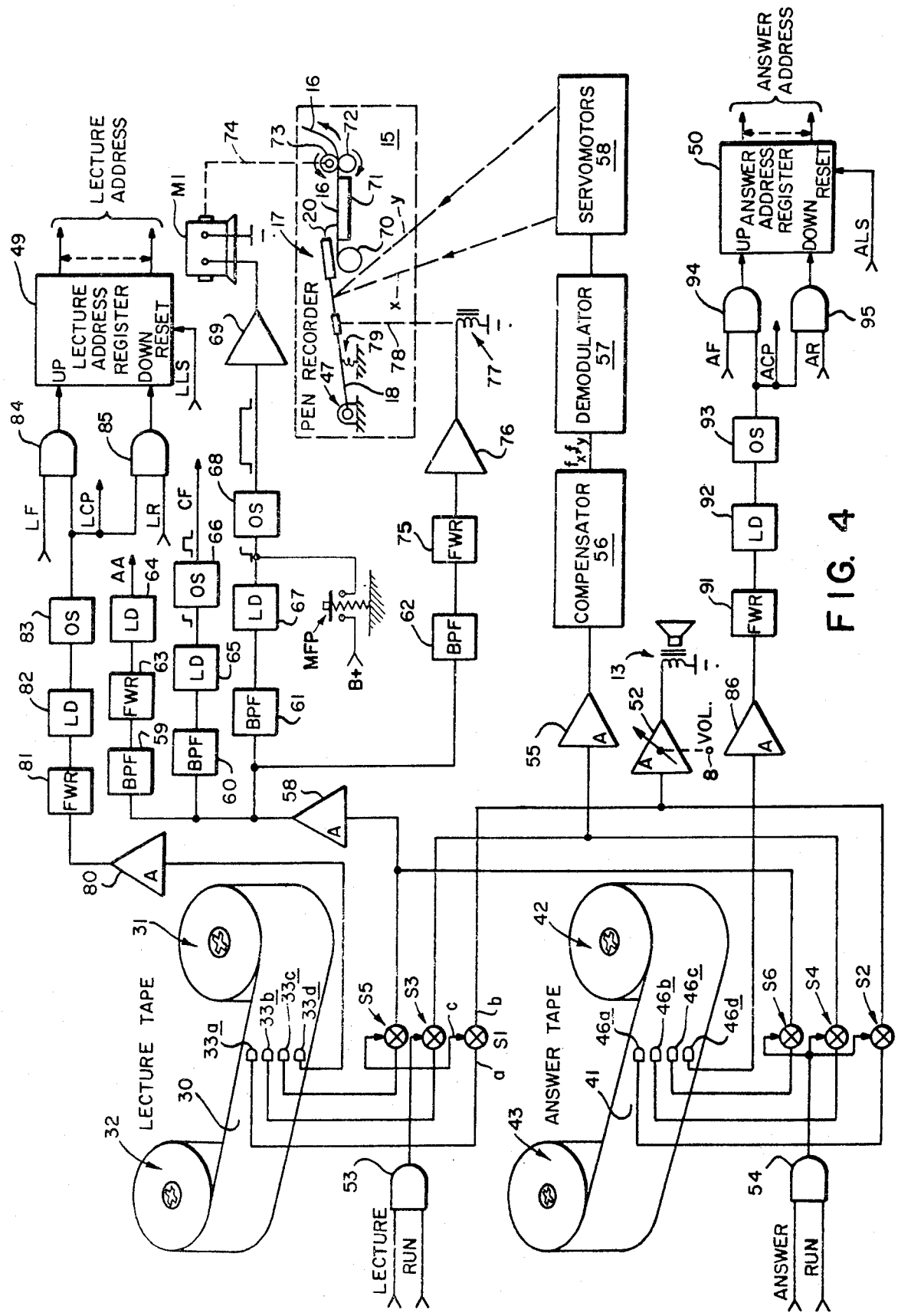
FIG. 4 is a schematic block and wiring diagram of specific circuits forming a portion of the apparatus of FIG. 3.
Figure 19:
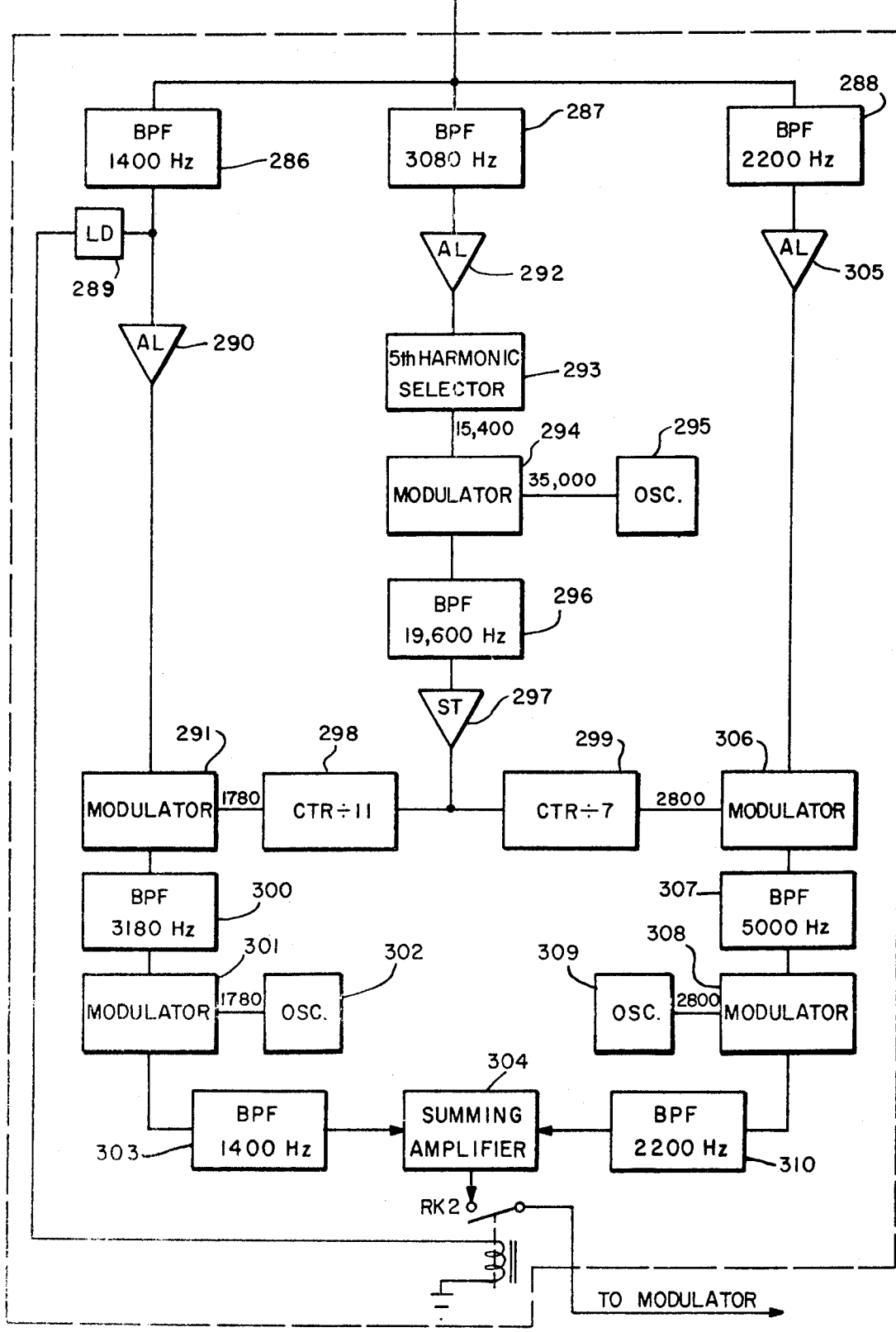
FIG. 19 is a schematic block and wiring diagram of a compensator forming a portion of the apparatus of FIG. 4.

FIG. 19 shows the details of a compensator 56 suitable for use in the apparatus of FIG. 4. The compensator 56 receives the output signal from the amplifier 55 which has been reproduced from a recording, on either the answer or the lecture tape, in the manner described above in connection with FIG. 18.

The output signal from the amplifier 55 is applied to three band pass filters 286, 287 and 288. The filter 286 is designed to pass the 1,400 Hz carrier frequency for the X axis signal and its accompanying frequency modulation, together with enough pass bandwidth to take care of the maximum excursion frequency that is expected to occur because of variations in recording and playback speed due to wow and flutter. The frequency of the output signal from the filter 286 may be exxpressed as $f1 \pm \Delta f1i \pm \Delta f1n$, where $\Delta f1n$ is the noise frequency deviation introduced by wow and flutter.

The filter 287 is designed to pass the pilot frequency of 3,080 Hz, together with the expected variations in that frequency due to noise. This frequency can be expressed as $fp \pm \Delta fpn$.

The filter 288 is designed to pass the 2,200 Hz carrier for the Y axis signal, together with its modulation and the fluctuations due to speed variations. The output signal from this filter may be expressed as $f2 \pm \Delta f2i \pm \Delta f2n$.

The noise frequency components of the signals produced by the filters 286, 287 and 288 will be proportioned to the carrier frequencies. Since the only deviation in the pilot frequency produced by the filter 287 is due to noise, that deviation is employed in the apparatus to be described to eliminate the noise components from the information signals produced by the filters 286 and 288.

The output signal from any of the filters, but in the embodiment here shown, the filter 286, is applied to a level detector 289 which produces energizing current for a relay RK2 when the carrier signal from the filter 286 is present above a predetermined level. The relay RK2 closes contacts to supply the output signal from the compensator to the demodulator 57 in FIG. 4. The relay is introduced in order to prevent noise from causing the pen to move about in a random fashion when no command signal is present.

An output signal from the filter 286 is also applied to the input terminal of an amplifier limiter 290. The amplifier limiter 290 produces an output signal that includes the frequency content of the input signal and is limited to a fixed amplitude. This signal is supplied to a conventional modulator 291, where it is modulated with a 1,780 Hz signal shifted by the noise frequency and obtained from the pilot signal in a manner next to be described.

The output signal from the band pass filter 287 is applied to an amplifier limiter 292, which produces an output signal having a fixed amplitude and the frequency content of the input signal, which, as it will be recalled, is 3,080 Hz shifted by the deviations due to wow and flutter. This output signal is applied to a harmonic selector 293, which selects and passes the fifth harmonic, or 15,400 cycles, plus or minus five times the noise content. This signal may be expressed, as to its frequency content, by the expression $5fp \pm 5 \Delta fpn$. This signal is supplied to a modulator 294, of any conventional construction, where it is modulated by a 35,000 Hz signal from a local oscillator 295.

The modulator may be a conventional mixer, but is preferably of the type in which the input signal, here 15,400 Hz shifted by the noise deviations, is chopped by an electronic switch at a rate determined by the 35,000 Hz reference frequency. The output signal of the modulator 294 contains a number of modulation products, including the sum and difference frequencies 50,400 Hz and 19,600 Hz.

Either of these signals may be used for noise compensation purposes, but in the illustrated embodiment the difference signal centered at 19,600 Hz is selected by a band pass filter 296. The output signal from the filter 296 may be expressed as $19,600 H_z \pm 5 \Delta fpn$.

This signal is supplied from the band pass filter 296 to a Schmitt trigger circuit 297 which produces a square wave at the fundamental frequency of $19,600 H_z \pm 5 \Delta fpn$. The signal from the Schmitt trigger 297 is applied to the counting input terminals of two binary counters 298 and 299.

The counter 298 may be of conventional construction except that it is arranged to count in normal ascending binary sequence to eleven, and then to recycle, through suitable conventional gates provided, to produce a carry signal at each 11th count and reset to 0 to begin again. The output signal from the counter 298 is thus a square wave at a fundamental frequency of $19,600/11 \mp 5/11 \Delta fpn$, or $1,780 \mp 5/11 \Delta fpn$. It should be noted that the sign of the noise component is inverted by reason of the difference signal taken from the output of the modulator 294 by the band pass filter 296. Wow and flutter in recording and playback will affect the frequency of a recorded signal in proportion to its frequency, and the signal carrier frequency of 1,400 Hz is selected to be 5/11 of the pilot frequency 3,080 Hz. Accordingly, the signal $\pm \Delta f1n$ is equal in frequency but opposite in sign to the signal component $\mp 5/11 \Delta fpn$.

The signal from the counter 298 is used to modulate the information signal from the amplifier 290 in the modulator 291. This modulator may also be of any conventional design, but as for other modulators to be described, it is preferably of the type in which the input frequency from the amplifier 290 is chopped by the reference frequency from the counter 298.

The output signal from the modulator 291 includes both sum and difference frequencies. the sum frequency content at 3,180 Hz is selected by a band pass filter 300.

The components of the sum signal include the noise components in opposite polarities, so that they cancel. The output signal from the filter 300 may thus be expressed as $3,180 \pm \Delta f1i$. This signal is applied to a conventional modulator 301, of the type described above, in which it is modulated with a fixed 1,780 Hz reference frequency from a local oscillator 302. This local oscillator, and other local oscillators to be described, are preferably crystal controlled oscillators designed to maintain a constant relationship to the frequency of the oscillator 295.

The difference signal from the modulation products produced by the modulator 301 is selected in a band pass filter 303 that produces an output signal at 1,400 $H_z \pm \Delta fli$. This is the desired compensated X axis frequency signal. It is applied to a summing amplifier 304 for application to the demodulator when the relay RK2 is energized.

The Y axis signal is compensated in a similar manner. The output from the band pass filter 288 is supplied to an amplifier limiter 305 where it is converted to a signal of fixed amplitude. The output signal from the amplifier limiter 305 has a frequency content that may be expressed as $f2 \pm \Delta f2i \pm \Delta f2n$. This signal is applied to a modulator 306, where it is modulated by the output signal from the binary counter 299. The counter 299 is arranged to produce a carry pulse every seventh pulse supplied to the input, so that its output may be expressed as $19,600/7 \mp 5/7 \Delta fpn$.

The Y axis carrier frequency of 2,200 Hz is equal to 5/7 of the reference pilot frequency 3,080 Hz. Thus, the noise component in the signal from the counter 299 is opposite in sign and equal in magnitude to the noise component of the signal from the amplifier 305.

The sum signal from the modulator 306 is selected by a band pass filter 307. The selected signal thus has a frequency of 5,000 Hz $\pm \Delta f2i$, since the noise components have been cancelled in the summing process. This signal is applied to a modulator 308, where it is modulated by the output signal from a local oscillator 309 that produces a fixed frequency of 2,800 Hz.

The difference signal from the modulator 308 is selected by a band pass filter 310, which thus produces an output signal at 2,200 $\pm \Delta f2i$, or the desired compensated Y axis signal. This signal is supplied to the summing amplifier 304 and thence to the modulator when the relay RK2 is energized The modulator just described is more fully described in a copending U.S. Application for Letters Patent Ser. No. 294,475, filed Oct. 2, 1972, by T. A. O. Gross and Steward Wilson for Frequency Deviation Compensation System, now U.S. Pat. No. 3,810,188, and assigned to the assignee of this application.

The mode of operation of the embodiment of the invention just described will generally be apparent from the above description. However, the overall system will be described briefly in the context of the fragment of the lecture map illustrated in FIG. 2.

This lecture, the map for which has been truncated and abbreviated considerably for illustrative purposes, takes as its title the name of the goddess, Earth, and proceeds on the thesis that the earth may be considered as an integral living entity. It is assumed that the lecture, and the answer material for the lecture, have been recorded on the lecture tape 30 and the answer tape 41, and that these tapes are disposed in the cassette 11, FIG. 7, having a slot 120 milled to a depth $d2$ that represents the initial ratio of the diameters of the tapes on their supply reels.

With reference to FIG. 1, assume that the on/off switch 7 is in its off position, and that the cassette 11 containing recorded lecture and answer material is inserted into the well 10 in the recorder 5. As it is inserted, the latch 12 is moved aside against its spring, and the ejecting springs described above, not shown, are loaded. As the cassette 11 is moved into its operating position, the latch 12 comes out over the cassette to retain it in place against the force of the ejecting springs. The pen 17 will be in a rest, or home, position.

The apparatus will wait in that state until the on/off switch is placed in the on position, whereupon it is prepared for operation. The vanes 128 and 129 in FIG. 7 will be in such a position that the photocells TC3 in FIG. 10 and PC4 in FIG. 12 are illuminated through the windows 133 and 135, respectively in FIG. 8. In the initial position of the apparatus, the reflective portions such as 131 in FIG. 9 will be adjacent these windows, and light from the lamps such as 136 will be reflected onto the photocell such as PC3. That will produce the signals LLS and ALS.

When the switch 7 is turned on and the power supply 182 produces the power supply potential B+, the rising leading edge of that voltage will trigger the multivibrator 177 to produce the CLEAR pulse, and to remove the signal $\overline{\text{CLEAR}}$ from the output terminal of the gate 178. The CLEAR pulse will reset the flip-flops F1, F2, F3, F4 and F5 in FIG. 12, the flip-flop F6 in FIG. 14, and the flip-flops F7 and F8 in FIG. 17.

The gate 206 will be disabled for a sufficient time to inhibit operation of the latch switch S15 in the event that the flip-flop F5 is transiently set before it is reset by the CLEAR pulse. The CLEAR pulse holds the apparatus in that stand-by state for a sufficient time to allow transients to settle.

The flip-flop F4 will be set to the LECTURE state by the CLEAR pulse. The operation that follows depends largely on the desires of the student, but a typical operating sequence will be assumed. That will begin by the depression of the start button STB.

The multivibrator 183 will then produce the pulse SP. The pulse SP, in combination with the signal $\overline{\text{KA}}$, produced with the flip-flop F6 in FIG. 14 reset, will enable the gate 189 in FIG. 12 to produce a logic 1 output signal that sets the flip-flop F2 through the OR gate 188. The signal RUN will thus be produced. The flip-flop F1 will be set by the pulse SP, and then reset by the pulse produced by the multivibrator 190 when the flip-flop F2 is first set.

Referring to FIG. 4, with the signals LECTURE and RUN now present, the AND gate 53 will close the switches S1, S3 and S5 to apply signals from the heads 33$b$, 33$c$ and 33$d$ to the amplifiers 52, 55 and 58. The signals LLS and ALS will have restored the lecture address register 49, and the answer address register 50, to their reset, or address O, states.

Figure 13:
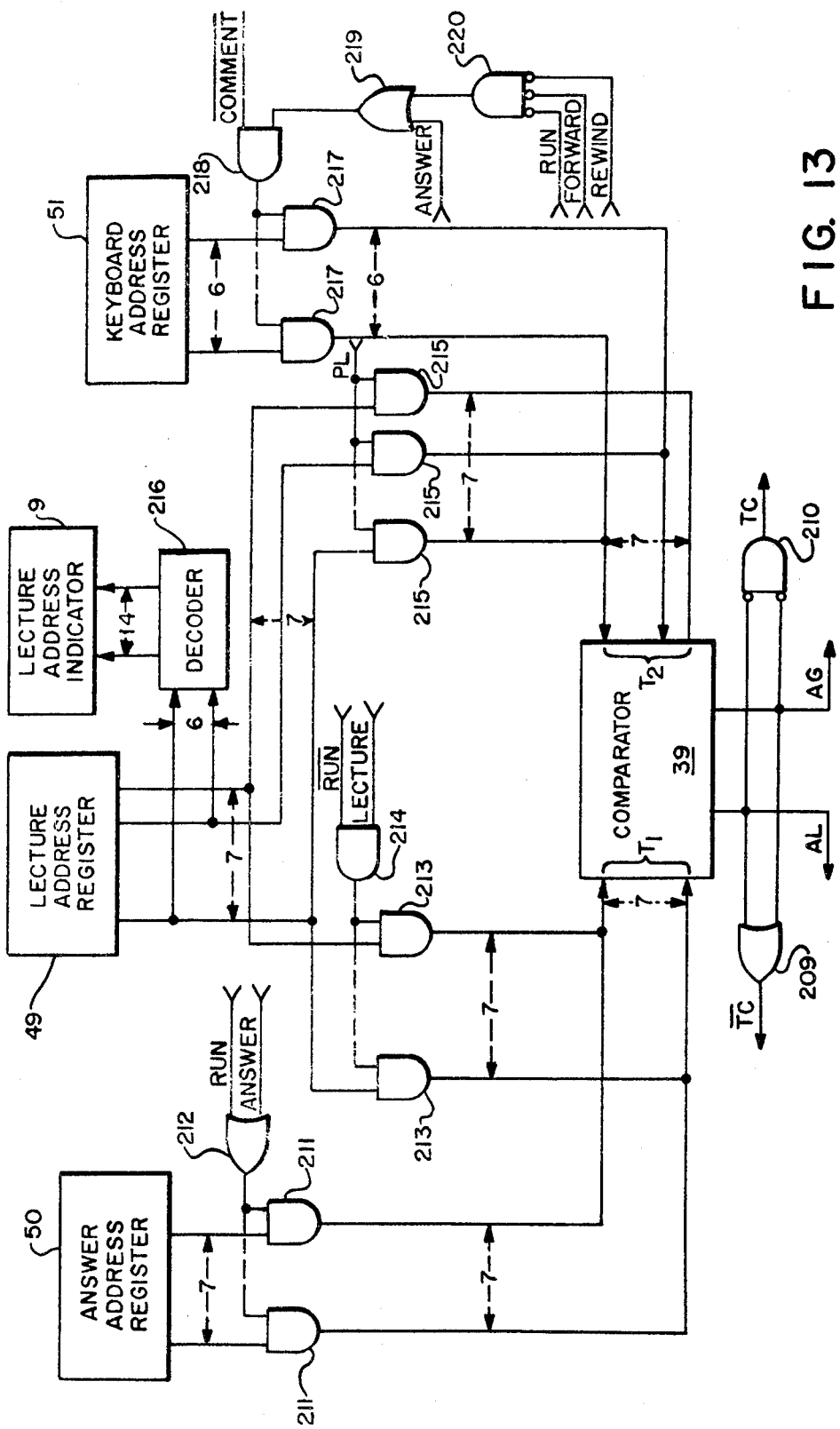
FIG. 13 is a schematic block and wiring diagram showing the circuit connections between certain storage registers and a comparator forming a part of the apparatus of FIGS. 1 and 3.

The signal PL will be produced by the gate 256 in FIG. 16, and that signal applied to the gates 215 in FIG. 13 will apply the contents of the lecture address register 49 to the terminals T2 of the comparator 39. With the signal RUN present, the gate 212 in FIG. 13 will enable the gates 211 to apply the contents of the answer address register 50 to the terminals T1 of the comparator 39. As both lecture and answer tapes are initially at address O, the signal TC will be produced by the gate 210 in FIG. 13.

Since address O is not an answer address, the level detector 64 in FIG. 4 will not produce a signal AA. Accordingly, the gate 241 in FIG. 15 will not be enabled and the answer tape will remain stationary with no signals provided to cause it to be driven.

Referring to FIG. 16, the signal PL produced by the gate 256 will close the switch S24 and apply the low speed driving signal to the amplifier 255. At the same time, the signals LECTURE and RUN applied to the gate 261 in FIG. 16 will produce the signal LF to cause the takeup reel drive sprocket for the lecture tape to be driven and advance the tape.

Referring to FIG. 11, the signals LF and LECTURE DRIVE applied to the lecture tape drive LTD will cause the sprocket 175 to be driven, and the sprocket 176 to slip against its brake. The alternating current supply ACP will be supplied to the synchronous motor M3 over the contacts of the relay RK1 closed when the switch S10 is closed by the RUN signal applied to its control terminal. The capstan shaft 173 will then drive the capstan 108, and the idler 109 for the lecture tape drive will be engaged by the application of the signal PL to the switch S13 to apply energizing current to terminal d of the tape drive LTD. Referring to FIG. 1, the lecture will be produced audibly by the speaker 13, and, if the recorded material so directs, the recorder 15 will reproduce a written accompaniment to the lecture.

The lecturer will discuss relationships between rocks, air and life, and in the process mention nitrogen in that association. The student may elect to continue to listen to the lecture and follow its line of thought, or to digress by asking the question having address 2 on the lecture map of FIG. 2, in which the relationship between nitrogen and life is more fully explored. For present purposes, assume that he chooses to continue the lecture, and allows the lecture tape to continue to play.

Referring to FIGS. 5 and 6, at the beginning of the lecture the group of address pulses calling up address codes Nos. 2, 3, 4 and 5 on the lecture tape will occur, stepping the lecture address register to address No. 5. At this point, the answer address register is still at address O. Accordingly, the camparator 39 in FIG. 13 will produce the signal AL, and the gate 209 will produce the signal $\overline{TC}$. The gate 240 in FIG. 15 will respond to the signals $\overline{TC}$ and PL to close the switch S21, and to close the switches S19 and S20 through the gate 235. Since neither tape is moved appreciably, there will be no appreciable signal at the junction 236 in FIG. 15 so that the answer drive current produced will be essentially proportional to the voltage at the junction of the resistors R14 and R15.

With the signal AL present, the gate 243 will enable the gate 244 to respond to the signal PL supplied through the OR gate 245. The signal AF will then be produced by the gate 247.

The answer tape drive in FIG. 11 will then cause the take-up drive sprocket 161 to move until the next address pulse on the answer tape is encountered, whereupon the answer tape will stop. The answer tape will continue to respond to incrementing of the lecture address register, although it will remain essentially in the same place.

About 30 seconds after the lecture begins, the group of pulses on the lecture tape that call up address codes Nos. 6, 7, 8 and 9 will occur. The answer tape will move short increments in response to each of these pulses, until the eighth pulse is encountered on the lecture tape to set the lecture address register to address No. 9, or decimal 2. The lecture tape will then apply a signal to the level detector 64 in FIG. 4 to produce the signal AA, signifying that the answer tape is in an answer address field.

With the signal AA present, the gate 241 will be enabled. As the answer tape address will now agree with the lecture tape address, the gate 242 will produce a logic 1 output signal, so that the gate 241 will close the switch S22, and apply a signal to the OR gate 235 to close the switches S19 and S20.

The answer tape will be slightly behind the lecture tape at this time, because the lecture tape has moved appreciably and the answer tape has not. The signal AL2 will thus be produced at the summing junction 236 in FIG. 15, causing the gate 243 to enable the gate 244.

The gate 244 will receive the signal PL from the gate 245, and cause the signal AF to be produced by the gate 247. The answer tape will now begin to run slowly, at a speed dependent on the difference between the diameters of the tapes on the lecture and answer supply reels. Operation will continue in this manner as long as the comparator 39 continues to produce the signal TC.

When either the lecture address register or the answer address register is incremented by a pulse appearing on the corresponding tape, the level TC will disappear and the answer tape will move relatively rapidly backward or forward, under digital control, to reestablish address parity. When that occurs, if the address at which the answer tape stops is not an answer address, it will remain there. If it is an answer address, analog control will resume and the answer tape will gradually be driven forward towards parity with the lecture tape.

Thus, when lecture entry point 2 on the lecture tape is encountered, referring to FIG. 5, the 9th pulse corresponding to address No. 10, which is not an answer address, will cause the answer tape to step to its address No. 10 and remain there until the lecture tape is advanced to address 11. The answer tape will then be stepped a very short distance to its address 11 point. The answer tape will continue to be advanced by short increments as pulses calling up address codes Nos. 12, 13 and 14 are encountered, without appreciable movement. Separation between the address code pulses should, of course, be sufficient to allow the drive motor to bring the tape to a speed at which the codes will be registered magnetically.

Assuming that the lecture tape proceeds into the second portion of the lecture, in which the view that the atmosphere originated independently of life is discussed, and that it occurs to the student to interrupt the apparatus and ask about primeval outgassing, suggested as a question on the lecture may with address decimal 4. For that purpose, the stop button SPB in FIG. 12 is momentarily depressed. That will reset the flip-flop F2 to produce the signal $\overline{RUN}$.

Next, the answer pushbutton APB is depressed to reset the flip-flop F4 through the gate 197. When the ANSWER signal appears, the multivibrator 198 in FIG. 12 will be triggered to produce the pulse AP. However, that pulse has no effect, because it is only effective in the comment mode of operation.

Next, the student enters the desired address at the keyboard 6, shown in FIG. 14, by momentarily depressing the pushbutton OPB in the tens bank and the pushbutton labelled 4 in the units bank. That will load the code corresponding to decimal address 4 into the keyboard address register 51.

When the units digit is entered, the multivibrator will be triggered to produce its pulse, setting the flip flop F6 to produce the signal KA. The trailing edge of the pulse from the multivibrator 227 will trigger the one-shot multivibrator 228 to produce the pulse KL.

Referring to FIG. 13, with the signal ANSWER present and thee signal $\overline{\text{COMMENT}}$ present, the gates 219 and 218 will respond to enable the gates 217 to connect the keyboard address register 51 to the highest ordered six terminals T2 of the comparator 39. The ANSWER signal will operate through the gate 212 to connect the answer address register 50 to the terminals T1 of the comparator 39 through the gates 211.

Referring to FIG. 12, after the address decimal 4 is entered in the keyboard, the student may depress the start button STB to set the flip-flop F1 through the one-shot multivibrator 183. The gate 184 will now be enabled by the signal KA and the logic 1 signal from the logic 1 output terminal of the flip-flop F1. However, the gate 184 will not respond until the gate 185 produces a logic 1 signal. That will occur when the gate 187 produces a logic 1 output signal in response to the signals ANSWER, TC and $\overline{\text{AB}}$. However, if the signal TC is present, the gate 270 in FIG. 17, which also receives the signals ANSWER and KL, will respond to set the flip-flop F8 through the gate 269 and produce the signal AB. That will cause the answer tape to be driven backward until the signal AL is produced, locating the tape just behind the entrance of the address field decimal 4.

With the signal $\overline{\text{TC}}$ then present, and the signal AB present, the gates 248 and 232 in FIG. 15 will respond to produce logic 1 output signals. The gate 248 will produce the signal AR. With the signals ANSWER and $\overline{\text{RUN}}$ present, the gate 231 will apply a signal to the gate 230 that will close the switch S17 and supply rapid running current to the answer drive.

With the signals $\overline{\text{RUN}}$ and ANSWER present, the gate 246 will enable the gate 244 through the gate 245. With the signal AL present, the gate 244 will respond, and the signal AF will be produced to drive the answer tape forward until it reaches the pulse that just passed in the reverse direction, and thus is at the beginning of the desired answer field.

Referring again to FIG. 12, with the signals $\overline{\text{AB}}$, TC and ANSWER all now present, the gate 187 will respond to apply a logic 1 signal to the gate 185, which will apply the third required logic 1 signal to the gate 184 and cause the flip-flop F2 to be set. The apparatus is now in the ANSWER and RUN state.

Referring to FIG. 15, the signal PA will be produced by the gate 234 and the switch S18 will be closed to supply slow running current to the answer drive amplifier 229. The signal PA will cause the gate 247 in FIG. 15 to produce the AF signal that will cause the answer tape to move forward.

Referring to FIG. 11, in addition to the sprocket drive for the answer tape take-up reel, provided as just described, the signal PA will close the switch S9 to energize the solenoid DM and move the idler 116 to nip the tape between the idler and the capstan 115. The motor M3 will be operated because the signal RUN is present to close the switch S10, energizing the relay RK1 and supplying current to the motor M3 over its contact 144.

Referring to FIG. 4, with the signals ANSWER and RUN present, the gate 54 will close the switches S2, S4 and S6 to connect the heads 46b, 46c, and 46d of the answer tape playback array to the corresponding amplifiers 58, 55 and 52. A recorded answer will then be played by the speaker 13, with the accompaniment at times of the recorder 15 when desired.

At the end of the recorded answer, the next address pulse on the answer tape will result in the signal $\overline{\text{TC}}$ being produced by the comparator 39. The gate 195 in FIG. 12 will then reset the flip-flop F2 through the gate 179, causing the signal $\overline{\text{RUN}}$ to be produced.

Prior to that, the signals RUN and $\overline{\text{TC}}$, present at the gate 199 with the signal ANSWER present, will trigger the one-shot multivibrator 200 to produce the pulse EA. This pulse will be applied to the lecture drive control circuits in FIG. 16 to apply a rapid speed signal to the lecture drive amplifier 255 through the gate 257 by closure of the switch S23, and to select the reverse direction for running the lecture tape through the gate 264, which will produce the signal LR. The lecture tape will thus rewind briefly for the duration of this pulse EA, and thus be enabled to begin the lecture from a point just behind that at which it was interrupted.

Referring again to FIG. 12, the trailing edge of the pulse EA will trigger the one-shot multivibrator 201 to produce the delayed pulse EAD. That pulse will set the flip-flop F4 through the gate 196 to produce the LECTURE signal. When the pushbutton STB is momentarily depressed, the pulse SP will be produced by the multivibrator 183 and set the flip-flop F1.

With the level $\overline{\text{KA}}$ present, the pulse SP will set the flip-flop F2 through the gates 189 and 188. That will cause the signal RUN to be produced, and the lecture tape will start playing from the position to which it has just been rewound.

The answer tape will continue to follow the lecture tape, being driven under digital control when its current address is out of parity with the address in the lecture address register, or under analog control from the tape followers when it is in an answer address field and the address is that corresponding to the address currently in the lecture address register.

When the point on the lecture tape in FIG. 2 is reached at which the pulse calling up address No. 16 is recorded, the answer tape will be driven to the entry point of address 16 where comment C1 appears. Because that is not an answer address causing the signal AA to be produced, the answer tape will remain at that position in instant readiness to produce the comment should the student elect.

The comment flag CF1 on the lecture tape is recorded at a point after sufficient time has been reached to bring the answer tape to that location. When it appears, and while it appears, the comment indicator lamp CK in FIG. 12 will be lit. Assume for the moment that the student ignores this lamp. The lecture tape will continue to move until the next address is encountered. In the meantime the comment flag will disappear.

The answer tape will remain at address 16 until the pulse calling up address No. 17 is reached. It will thus step to a point just before the beginning of the field for the answer to question Q3, where it will remain until the pulse calling up address No. 19 is encountered, whereupon it will resume movement under analog control towards the entry to the answer to question Q4.

When the flag for the second comment is encountered, at address No. 24 on the lecture tape, the answer tape will be slowly moving away from the entry point to the answer for question Q4. When the 24th address is reached on the lecture tape, the answer tape will be moved to the entry point for that comment. Thereafter, the comment flag will appear and the lamp CK will be lit.

Assume now that the student desires that comment. Referring to FIG. 12, he will momentarily depress the switch button CPB to cause the gate 192 to set the flip flop F3. That will produce the signal COMMENT. At the same time, the output of the gate 192 will reset the flip-flop F2 to produce the signal $\overline{\text{RUN}}$.

The signal COMMENT will reset the flip-flop F4 through the gate 197 to produce the ANSWER level. The one-shot multivibrator 198 will then be triggered to produce the pulse AP. This pulse will now be effective to test the output of the comparator as represented by the state of the gate 268 in FIG. 17. If either TC or AG is present, the gate 268 will produce an output signal that will be applied to the gate 271, to which the signals AP, COMMENT and $\overline{\text{RUN}}$ are applied.

Normally, with the comment flag located as indicated, the signal TC will be present so that gate 271 will produce an output signal and set the flip-flop F8 through the gate 269. The level AB will then be produced to cause the answer tape to move back through the pulse which set it to the comment address, and then to move rapidly forward until it enters again from the other direction. This mode of operation is not always of any particular use, but it is effective if the answer tape has been left at a point remote from the comment answer, and the lecture tape started just before the comment address was called up so that the answer tape did not have time to get back to the correct location before the comment signal was set.

Referring again to FIG. 12, when the answer tape reaches the comment address field at its entry, and the signal AB is absent, the gate 187 will enable the gate 193, which is already enabled by the COMMENT signal, so that the flip-flop F2 will be set through the gates 193 and 188. The signal RUN will now be produced. The apparatus will now play the answer tape, until the next address code pulse on the answer tape is encountered. When that occurs, referring to FIG. 12, the signals ANSWER and RUN already present at the gate 199 will allow the appearance of the signal $\overline{\text{TC}}$ to trigger the one-shot multivibrator 200 and again produce the signal EA. That signal will cause the lecture tape to be briefly rewound, as before. At the end of this pulse, the signal EAD will be produced to set the flip-flop F4 back to the LECTURE state. When the level $\overline{\text{TC}}$ is produced in the ANSWER mode, before the flip-flop F4 is reset, the flip-flop F2 will be set through the gates 191 and 179. The level $\overline{\text{RUN}}$ will thus be produced. The apparatus will then wait in the LECTURE mode until the start button STB is momentarily depressed. When that occurs, the multivibrator 183 will be triggered to set the flip-flop F2 through the gates 189 and 188, and playing of the lecture will resume.

It will be apparent that the apparatus will continue to operate in the manner described above, interrupted as desired by the student to pause and think, to ask a question, or to respond to the comment lamp. As a final illustration, assume that the lecture is continuing to play in the vicinity of lecture entry point 4 in FIG. 5, and the student decides that he would like the answer to question Q1. For that purpose, he simply depresses the stop button, sets the apparatus to the answer mode by depressing the answer push button APB, and enters decimal address 2 into the keyboard as before.

The answer tape will be rewound until it gets to the beginning of this answer, then will go forward and begin to play the answer. Access time will be greater than it would be had the student asked a more nearly relevant question to the portion of the lecture currently being played, but it can be had within a reasonable time. And a delay in the answer, proportioned to the remoteness of the question, is not generally an unacceptable premium for the answer.

Figure 20:
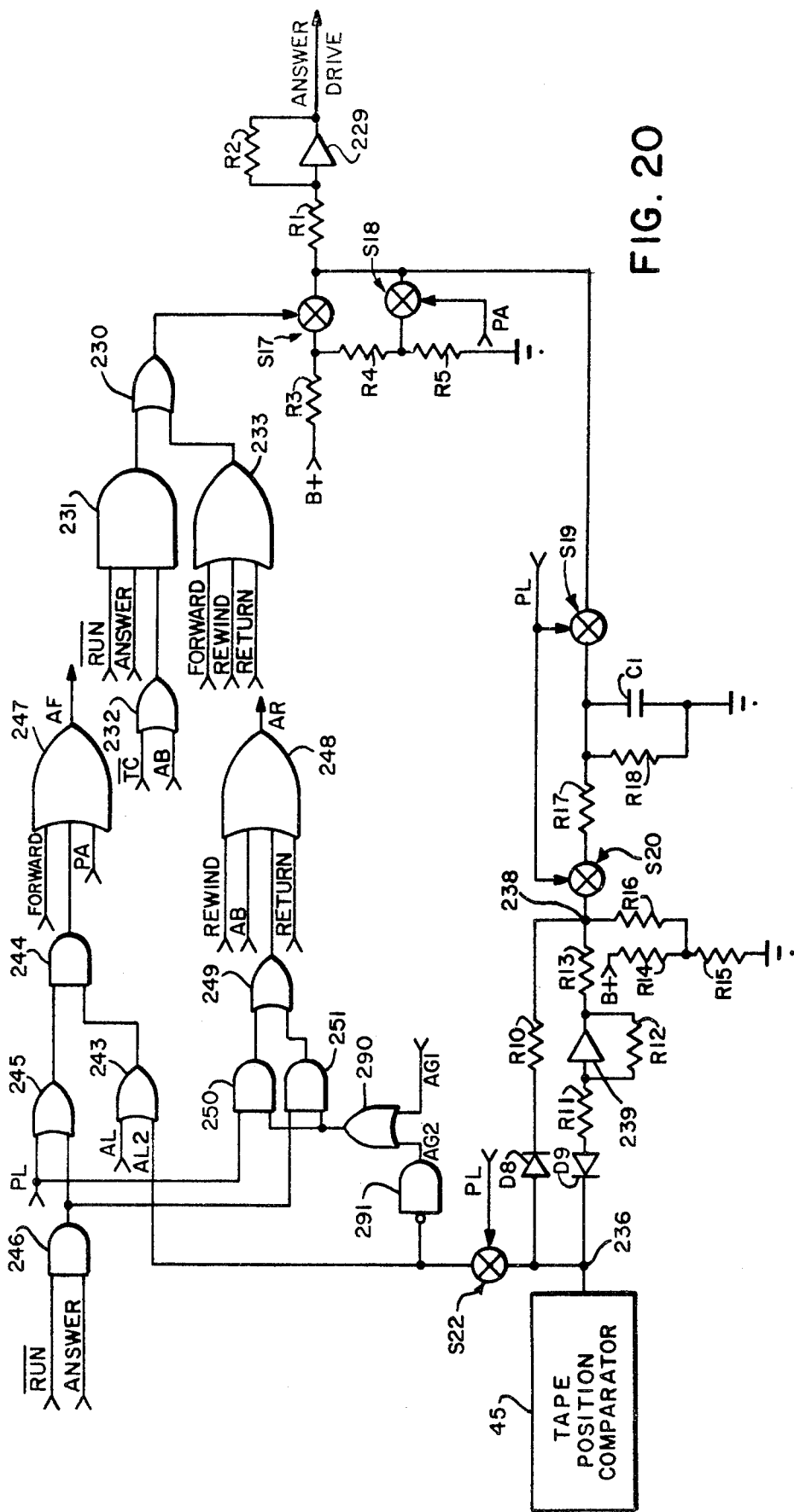
FIG. 20 is a schematic block and wiring diagram illustrating a modification of the apparatus of the invention in which the answer tape drive of FIG. 15 takes on a simplified form.

FIG. 20 illustrates a modification of the system of our invention in which the circuitry is somewhat simplified, although many of the desirable features of operation are retained. Specifically, direct digital following of the lecture tape by the answer tape is eliminated, and the answer tape follows the lecture tape when the lecture tape is being played under the sole control of the tape position comparator 45, which may be of the form shown and described in connection with FIG. 15 above.

Such a modification permits an immediate simplification of the apparatus of FIG. 13, because the gates 215 may be omitted, as the lecture address register is never used to guide the answer address register. The gates 217, 218, 219 and 220 in FIG. 13 can be omitted, because the keyboard address register 51 can always be connected to the comparator 39. The comparator 39 is thus used only for keyboard address access to either the answer tape or the lecture tape.

Referring to FIG. 20, the answer drive circuits are simplified, because it is not necessary to provide for two types of control by the output signal from the comparator 45. The circuits of FIG. 4 can be simplified by eliminating the band pass filter 59, the rectifier 63 and the level detector 64, because it is not necessary to identify answer address fields to prevent hunting.

The answer drive circuits in FIG. 20 are largely identical to those described above, except for certain simplifications to be noted. In particular, the control circuits for the gates 243, 244, 245, 246 and 247, producing the signal AF that selects the forward direction for the answer drive, are identical. The circuits including the gates 230, 231, 232 and 233 for controlling the switch S17 to selectively apply a high speed drive signal to the amplifier 229 are identical, as is the control circuit for the switch S18 that selects a slow drive speed for the answer tape drive motor when the signal PA is present. The smoothing network, comprising the resistors R17 and R18 and the capacitor C1, connected between the input terminal of the amplifier 229 and the summing junction 238 when the switches S19 and S20 are closed, is identical to that described above.

The bias signal supplied by the resistor R16 from the junction of the resistors R14 and R15 is the same, but in this case does not require switching because it is directly applied to the summing junction 238 through the resistor R16. The absolute value network connecting the terminals 236 and 238 is identical to that described above, as is the tape position comparator 45. The controls for the switches S19, S20 and S22 are simplified, in that the signal PL closes all of them to make analog control effective when the lecture tape is being played.

The major distinction between the circuit of FIG. 20 and that described in connection with FIG. 15, except for the omitted components described, is the addition of a NOR gate 291 which receives the signal AL2 produced when the signal at the junction 236 is positive and the switch S22 is closed, and inverts it to produce a signal AG2 that is positive when the signal at the junction 236 is negative. This signal is combined with the comparator signal AG in an OR gate 290 to supply an enabling signal to the gates 250 and 251.

The gates 250 and 251 are otherwise as described above, in that the gate 250 receives the signal PL and the gate 251 receives the signal at the output of the gate 246 produced when the levels $\overline{RUN}$ and ANSWER are both present. The output signals from the gates 250 and 251 are connected through the OR gate 249 to the gate 248, as identically described above, to produce the reverse signal AR.

A principal advantage of the embodiment of FIG. 20 is that a relatively smooth control of the answer tape is produced, whereby the answer tape is always being brought into approximate diameter parity with the lecture tape without abrupt stops or interruptions. The access time may, in a particular case, be longer than it would be in the first embodiment described above. However, particularly with relatively long lecture and answer tapes, each containing several hours of material, the advantage in obtaining approximate parity is very largely attained with a considerable simplification in operation and a consequent reduction in operating noise that would have to be damped out to avoid disturbing the student. The fact that the comments might be located somewhat more remotely in this embodiment can be accounted for to some extent by programming, so that when the original tapes are edited, the answer to the requested comment is located in the middle of the field where the comment flag is recorded, with respect to the relative lengths of the tapes and their consequent diameters as sensed by the comparator 45.

Figure 21:
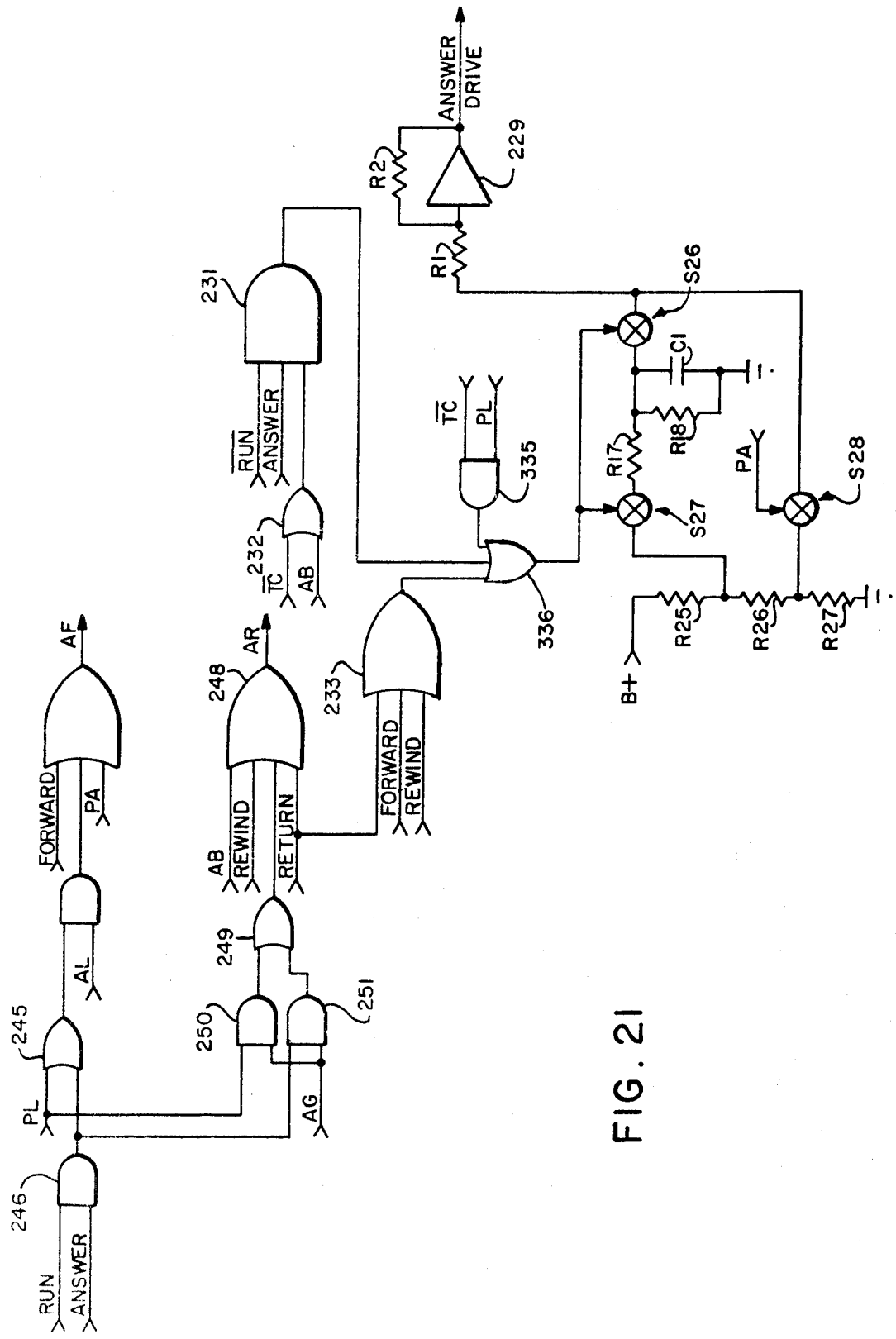
FIG. 21 is a schematic block and wiring diagram of another modification of the answer tape drive control circuit of FIG. 15.

FIG. 21 illustrates another embodiment of the apparatus of our invention in which simplification of the apparatus is achieved, while maintaining many of the advantages of the first embodiment described, by eliminating the analog controls. In accordance with this embodiment, the answer tape is caused to follow the lecture tape when the lecture tape is being played under digital address control alone. Thus, as each address code on the lecture tape is encountered, the answer tape is driven to the beginning of that address field, and it waits in that location until the next address code is called up. That retains the advantage of immediate access to comments, as well as immediate access to those questions which are asked at the most appropriate time. Somewhat more time may be required to answer other questions that may be programmed to occur on the answer tape following a very long answer or comment.

Before describing the specific circuits of FIG. 21 required to control the answer drive, simplifications of the rest of the apparatus will be discussed. First, referring to FIG. 3, in general the tape position transducers, and the comparator 45, together with the switching elements corresponding to Sc and Se can be omitted. The circuits producing the answer address signal AA in FIG. 4 can be omitted, as it is not necessary to segregate an answer address field. Referring to FIG. 7, the vanes 128 and 129, and the associated apparatus of FIGS. 9 and 10, can be omitted, together with the ratio determining slot 120 and the apparatus operated thereby. The followers 122 and 123 may be connected to switches that produce the signals ALS and LLS when both tapes are fully wound on their supply reels. The circuits of FIG. 13 remain the same, as do those of FIG. 14. The circuits of FIG. 15 are replaced by the modified circuits of FIG. 21. The circuits of FIG. 16 remain the same, as do those of FIG. 17.

Comparing FIG. 21 with FIG. 15, the circuits for producing the answer forward signal AF, involving the gates 244, 245, 246 and 247, are the same as in FIG. 15. The only difference is that the gate 244 receives only the signal AL directly, and not the logiced OR combination of the signals AL and AL2 of FIG. 15. The gates 248, 249, 250 and 251, for producing the signal AR, are the same, identically.

The gates 231, 232 and 233 used in answer speed selection are the same, but they are not connected in the same manner. Referring to FIG. 21, the output signal from the gate 232 is applied to the input terminal of the gate 231 as before. However, the output terminals of the gates 231 and 233 are connected to input terminals of an OR gate 336. The third input terminal of the OR gate 336 receives the output signal from an AND gate 335, which is at logic 1 when the signals $\overline{TC}$ and PL are present.

A logic 1 output signal from the gate 336 closes two electronic switches S26 and S27 to connect a filter network comprising a pair of resistors R17 and R18, together with a capacitor C1 connected in parallel with a resistor R18, between the input resistor R1 of the answer drive amplifier 29 and the junction of two resistors R25 and R26. The resistors R25 and R26 are connected in series with a resistor R27 between the supply terminal at b+ and ground.

The voltage appearing at the junction of the resistors R25 and R26 is sufficient to produce a high drive speed for the amplifier 229, and the filter network comprising the capacitor C1 serves to soften the acceleration applied to the tape when it is first started, as described above.

The signal produced at the junction of the resistors R26 and R27 is used to provide a slow drive speed for the takeup reel drive sprocket for the answer tape when it is decided to play the answer. For this purpose, the junction of the resistors R26 and R27 is connected to the input terminal of the amplifier 229 when a switch S28 is closed in response to the signal PA.

The system in accordance with the embodiment of FIG. 21, together with the other portions of the system revised as noted above, will operate in the same manner explained above for the first described embodiment, except that the traverse speed selected at times when the answer is not being played will always be a rapid speed, and the answer tape will not move once it has reached the entry point of an address field to which it has been directed by the lecture tape in the lecture mode. The same cooperation between the console, the lecture map, the recorder K, and the tape cassette is maintained, the only difference being that in some instances access times will be longer than they would be with the complete system.

Figure 22:
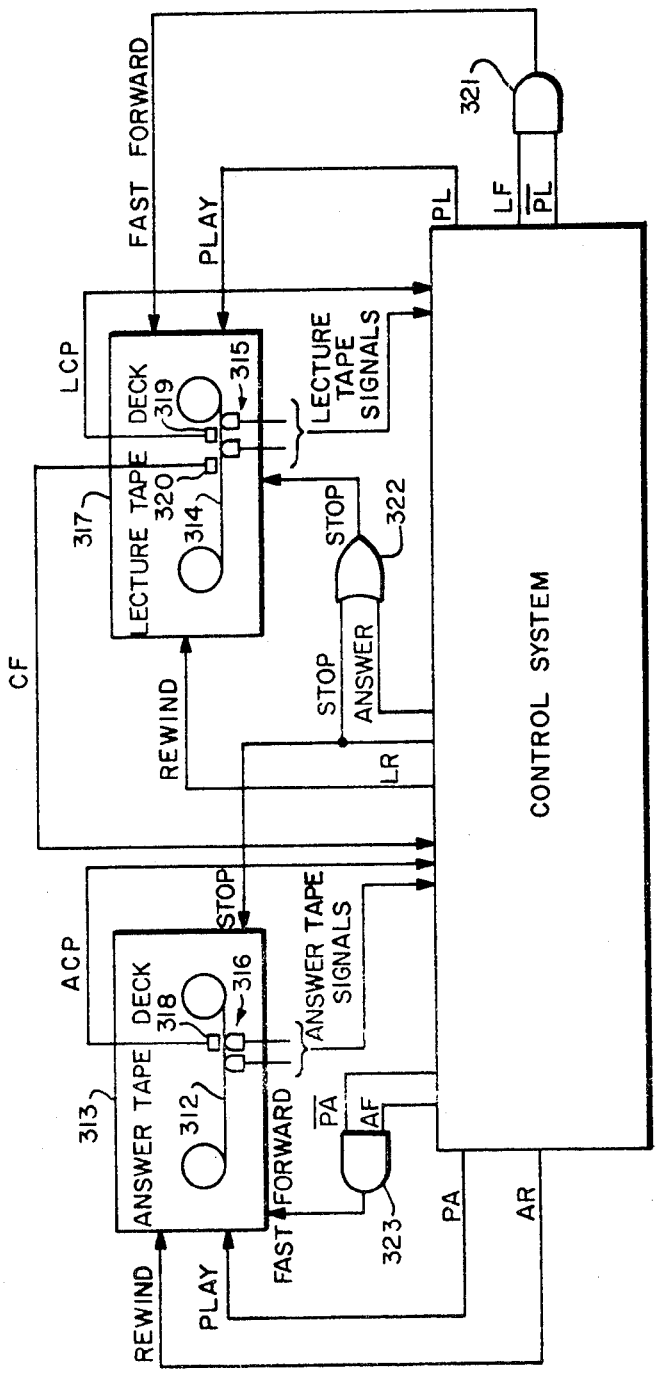
FIG. 22 is a schematic block and wiring diagram of another modification of the system of the invention.

FIG. 22 illustrates an embodiment of our invention which can be used to adapt two standard tape decks for use in the practice of the invention with the aid of a control system such as that described above in connection with FIG. 21. A console generally arranged as shown in FIG. 1 may be employed, except that the single tape recorder 5 is replaced by a lecture tape deck 317 and an answer tape deck 313, as shown in FIG. 22.

These tape decks may each be standard tape reorders, of the type which are arranged to be remotely operated by applied contact closure signals, such as the commerically available Viking relay controlled tape recorders. These tape recorders each provide means for playing a single tape, and are each conventionally provided with at least two recording heads. They respond to electrical contact closures to produce the functions STOP, REWIND, PLAY and FAST FORWARD. An eject signal may also be provided, if desired.

The tape decks 313 and 317 may be placed side by side on the console panel of FIG. 1. The panel controls for the tape recorder 5 may be retained, that is, the keyboard 6, the various pushbuttons, the indicator lamp, and the address indicator may be retained. All of the circuitis described above in connection with FIG. 21 are retained in identical form, except as modified to be described.

In particular, the recorder 15 is preferably a recorder such as the Electrowriter, made by the Victor Comptometer Corporation of Chicago, Illinois, in which the PEN DOWN signal is recorded as a 120 cycle per second frequency deviation of one of the carriers for the X and Y axis position signals. A separate track is therefore not required to record the PEN DOWN signal.

The MOVE PAPER signal is provided in this apparatus by a switch connected to the pen 17 which responds when the pen is placed in a particular location at one corner of the writing frame. This signal may thus be derived from the X and Y signals, and therefore a separate track is not required to record it.

Thus, referring to FIG. 4, the pen down solenoid 77 is actuated from the modulator 57, and the MOVE PAPER signal is produced by a switch closed when the servomotors 58 move the pen 17 to a predetermined position. In the embodiment of FIG. 22, the comment flag signal CF and the address count pulses LCP and ACP are preferably derived from photocells, rather than from magnetically recorded tracks on the tapes. Thus, only two heads are necessary to provide lecture tape signals, in response to signals recorded on the lecture tape 314 mounted in the tape deck 317. Similarly, two heads 316 are all that are required to produce answer tape signals from the answer tape 312. The answer tape deck is also provided with a photocell, schematically illustrated at 318 in FIG. 22, and to be described in more detail in connection with FIGS. 23 and 24 below.

The lecture tape address count pulse LCP is provided by the photocell schematically illustrated at 319 in FIG. 22. The comment flag signal is derived from a photocell 320 adjacent the lecture tape 314.

The signal PLAY for playing the lecture tape on the deck 317 may be the signal PL, derived in the control system in the manner described in detail above in response to the signals LECTURE and RUN. That signal may be used to control a relay, to provide a ground level current sink, or in any other manner required to direct the lecture tape deck 317 to begin playing the lecture from the location where it was stopped.

The FAST FORWARD signal is used for all forward movement of the lecture tape, except during the playing of the lecture, and this signal is produced by an AND gate 321 which receives the signals LF and $\overline{PL}$. The signal $\overline{PL}$ may be derived from PL simply by the use of an inverter. The STOP signal for the tape deck 317 is provided by an OR gate 322 which receives the signals ANSWER and STOP.

The STOP signal is that provided by the pushbutton SPB in FIG. 12. The same signal causes the answer tape deck to stop. the REWIND signal for the lecture tape deck 317 is the signal LR, produced as described above.

The address count pulse ACP for the answer tape deck 313 is provided by the photocell 318. The FAST FORWARD signal is used for all forward motions of the answer tape except during playing of the answer, and it is provided by an AND gate 323 in response to the presence of both of the signals $\overline{PA}$ and AF. The signal $\overline{PA}$ may be derived from the signal PA with the aid of an inverter. The signal PA is used to provide the PLAY signal for the answer tape deck 313. The REWIND signal is the signal AR.

Figure 24:
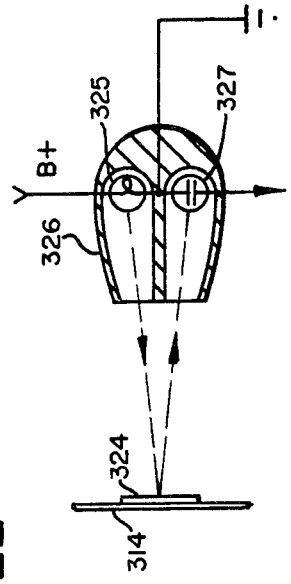
FIG. 24 is a schematic plan sketch, with parts shown in cross-section and parts broken away, illustrating one form of tape reading apparatus usable in the combination of FIGS. 22 and 23.

Each of the photocell arrangements schematically illustrated at 318, 319, and 320 in FIG. 22 may take the form shown in FIG. 24. FIG. 24 will be described in its application to the photocell array 319 for the lecture tape 314, but is applicable to either photocell array of the lecture tape and to the photocell array of the answer tape.

Specifically, the tape such as 314 has cemented to it, at appropriate locations, reflective bits of foil 324. In other regions, the tape is rendered opaque and not highly reflective. A lamp 325 located in one side of a housing 326 directs light onto the region in which a reflective bit 324 can appear. When such a bit does appear, light is reflected back to a photocell 327, which responds by producing a pulse or signal transition used to indicate the presence of the spot on the tape. For address counting, as to produce the pulses ACP and LCP, the bits 324 may be relatively small, since only pulses are required. For signals such as the comment flag CF, the reflective portion 324 may be elongated to produce a signal having a duration as long as desired. Alternatively, a prolonged signal may be produced by using a long series of closely adjacent reflective pieces 324 to provide an alternating signal that can be detected.

Figure 23:
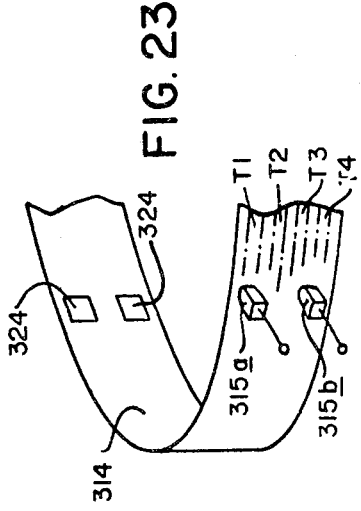
FIG. 23 is a schematic perspective sketch of a portion of the lecture tape forming a part of the apparatus of FIG. 22, illustrating the manner in which signals are derived therefrom.

FIG. 23 illustrates the manner in which the bits 324 may be arranged with respect to the magnetically recorded information on a tape such as 314 to minimize cross-talk between the magnetic recording heads 315a and 315b. Thus, a track T1 is assigned to the head 315a, and a track T3 spaced by one track width from T1 is assigned to the head 315b. On the opposite side of the tape in, for example, tracks T2 and T4, although they may overlap the recorded tracks, are assigned bands in which the bits 324 representing the lecture count pulses, and other bits 324 representing a comment flag signal, may be located for cooperation with the apparatus of FIG. 24.

Figure 25:
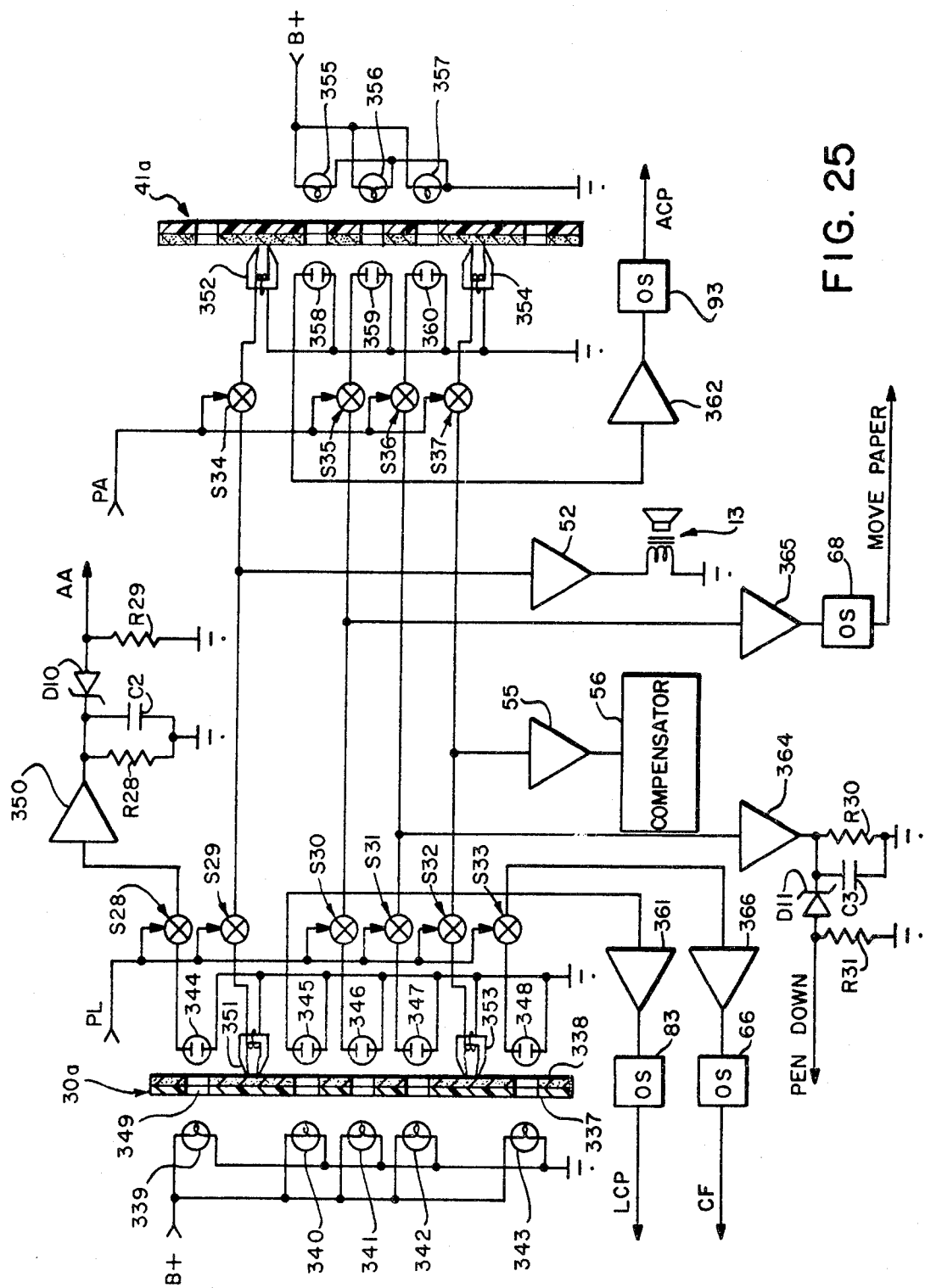
FIG. 25 is a schematic block and wiring diagram of a modification of the invention.

FIG. 25 shows a modified form of the apparatus of FIG. 4 in which fewer band pass filters are required to separate the several signals. In particular, only two tracks are magnetically recorded on each of the lecture tape 30a and the answer tape 41a. Other signals are recorded by punching holes in selected locations in other track assignments on the tape. Specifically, the lecture tape 30a may comprise a base 337 of any suitable material, such as Mylar or the like, faced on one side with a magnetic surface 338 deposited in any conventional manner.

A bank of lamps 339, 340, 341 and 343 is located on one side of the lecture tape 30a and energized from the supply terminal at B+. Each of these lamps cooperates at times with a photocell, of a set 344, 345, 346, 347 and 348, each confronting the tape at a location opposite a different one of the lamps 339 through 343. These lamps and photocells thus define five longitudinal bands aalong the tape 30a.

Perforations such as 349 may appear at any desired location along such a band, and when such a perforation does appear the photocell such as 344 is illuminated by the corresponding lamp such as 339 to produce an output signal. In order to illustrate the system, in FIG. 25 each location which such a perforation 349 may appear has been shown with a perforation. these practice, thesee perforations would only appear where a code pulse was desired.

Specifically, the answer address signal AA is produced in accordance with this embodiment of the invention by locating a row of perforations 349 in a closely adjacent sequence over the field of an answer address. When such a field is reached, and the signal PL is produced to close an electronic switch S28, a series of pulses are produced by an amplifier 350, in response to the changes in resistivity of the photocell 344 as the perforations 349 pass by. These signals are applied to a level detector, here shown as a capacitor C2 connected in parallel with a resistor R28 between the active output terminal of the amplifier 350 and ground.

When the voltage across the capacitor C2 rises to a sufficient value, in response to repeated pulses produced by the amplifier 350, a zener diode D10 breaks down and causes current to flow from the capacitor C2 through a resistor R29, causing a signal AA to be produced across the resistor R29 as long as pulses continue to be supplied to the amplifier 350. This signal is used in the same manner as the signal AA derived as described above.

The audio signal for the speaker 13 supplied by the amplifier 52 is derived from either the lecture tape or the answer tape in thee same manner as described above. Specifically, an electromagnetic reproducing head 351 adjacent the recorded voice track on the tape 30a is connected to the amplifier 52 when a switch S29 is closed by the signal PPL. Similarly, a magnetic recording head 352 adjacent the recorded voice track on the tape 41a is connected to the amplifier 52 when an electronic switch S34 is closed by the signal PA, produced as described above.

It will be seen that the lecture tape 30a has a second magnetic recording head 353, and that the answer tape 41a has a second reproducing head 354. These heads are located adjacent tracks on which are recorded the signals for operating the graphic recorder 15 in FIG. 1.

The tape 41a is identical to the tape 30a except that it requires only three photocell-controlled tracks. These are defined by a bank of lamps 355, 356 and 357, located on the opposite side of the tape from correspondingly placed photocells 358, 359 and 360.

The tape address signals for the lecture tape are recorded as perforations that will pass between the lamp 340 and the photocell 345. Each of these perforations causes a pulse to be applied to an amplifier 361, each such pulse causing a transition to trigger the one-shot multivibrator 83 described above in connection with FIG. 4 to produce the lecture count pulse LCP. Similarly, the answer address pulses are produced by the photocell 358 when excited by the lamp 355 to cause an amplifier 362 to trigger the one-shot multivibrator 93 described above in connection with FIG. 4 to produce the pulses ACP.

The MOVE PAPER signal in the embodiment of FIG. 25 is produced from the lecture tape 30a when a photocell 346 is illuminated by a perforation in the tape 30a exposing the lamp 341. When the signal PL is present to close an electronic switch S30, pulses supplied by the photocell 346 are applied through an amplifier 365 to trigger the one-shot multivibrator 68 of FIG. 4 to produce the MOVE PAPER pulse. Similarly, when a switch S35 is closed by the signal PA, pulses from the photocell 359 produced by illumination of the photocell from the lamp 356 in the presence of a perforation in the tape 41a are supplied to the amplifier 365 to trigger the multivibrator 68.

The PEN DOWN signal for actuating the solenoid 77 in FIG. 4 is supplied by the lecture tape when the photocell 347 produces pulses and an electronic switch S31 is closed by the signal PL. Under those circumstances, an amplifier 364 operates through a level detection circuit comprising a resistor R30 in parallel with a capacitor C3. That produces a voltage across a resistor R31, when a zener diode D11 breaks down as the voltage across the capacitor C3 rises to a predetermined value when a series of adjacent pulse perforations in the tape 30a passes adjacent the photocell 347. A continuous series of such perforations is provided for each region in which the PEN DOWN position is desired.

Similar control of the pen from the answer tape 31a is provided by the photocell 360 when a switch S36 is closed by the signal PA.

Pen position signals for the amplifier 55 connected to the compensator 56 in FIG. 4 are supplied from the lecture tape by the head 353 when an electronic switch S32 is closed by the signal PL. Corresponding signals are provided from the answer tape 41a by a head 354 effective when a switch S37 is closed by the signal PA.

The comment flag signal is recorded only on the lecture tape 30a, in the form of perforations located at the beginning of each comment flag field and causing illumination of the photocell 348. When a switch S33 is closed by the signal PL, such a pulse is applied through an amplifier 366 to trigger the one-shot multivibrator 66 in FIG. 4 to produce the comment flag signal CF.

It will be apparent that the modifications described in connection with FIG. 25 may be made to the apparatus without otherwise changing its structure or function, the primary difference being simply in the manner in which certain of the signals are derived and recorded on the tape.

Numerous other modifications can be made in the apparatus without departing from the scope of the invention in its broader aspects. Specifically, while pulse address coding has been discussed and described, it will be apparent that absolute addresses could be entered on the lecture and answer tapes in a series of tracks, either as perforations in the tape or as magnetic signals or in other known manners, or they could be layed down as serial pulse trains that could be interpreted by conventional techniques to produce absolute address codes. Moreover, while considerable emphasis has been given to magnetic tape recording, as it is the presently preferred mode of recording for the practice of the invention, any other suitable recording technique could be employed if so desired.

While the invention has been described with respect to the details of various illustrative embodiments thereof, many other changes and variations will occur to those skilled in the art upon reading this description, and such can obviously be made without departing from the scope of the invention.

Having thus described the invention, what is claimed is:

1. A tape cassette for use in an interactive communication system, comprising a housing, first and second strips of recording tape disposed in said housing, means mounting each of said strips in said housing for movement back and forth over a different path for each strip adjacent a different playback station at a predetermined location on each path, one of said strips having a lecture recorded thereon, and the other of said strips having a series of answers to questions that may be raised by the lecture recorded in a spaced series of locations along its length.

2. The cassette of claim 1, in which at least one of said strips has recorded thereon a series of address signals identifying locations on the strip at which selected portions of the material recorded thereon begin.

3. The apparatus of claim 1, further comprising sensing means mounted in said housing for producing a control signal in accordance with the relative positions of said tapes along said paths.

4. The apparatus of claim 3, further comprising means on said housing for producing a signal in accordance with the relative lengths of said tapes.

5. The apparatus of claim 4, in which said last recited means comprises a slot formed in said housing and having a length determined by the relative lengths of said tapes.

6. The apparatus of claim 3, in which said mounting means comprises a first pair of reels rotatably mounted in said housing, said first strip having opposite ends each connected to one reel of said first pair and being coiled thereon for movement therebetween upon rotation of said first reel, and a second pair of reels rotatably mounted in said housing, said second strip having opposite ends each connected to one of said second reels and being coiled thereon for movement therebetween upon rotation of said second reels, in which said sensing means comprises first sensing means engaging the portion of said first tape coiled on one of said first reels for producing a first signal in accordance with the amount of said first tape on said one of said first reels, and second sensing means engaging the portion of said second tape coiled on one of said second reels for producing a second signal in accordance with the amount of said second tape on said one of said second reels, and in which said control signal comprises a predetermined function of said first and second signals.

* * * * *